United States Patent
Prasad et al.

(10) Patent No.: US 12,229,722 B2
(45) Date of Patent: Feb. 18, 2025

(54) SYSTEM AND METHODS FOR PERFORMING ORDER CART AUDITS

(71) Applicant: KoiReader Technologies, Inc., Dallas, TX (US)

(72) Inventors: Ashutosh Prasad, Dallas, TX (US); Vivek Prasad, Bengaluru (IN)

(73) Assignee: KoiReader Technologies, Inc., Dallas, TX (US)

( * ) Notice: Subject to any disclaimer, the term of this patent is extended or adjusted under 35 U.S.C. 154(b) by 0 days.

(21) Appl. No.: 18/666,056

(22) Filed: May 16, 2024

(65) Prior Publication Data
US 2024/0303598 A1 Sep. 12, 2024

Related U.S. Application Data

(63) Continuation-in-part of application No. 18/702,631, filed on Apr. 18, 2024, and a continuation-in-part of application No. 18/636,719, filed as application No. PCT/US2023/063930 on Mar. 8, 2023, which is a continuation of application No. PCT/US2022/079015, filed on Nov. 1, 2022.

(60) Provisional application No. 63/269,081, filed on Mar. 9, 2022, provisional application No. 63/263,417, filed on Nov. 2, 2021.

(51) Int. Cl.
G06V 30/10 (2022.01)
G06Q 10/0875 (2023.01)
G06V 30/148 (2022.01)
G06V 30/224 (2022.01)

(52) U.S. Cl.
CPC ....... *G06Q 10/0875* (2013.01); *G06V 30/148* (2022.01); *G06V 30/2247* (2022.01)

(58) Field of Classification Search
CPC .............. G06Q 10/08–0875; G06V 30/00–43
See application file for complete search history.

(56) References Cited

U.S. PATENT DOCUMENTS 6,125,362 A * 9/2000 Elworthy .............. G06F 40/263
8,787,681 B1 * 7/2014 Rubio ................... G06V 30/40
382/229

(Continued)

FOREIGN PATENT DOCUMENTS

CA 2959641 A1 9/2017
WO WO-2023081627 A1 * 5/2023 ............. G06V 10/98

OTHER PUBLICATIONS

PCT Search Report and Written Opinion mailed Sep. 20, 2023 for PCT application No. PCT/US23/63930, 17 pages.

(Continued)

*Primary Examiner* — Sean T Motsinger
(74) *Attorney, Agent, or Firm* — Lee & Hayes, P.C.

(57) ABSTRACT

Techniques are described for automating and computerizing order cart audits to reduce the overall costs associated with shipping incorrect items, missing items, and/or additional items. In some cases, the system may be configured to perform an audit of a completed or filled order cart. The facility operator may pass the order cart through an audit area prior to loading the items on a vehicle for transport. During the audit, the system may capture sensor data associated with the order cart and identify each item present. The system may determine whether or not each item is part of the order and notify an operator accordingly.

20 Claims, 31 Drawing Sheets

(56) References Cited

U.S. PATENT DOCUMENTS

| | | | |
|---|---|---|---|
| 9,298,997 B1* | 3/2016 | Lecky | G06V 30/424 |
| 9,714,139 B1 | 7/2017 | Aggarwal | |
| 9,946,924 B2* | 4/2018 | Sengupta | G06F 16/345 |
| 11,495,036 B1* | 11/2022 | Kündig | G06V 30/148 |
| 2007/0288325 A1* | 12/2007 | Ma | G06Q 30/06 |
| | | | 705/330 |
| 2008/0137954 A1* | 6/2008 | Tang | G06V 30/413 |
| | | | 382/176 |
| 2009/0242631 A1* | 10/2009 | Wishnatzki | G06Q 50/02 |
| | | | 235/385 |
| 2011/0096983 A1* | 4/2011 | Jensen | G06V 30/268 |
| | | | 382/187 |
| 2013/0304663 A1* | 11/2013 | Whitehouse | G06Q 30/06 |
| | | | 705/333 |
| 2014/0361074 A1* | 12/2014 | Kumar | G06F 16/93 |
| | | | 235/376 |
| 2015/0066895 A1* | 3/2015 | Komissarchik | G06V 30/413 |
| | | | 707/709 |
| 2015/0269433 A1* | 9/2015 | Amtrup | H04N 1/00106 |
| | | | 382/115 |
| 2016/0104109 A1 | 4/2016 | Singel et al. | |
| 2017/0109818 A1* | 4/2017 | Amtrup | G06V 30/412 |
| 2017/0351914 A1* | 12/2017 | Zavalishin | G06V 10/50 |
| 2017/0351915 A1* | 12/2017 | Thompson | G06V 30/413 |
| 2017/0357937 A1* | 12/2017 | Edens | G06K 7/10861 |
| 2018/0232884 A1* | 8/2018 | Hayashi | G06V 10/44 |
| 2018/0285835 A1* | 10/2018 | O'Neill | G06Q 20/18 |
| 2019/0303841 A1* | 10/2019 | Hanks | G06Q 10/083 |
| 2019/0372968 A1* | 12/2019 | Balogh | G06N 20/00 |
| 2020/0143160 A1* | 5/2020 | Liu | G06F 18/2431 |
| 2020/0302165 A1* | 9/2020 | Dang | G06N 20/00 |
| 2021/0081664 A1* | 3/2021 | Weller | G06F 40/226 |
| 2021/0124919 A1* | 4/2021 | Balakrishnan | B42D 25/309 |
| 2021/0182548 A1* | 6/2021 | Ayyadevara | G06V 30/18057 |
| 2021/0201258 A1* | 7/2021 | Perez | G06Q 10/0833 |
| 2021/0319195 A1* | 10/2021 | Chakravarty | G06Q 10/0833 |
| 2022/0051043 A1* | 2/2022 | Lee | G06N 3/08 |
| 2022/0067828 A1* | 3/2022 | Gross | G06V 10/7784 |
| 2022/0156488 A1* | 5/2022 | Mokhtari | G06F 40/284 |
| 2022/0292802 A1* | 9/2022 | Simpson | G06V 30/40 |
| 2022/0351088 A1* | 11/2022 | Kumar | G06N 7/01 |
| 2022/0374807 A1* | 11/2022 | Mahmood | G16H 40/67 |
| 2023/0005604 A1* | 1/2023 | Nagasawa | G16H 20/13 |
| 2023/0046344 A1* | 2/2023 | Grohs | G06F 40/216 |
| 2023/0060506 A1* | 3/2023 | Ghosh | G06V 10/74 |
| 2023/0205800 A1* | 6/2023 | Avivi | G06F 16/383 |
| | | | 382/176 |
| 2023/0230033 A1* | 7/2023 | Hagen | H04N 23/651 |
| | | | 705/28 |
| 2024/0193537 A1* | 6/2024 | Krishnan | G06Q 10/0833 |
| 2024/0211869 A1* | 6/2024 | Simpson | G06K 7/146 |
| 2024/0217257 A1* | 7/2024 | Wells | G06V 30/22 |

OTHER PUBLICATIONS

Reaidy, et al., "Bottom-up approach based on Internet of Things for order fulfillment in a collaborative warehousing environment," Retrieved on Oct. 10, 2023. Retrieved from <URL: https://www.sciencedirect.com/science/article/abs/pii/S0925527314000668> entire document, vol. 159, Jan. 2015, pp. 29-40.

Wang, et al., "Application of Augmented Reality (AR) Technologies in inhouse Logistics," Retrieved on Oct. 8, 2023. Retrieved from <URL:https://www.e3s-conferences•.org/articles/e3sconf/abs/2020/05/e3sconf_iaecst2020_02018/e3sconf_iaecst2020_02018.html> entire document, E3S Web Conf. vol. 145, 2020, 8 pages.

* cited by examiner

3000

```
┌─────────────────────────────────────────────────────────────────┐
│ PERFORM FIRST CHARACTER RECOGNITION ON CONTENT OF A DOCUMENT    │
│ BASED AT LEAST IN PART ON A RECOGNITION MODEL                   │
│ 3002                                                             │
└─────────────────────────────────────────────────────────────────┘
                              ↓
┌─────────────────────────────────────────────────────────────────┐
│ PERFORM SECOND CHARACTER RECOGNITION ON CONTENT OF THE DOCUMENT │
│ BASED AT LEAST IN PART ON A CO-REFERENCE RESOLUTION MODEL       │
│ 3004                                                             │
└─────────────────────────────────────────────────────────────────┘
                              ↓
┌─────────────────────────────────────────────────────────────────┐
│ PERFORM THIRD CHARACTER RECOGNITION ON CONTENT OF THE DOCUMENT  │
│ BASED AT LEAST IN PART ON A PART OF SPEECH MODEL                │
│ 3006                                                             │
└─────────────────────────────────────────────────────────────────┘
                              ↓
┌─────────────────────────────────────────────────────────────────┐
│ PERFORM FOURTH CHARACTER RECOGNITION ON CONTENT OF THE DOCUMENT │
│ BASED AT LEAST IN PART ON A LANGUAGE MODEL                      │
│ 3008                                                             │
└─────────────────────────────────────────────────────────────────┘
                              ↓
┌─────────────────────────────────────────────────────────────────┐
│ PERFORM FIFTH CHARACTER RECOGNITION ON CONTENT OF THE DOCUMENT  │
│ BASED AT LEAST IN PART ON HEURISTIC MODELS                      │
│ 3010                                                             │
└─────────────────────────────────────────────────────────────────┘
                              ↓
┌─────────────────────────────────────────────────────────────────┐
│ GENERATE MACHINE READABLE CONTENT BASED AT LEAST IN PART ON THE │
│ FIRST CHARACTER RECOGNITION, SECOND CHARACTER RECOGNITION, THIRD│
│ CHARACTER RECOGNITION, FOURTH CHARACTER RECOGNITION, AND FIFTH  │
│ CHARACTER RECOGNITION                                            │
│ 3012                                                             │
└─────────────────────────────────────────────────────────────────┘
```

FIG. 30

SYSTEM AND METHODS FOR PERFORMING ORDER CART AUDITS

CROSS-REFERENCE TO RELATED APPLICATION(S)

This application is a Continuation-in-part of U.S. application Ser. No. 18/702,631 filed on Apr. 18, 2024 and entitled "SYSTEM AND METHODS FOR PERFORMING ORDER CART AUDITS," and Ser. No. 18/636,719 filed on Apr. 16, 2024 and entitled "SYSTEM FOR TRANSPORTATION AND SHIPPING RELATED DATA EXTRACTION." U.S. application Ser. No. 18/702,631 is a U.S. national stage application under 35 USC § 371 and claims priority to International Application No. PCT/US23/63930 filed on Mar. 8, 2023 which claims priority to U.S. Provisional Application No. 63/269,081 filed on Mar. 9, 2022. U.S. application Ser. No. 18/636,719 claims priority to and is a continuation of International Application No. PCT/US22/79015 filed on Nov. 1, 2022 and entitled "SYSTEM FOR TRANSPORTATION AND SHIPPING RELATED DATA EXTRACTION," which claims priority to U.S. Provisional Application No. 63/263,417, filed on Nov. 2, 2021 and entitled "SYSTEM FOR TRANSPORTATION AND SHIPPING RELATED DATA EXTRACTION," the entire contents of which are incorporated herein by reference.

BACKGROUND

Storage facilities, such as shipping yards, processing plants, warehouses, distribution centers, ports, yards, and the like, may store vast quantities of inventory over a period of time. Facility operators often generate shipments of various different inventory items. Unfortunately, shipments often contain missing items, wrong items, additional items, and the like resulting in unnecessary costs associated with lost item claims, returns, and unnecessary restocking.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 30 is a flow diagram illustrating an example process associated with the optical character recognition system of FIG. 15 according to some implementations.

DETAILED DESCRIPTION

Figure 1:
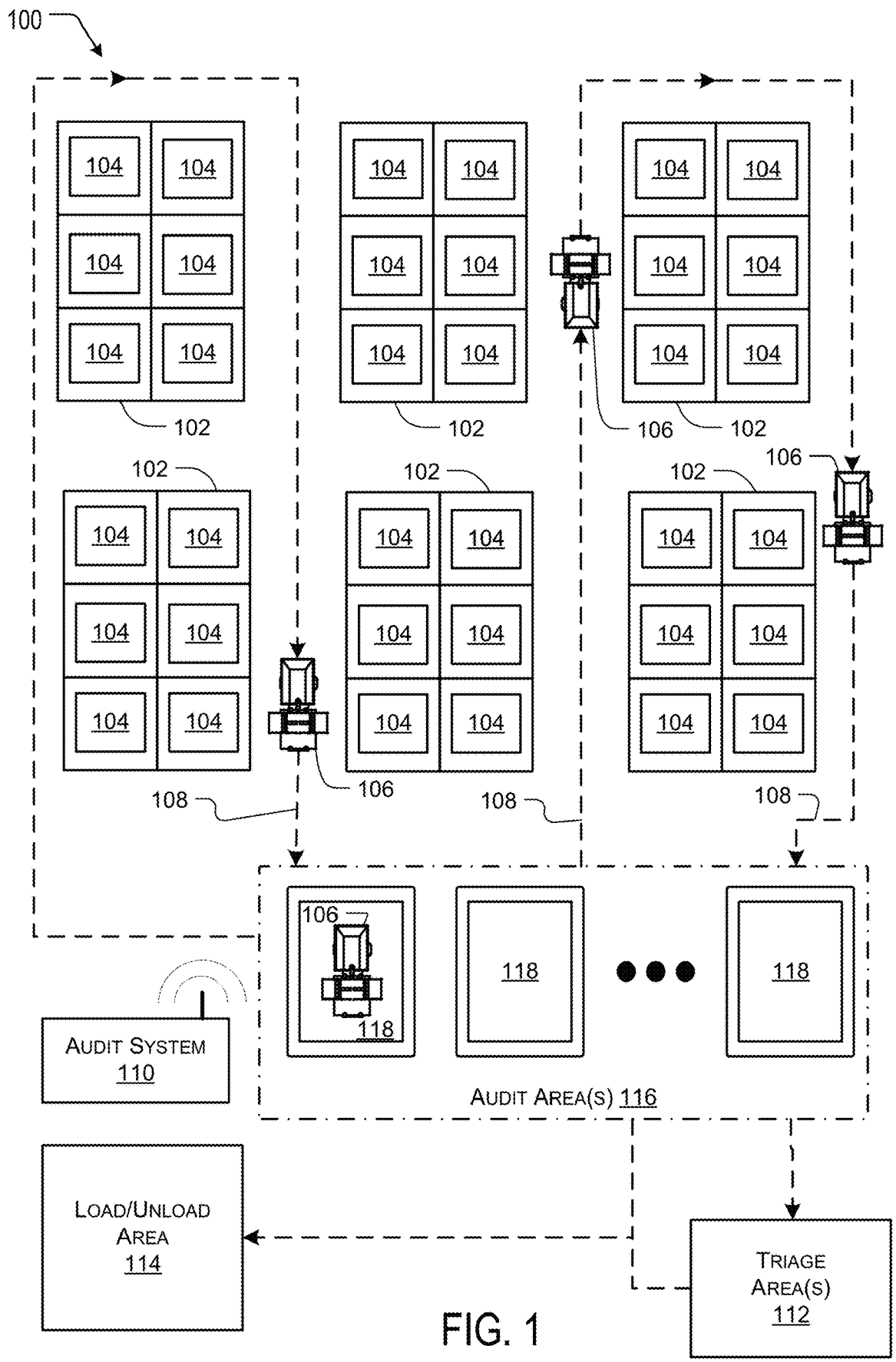
FIG. 1 is an example block diagram of a facility utilizing an audit system for performing order cart review prior to loading of transport vehicles, according to some implementations.

Discussed herein are systems and devices for automating and computerizing the order cart audits to reduce the overall costs associated with shipping incorrect items, missing items, and/or additional items. As discussed herein, an order cart may include but is not limited to a cart (either manual or automated), a pallet or other transport handling unit, processing or facility containers, and the like. In some storage facilities, facility operators may receive orders to be filled. The orders may contain various items of differing quantities. In order to fulfill the orders, one or more facility operator and/or an autonomous system may navigate a cart or other container through the facility and select or pick items associated with the order by placing the items from shelving or storage into the cart or container. In many situations, the facility operator may scan a bar code or other identifier on the exterior of the item or the items packaging as the item is placed in the order cart to record the pick event. Conventional order cart audit systems may then confirm the scanned identifier or bar code matches the corresponding item on the order list.

Unfortunately, mistakes associated with scanning and picking items for the order cart may occur from time to time. For example, an item may not be labeled with a scannable identifier and, thus, as the item is picked, the item cannot be verified by the conventional audit system. In this example, a facility operator may scan an identifier associated with the shelving, but the item may be incorrectly placed. As such, the wrong item may be placed on the order cart. In other examples, an item may include multiple identifiers (such as a reused carton, box, container, or the like). In this example, even if the facility operator scans the correct identifier and the correct item is shipped, it is common for the receiving facility or customer to scan the wrong identifier and mistakenly return the item resulting in increased shipping costs, restocking fees, and delivery delays.

In some examples, the system, discussed herein, is configured to audit the order cart in lieu of or in addition to the operators scanning of the item identifiers. For instance, the system, discussed herein, may be configured to perform an audit of a completed order cart. In this instance, the facility operator may pass the order cart through an audit area prior to loading the items on a vehicle for transport. During the audit, the system may capture sensor data associated with the order cart. The system may then, based at least in part on the sensor data, identify each item present on the order cart. The system may also determine whether or not each item is part of the order. If the order is correct (e.g., each expected item is present and no additional items are present), the system may alert the facility operator to proceed with loading the transport vehicle. However, if the order is incorrect (e.g., the cart is missing items or contains wrong items or additional items), the system may alert the facility operator to proceed to a triage area prior to loading the transport vehicle.

At the triage area, the system may include a display or user interface (e.g., a display at the triage area, a display associated with a device of the operator, and/or the like). The system may present a model of the order cart and each item on the cart. In some cases, the model may be a three-dimensional model of the order cart and each item present on the order in other cases the model may be a two-dimensional (such as an overhead model) of the order cart and each item present on the order cart. The system may highlight (e.g., color, circle, or otherwise distinguish) the incorrect items (e.g., wrong items, additional items, or the like) on the order cart, such that the operator may quickly identify the item, the location of the item, and remove the item from the order cart. The system may then present the operator with a list of missing items and instructions to re-pick the missing items.

In some examples, the model may also include stacking instructions associated with loading the transport vehicle. For example, the system may generate instructions on how to arrange the items within the transport, on a transport handling unit (THU), or the like. In some cases, the instructions may include merging the order with other orders associated with the same customer or destination. As discussed herein, a THU may include, but is not limited to, as pallets, bins, unit load devices (ULDs), ocean containers, airfreight units, any object that may carry or otherwise transport an inventory item, and the like.

In some cases, the system may also determine, based at least in part on the sensor data, if each item has only correct labels visible or scannable. For example, if the item contains multiple visible identifiers or labels, the system may alert the facility operator to proceed to the triage area even if all the items are correct. In some cases, when an item has multiple identifiers, the system may determine the correct identity of the item, based on the sensor data and one or more item models, and/or based on an analysis of the labels to determine which label is on top or newest. Once the correct identity is known, the system may determine if the item is the correct item or an incorrectly labeled item. In the latter case, the system may cause the facility operator to remove the item and replace (e.g. repick) with the correct item via the cart model and display, as discussed above. In the former case, the system may cause one or more new labels to print at a printer associated with the system and the triage area. The label may include a new identifier associated with the correct item. The system may then cause the display to present the item, the location of the item and instructions (such as a visual representation) of where to the place the one or more new labels on the item. Once the labels are applied the system may rescan the item to determine that the new labels are correctly placed to prevent inadvertent scanning of an incorrect label upon delivery by the receiving party or customer.

In some examples, items identifiers may be blocked from view when the system captures the sensor data. In these cases, the system may attempt to identify the item via the sensor data and one or more item models. If the system is still unable to confirm the identity of the item, the system may direct the operator to the triage area in which the user may manually, via a user device, scan the identifier on the blocked item. In other cases, the system may cause instructions to reorganize the order cart to be displayed to the operator and the system may rescan the order cart upon a completion of the reordering by the operator.

In some examples, the system may detect an order cart entering or positioned within the audit area. The system may receive first sensor data associated with the entire cart from the one or more sensors. The system may then, based at least in part on the first sensor data, partition the order cart into two or more discretized regions. The system may then cause the sensors to capture second sensor data for each region. For example, the sensors may include a pan, title, and/or zoom features, such that one sensor may adjust and/or zoom to capture the second sensor data for each region as a separate data set.

The system may then determine if any items associated with the order cart are associated with two or more regions. The system may then assign each item in two or more regions to a single region, based at least in part on the second sensor data for each region. The system may then identify each item based on the second sensor data and compare the identified items to the order list, as discussed above.

In some examples, the audit system may utilize one or more heuristic and/or one or more machine learned models to assist with identifying items, determining correct identifiers, and distinguishing between unlabeled items. Details associated with identifying items, identifiers, and the like are discussed in U.S. Provisional Patent Application No. 63/263,417, which is herein incorporated by reference in its entirety for all purposes. As one illustrative example, the audit system may utilize one or more machine learned models to perform segmentation and classification for individual items associated with the order cart.

In some examples, one or more sensors may be associated with the audit system to generate the sensor data, such as positioned with respect to an audit area and/or triage area, as discussed above. The sensors may include one or more internet of things (IoT) devices. The IoT computing devices may include a smart network video recorder (NVR) or other type of EDGE computing device with a GPU/NPU/CPU. Each IoT device may also be equipped with sensors and/or image capture devices, such as visible light image systems, infrared image systems, other image based devices, radar based systems, LIDAR based image systems, SWIR based image systems, Muon based image systems, radio wave based image systems, and/or the like. In some cases, the IoT computing devices may also be equipped with models and instructions to capture, parse, identify, and extract information associated with a lifecycle of an asset, as discussed herein, in lieu of or in addition to the cloud-based services. For example, the IoT computing devices and/or the cloud-based services may be configured to perform segmentation, classification, attribute detection, recognition, data extraction, and the like.

As described herein, the machine learned models may be generated using various machine learning techniques. For example, the models may be generated using one or more neural network(s). A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

FIG. 1 is an example block diagram of a facility 100 utilizing an audit system 110 for performing order cart 106 review prior to loading of transport vehicles, according to some implementations. As illustrated, the facility may include a number of shelves 104 within a storage area, generally indicated by 104. One or more order carts 106 may traverse the facility 100 including the storage areas 102 along routes 108 (such as either via a facility operator and/or as an autonomous system). As the items are retrieved or picked from the shelves 104, the facility operator may scan or otherwise input identifiers associated with the items into the audit system 110, such as via a user or handheld device.

Once the order has been picked, the order cart 106 may navigate to an audit area 116. The audit area 116 may be equipped with one or more sensors as discussed above. In some cases, the audit area 116 may include two or more audit pads 118, such that multiple order carts 106 may be audited substantially simultaneously. At the audit area 116, the sensors may capture sensor data which is provided to the audit system 110. The audit system may then detect each item and an associated identifier based at least in part on the sensor data, one or more item models, and/or the order list. If the order is complete (e.g., all of the expected items are present and no additional items are present), the audit system 110 may provide instructions, via one or more display associated with the audit pad 118 and/or the user device of the cart operator, to proceed to the load/unload area 114, such that the order may be shipped.

If the order is not correct (e.g., one or more expected item is missing and/or an additional item is present), the audit system 110 may direct the cart operator to proceed to the triage area 112. At the triage area 112, the audit system 110 may present a model of the order cart highlighting the incorrect items and/or a list of missing items. In this manner, the operator may quickly identify the additional items and remove them and/or return the storage area 102 and pick the missing items. While the current example illustrates the triage area 112 in some implementations the audit area 118 and the triage area 112 may be combined or one area may server both purposes.

In some cases, if an item has identifier issues, the audit system 110 may also direct the cart to the triage area 112. In these cases, the audit system 110 may present to the operator the model of the cart, indicating the items with missing, multiple, or confusing labels/identifiers again for the operator to quickly identify the item. The system 110 may also cause one or more new labels/identifiers to print and include instructions to cover or replace the existing identifiers prior to proceeding to the load/unload area 114. In some cases, the system 110 may also request the operator to manually scan, via the user device, one or more identifiers to confirm the identity and correct labeling of an item prior to proceeding to the load/unload area 114.

Figure 2:
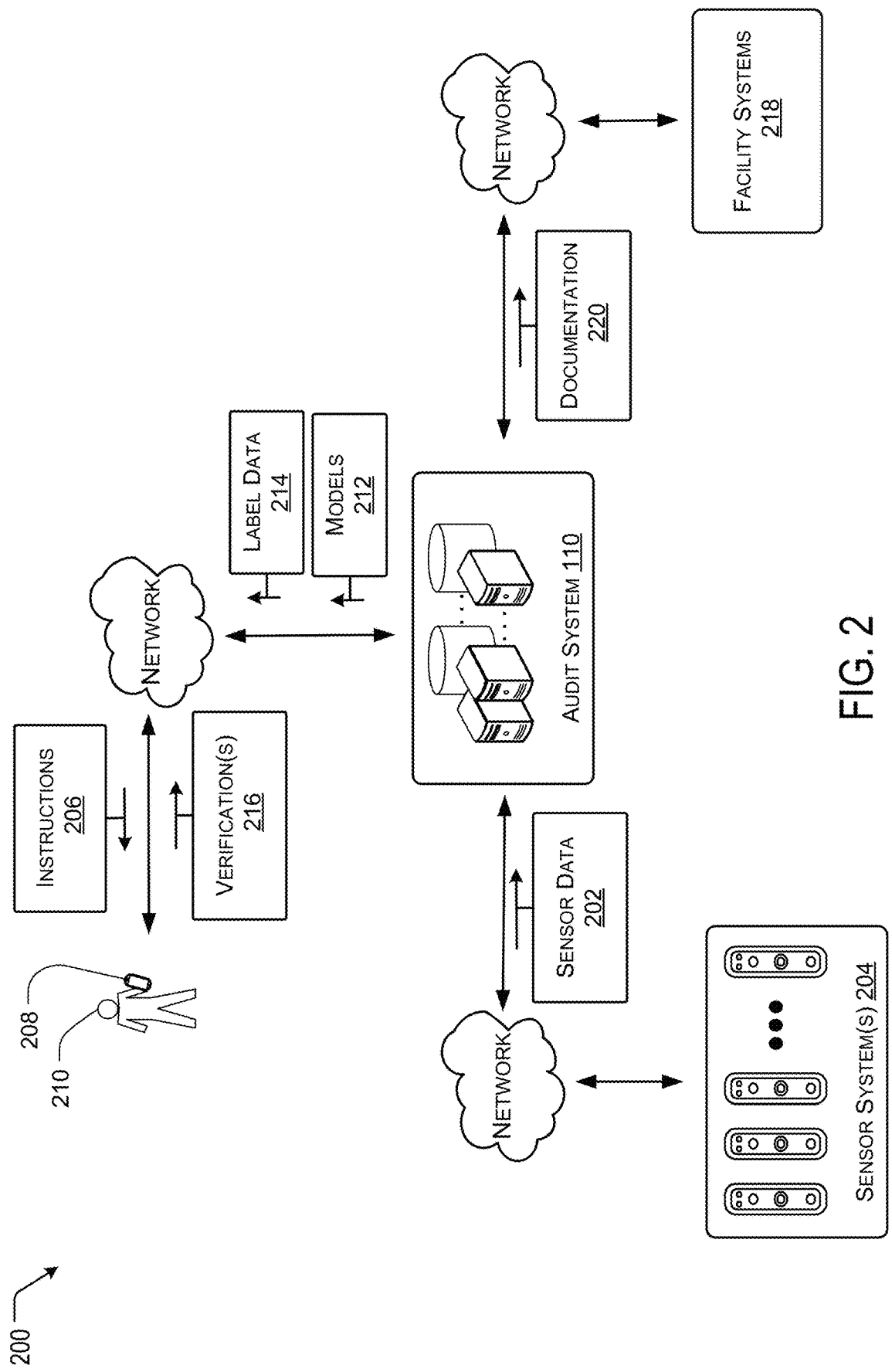
FIG. 2 is an example block diagram of the audit system of FIG. 1, according to some implementations.

FIG. 2 is an example block diagram of the audit system 110 of FIG. 1, according to some implementations. In the current example, the audit system 110 may receive sensor data 202 from one or more sensors 204 associated with the audit area of the facility as discussed above. The audit system 110 may then detect each item and an associated identifier based at least in part on the sensor data 202, one or more item models, and/or the order list. If the order is complete (e.g., all of the expected items are present and no additional items are present), the audit system 110 may provide instructions 206, via one or more displays associated with the audit pad and/or a user device 208 of the cart operator 210, to proceed to the load/unload area 114, such that the order may be shipped.

If the order is not correct (e.g., one or more expected item is missing and/or an additional item is present), the audit system 110 may direct the cart operator to proceed to the triage area via, for example, instructions 206 via one or more displays associated with the user device 208. At the triage area, the audit system 110 may present a model 212 of the order cart highlighting the incorrect items and/or a list of missing items. In this manner, the operator may quickly identify the additional items and remove them and/or return the storage area and pick the missing items.

In some cases, if an item has identifier issues, the audit system 110 may also direct the operator 210 to the triage area again via the instructions 206. In these cases, the audit system 110 may present to the operator the model 212 of the cart indicating the items with missing, multiple, or confusing labels/identifiers again for the operator to quickly identify the item. The system 110 may also send label data 214 to the triage area to cause one or more new labels/identifiers to print and include instructions 206 to cover or replace the existing identifiers prior to proceeding to the load/unload area. In some cases, the system 110 may also request the operator to manually scan or provide verification data 216 via the user device 208 for one or more identifiers to confirm the identity and correct labeling of an item prior to proceeding to the load/unload area.

In this example, the audit system 110 may also provide documentation 220 and/or reports to other facility systems 218 or operators such as a gate checkout location (e.g., check out information), the load or unload area (e.g., an all-clear signal), and the like.

Figure 3:
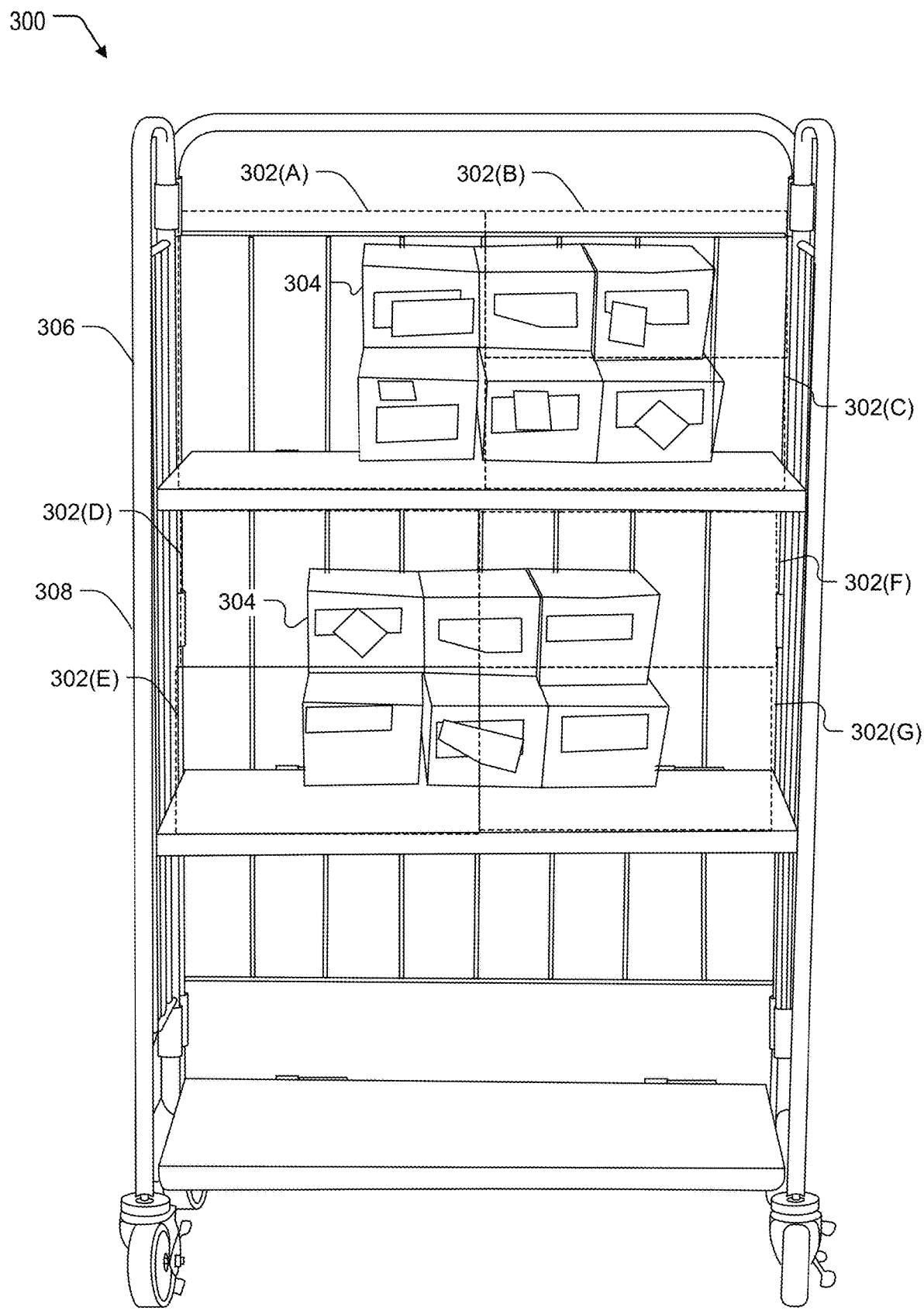
FIG. 3 is an example pictorial view of an order cart divided into regions by the audit system of FIG. 1, according to some implementations.

FIG. 3 is an example pictorial view of an order cart 300 divided into regions 302(A)-302(G) by the audit system of FIG. 1, according to some implementations. In this example, two of the levels of the order cart 300 include items, generally indicated by 304. As illustrated, as the cart 300 enters the audit area the sensor data of the cart 300 and the items 304 are captured. In this example, the cart 300 may be divided into regions 302(A)-(G) that may be captured individually or partitioned/segmented from the sensor data to be processed individually. In some cases, the items 304 may be within two or more regions 302. In these cases, the audit system may determine a region and assign the item to the determined region 302, for instance, based on an amount of the item 304 within each region 302 and/or the location of a label or an amount of the label within one or both of the regions.

In this example, the top shelf 306 of the cart 300 is divided into three regions 302(A)-302(C). For instance, the regions may be selected based on a number of items 304 detected within each region. Likewise, the second shelf or middle shelf 308 of the cart 300 is divided into four equal regions 302(D)-(G). Thus, it should be understood, that the cart 300 may be divided into irregular or regular regions as well as regions defined by the number of items, size of the items, visibility of the items to the field of view of the sensors, number of sensors, size of the cart 300, and the like.

Additionally, this example is illustrated from a side perspective. In some cases, the partition and sensors field of view may be a top down perspective. However, it should be understood, that the cart may be partitioned using a top down perspective as well as or in lieu of the side based perspective depending on cart design, type, and size.

Figure 4:
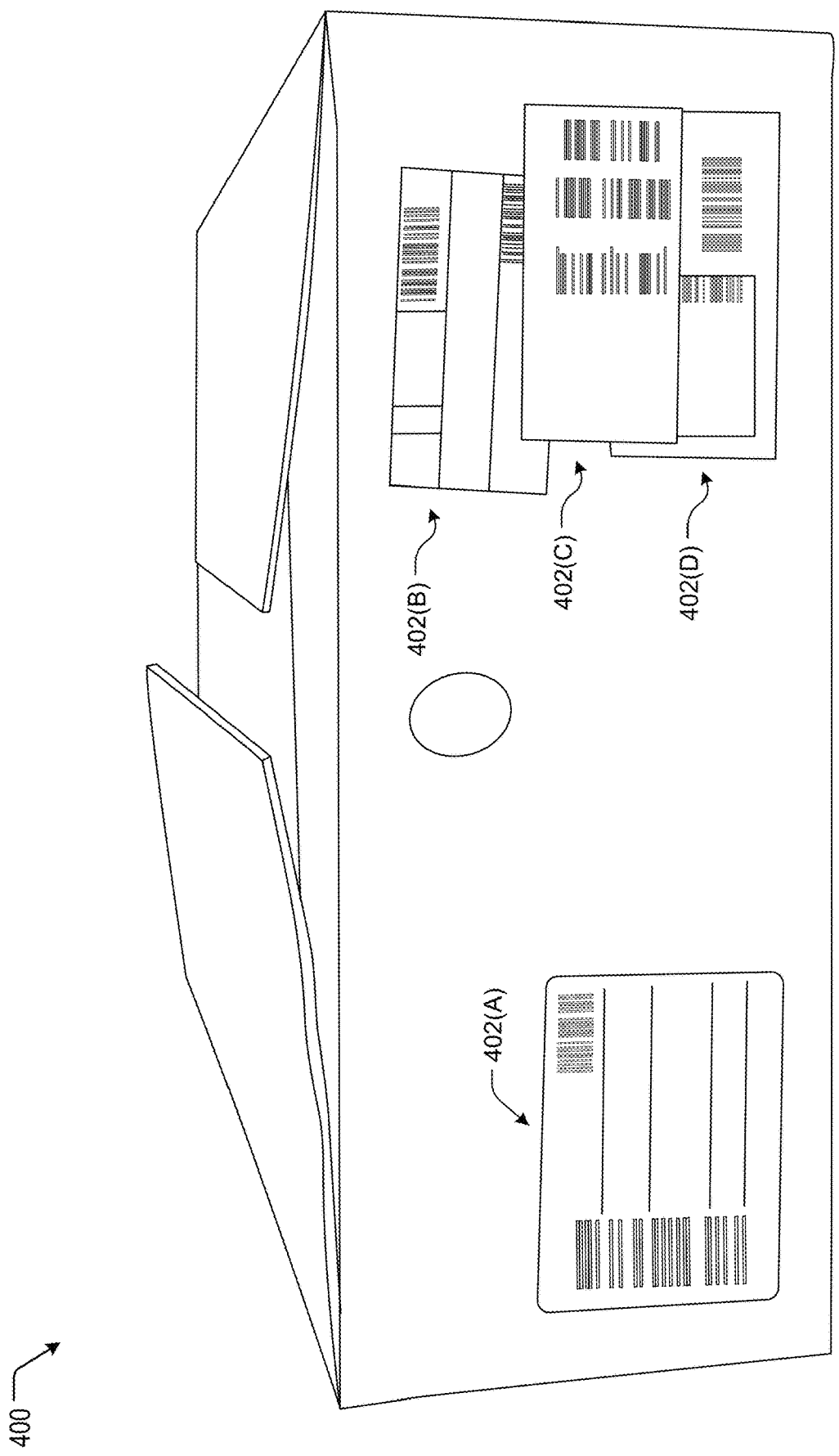
FIG. 4 is an example pictorial view of an item having multiple identifiers, according to some implementations.

FIG. 4 is an example pictorial view of an item 400 having multiple identifiers 402(A)-402(D), according to some implementations. As discussed above, the audit system may determine which label is correct and in some cases cause a printer to generate new labels to cover one or more of the existing labels 402(A)-(D) to thereby prevent an inadvertent scanning of the wrong label upon delivery of the item and, accordingly, a return of a correctly delivered item. In this example, the system may detect that the labels 402(B) and 402(D) are under label 402(C). Accordingly, the system may determine that the labels 402(B) and 402(D) are old or associated with another item shipped within the same packaging, such as a prior shipment.

In some cases, such as the one illustrated, two labels 402(A) and 402(C) may be on overlapping. In these cases, the system may determine the identity associated with each label 402(A) and 402(C). The system may also classify the item and/or packaging 400 via one or more machine learned models. The system may then determine if either label 402(A) or 402(C) match the classification. In some case, if the system is unable to identify the correct label 302(A) or 402(C), the system may instruct an operator to perform a manual inspection and scanning of the correct label. For instance, the operator may remove the items 400 from the packaging determine the identity and the correct label 402 (A) or 402(C) by scanning and confirming via a user device.

Once the correct label is determined, the system may cause new labels to print and provide instructions to the operator to place the new labels over the labels 402(A), 402(B), 402(C) and/or 402(D). In some examples, the system may capture sensor data associated with the placement of the new labels or the item 400 after the labels are placed, such that the system may confirm the correct placement prior to shipping.

Figure 5:
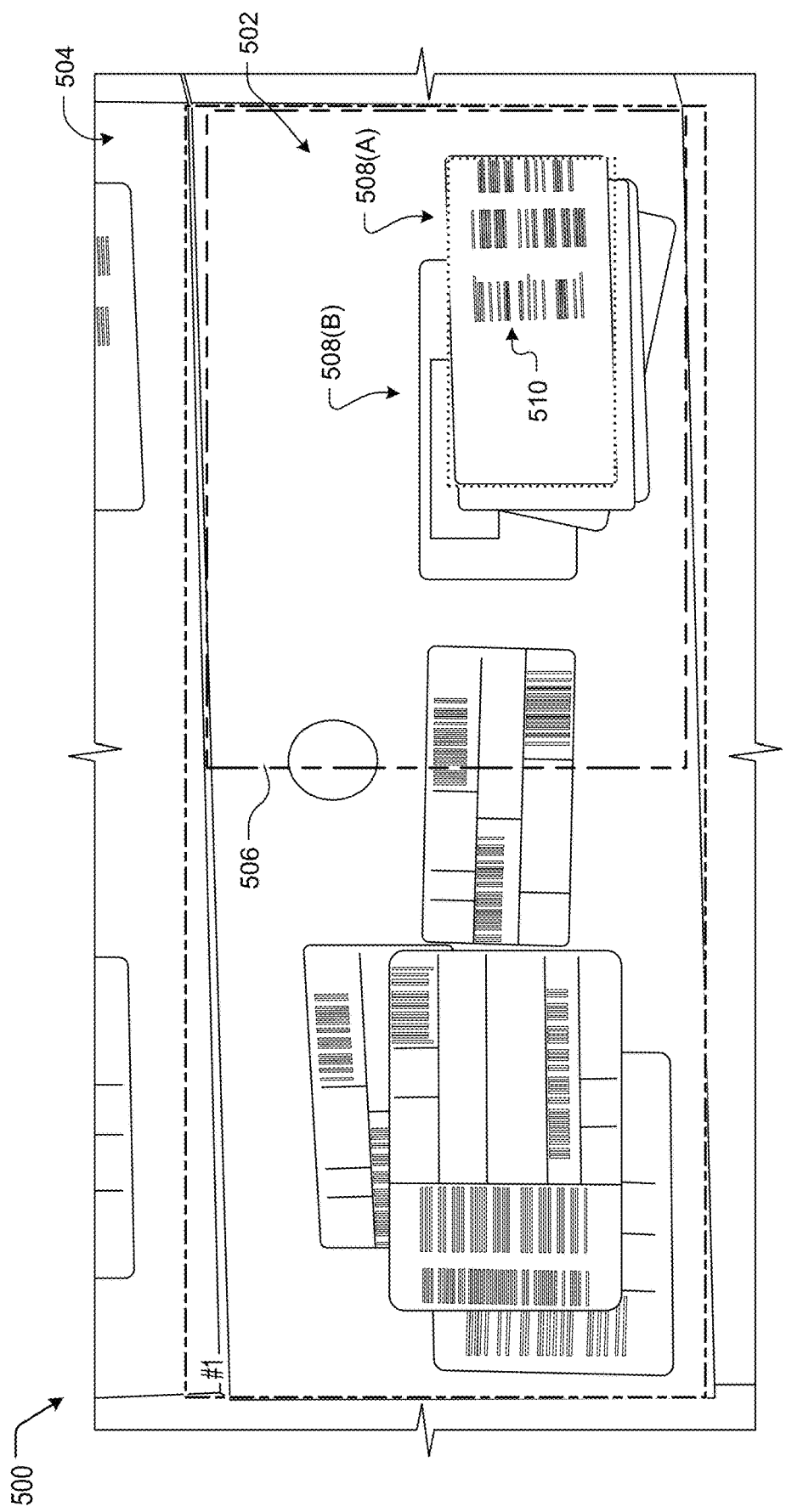
FIG. 5 is an example pictorial view of an item having multiple identifiers, according to some implementations.

FIG. 5 is an example pictorial view 500 of an item having multiple identifiers, according to some implementations. As discussed above, the audit system may determine which label is correct in order to read the correct identifiers for the item 502. In this example, the system may detect the item 502 from multiple items, such as in the example, if another item 504 is stacked atop the item 502.

The system may also segment the item 502 into regions, such as a left region and right region or top region and bottom region, based on customer or shipper data associated with where to expect the label. In this example, the system may select the right region 506 as the region that includes the correct identifier based at least in part on the customer data.

In this example, the region 506 still includes multiple labels, such as the labels 508(A) and 508(B). In some examples, the system may identify the top label, e.g., label 508(A), as the correct label based on its position relative to other labels, such as label 508(B). The system may also utilize the multiple identifiers, generally indicated by 510, on the label 508(A) together with text or other content on the item 502 to determine the identity of the item 502. For example, the multiple identifiers 510 may include overlapping portions that can be verified with each other to confirm the identity of the item 502 or that each identifier belongs to the same label. In some cases, the label 508(A) may also include text, such as checksums, that can be used to validate the identifiers 510 as current, correct, and/or accurate.

In one example, one or more of the identifiers 510 may be damaged or obstructed. In these cases, the system may utilize the data from any remaining scannable portion of the damaged identifier 510, the order list, the other identifiers 510, and/or text/images on the item 502 to identity the item and/or determine the content of the damaged identifier 510.

In some cases, the system may also classify the item and/or packaging 502 via one or more machine learned models. The system may then determine if either label 508(A) and 508(B) matches the classification. In some case, if the system is unable to identify the correct label 508(A) and 508(B), the system may instruct an operator to perform a manual inspection and scanning of the correct label. For instance, the operator may remove the items 502 from the packaging determine the identity and the correct label 508(A) and 508(B) by scanning and confirming via a user device.

FIGS. 6-13 are flow diagrams illustrating example processes associated with the audit systems discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processor(s), perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 6:
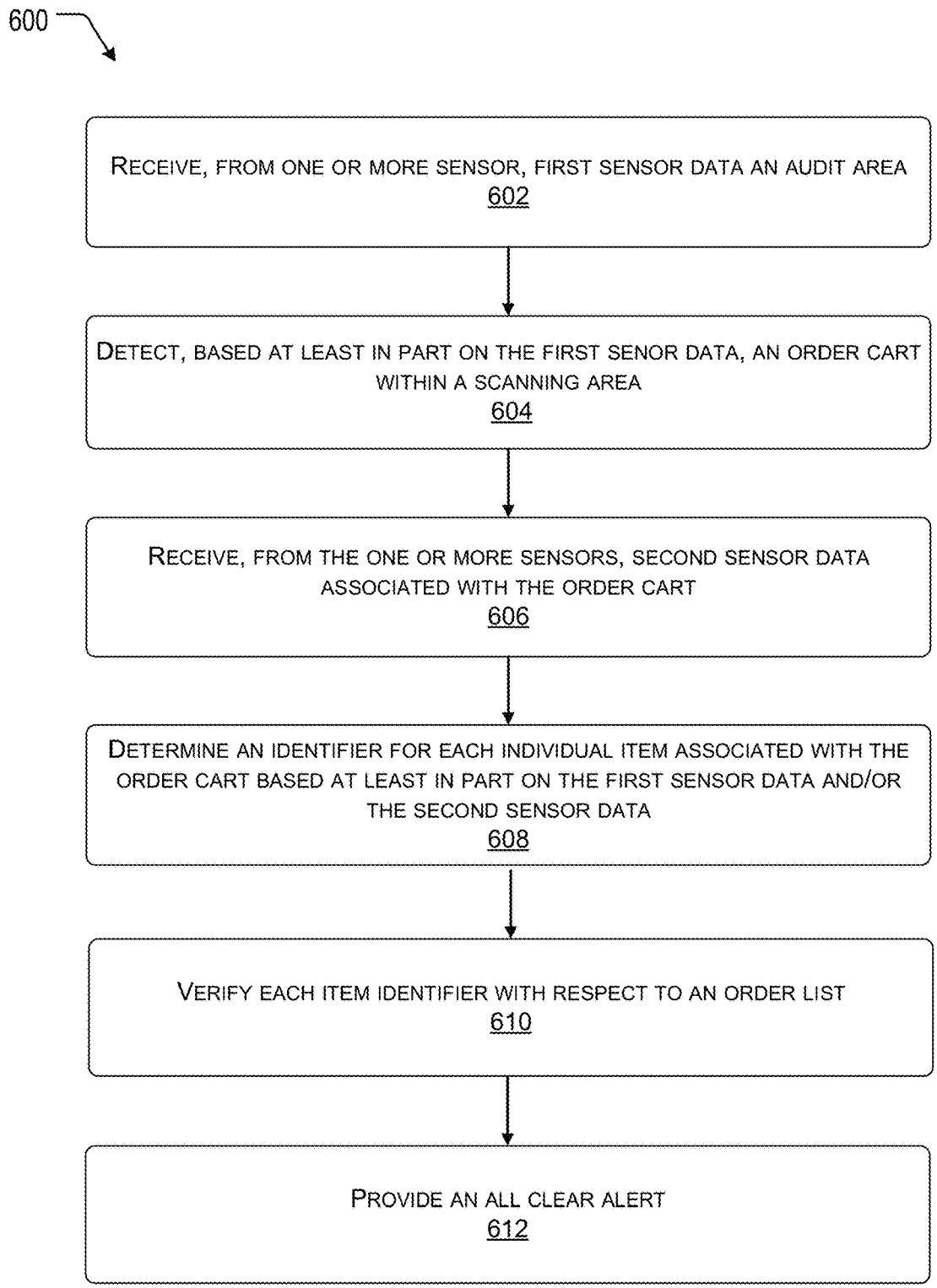
FIG. 6 is a flow diagram illustrating an example process associated with auditing an order cart, according to some implementations.

FIG. 6 is a flow diagram illustrating an example process 600 associated with auditing an order cart, according to some implementations. In the current example, an order cart may be placed within or passed through an audit area. The system may capture sensor data via one or more sensors of the order cart and any items located thereupon.

At 602, the system may receive, from one or more sensors, first sensor data associated with an audit area. For example, the sensor data may be image data of an order cart and/or the individual items current located on the order cart that is placed within the audit area. In some cases, the sensor data may include depth data, weight data (e.g., a floor sensor detecting the weight of the order cart), contact data (e.g., a wheel of a cart contacting a floor sensor).

At 604, the system may detect an order cart within a scanning area. For example, the system may utilize the first sensor data to determine that a cart is present in the audit area.

At 606, the system may receive, from the one or more sensors, second sensor data associated with the order cart. In one example, the second sensor data may be image data captured by one or more sensors associated with a partition of the order cart, as discussed above. As an illustrative example, the second sensor data may include data associated with each individual package or two or more defined regions associated with the order cart. In some cases, the system may determine the regions assisted with the second sensor data based at least in part on the first sensor data. For instance, the system may determine features of the cart, such as a size, type, class or the like of the order cart, as well as features of the items, such as size, number, position, class, type of the items on the cart. The system may then determine the regions based on the features of the cart and/or the items. In some cases, the second sensor data may include a partition of the first sensor data into data associated with individual items or packages, such as a segmentation of an image into smaller sections.

At 608, the system may determine an identifier for each individual item associated with the order cart based at least in part on the first sensor data and/or the second sensor data. For example, the system may determine the identity of each item by detecting a label or other identifier on each item within the first sensor data and/or the second sensor data.

At 610, the system may verify each item identifier with respect to an order list. For example, the system may compare each detected identifier with an expected identifier on the order list associated with the order cart. In some cases, the system may utilize a detected identifier on the order cart to select the order list from a plurality of orders being filled by facility operators and/or systems.

At 612, the system may provide an all clear alert to the operator. For example, the system may verify each of the items with the order list and if the order is complete and correct (e.g., no missing items, no additional items, and all items have a correct label or identifier), the system may provide to a user device associated with the operator of the order cart and/or display associated with the audit area a notification or alert that the operator may proceed to load the items onto a transport vehicle for delivery.

Figure 7:
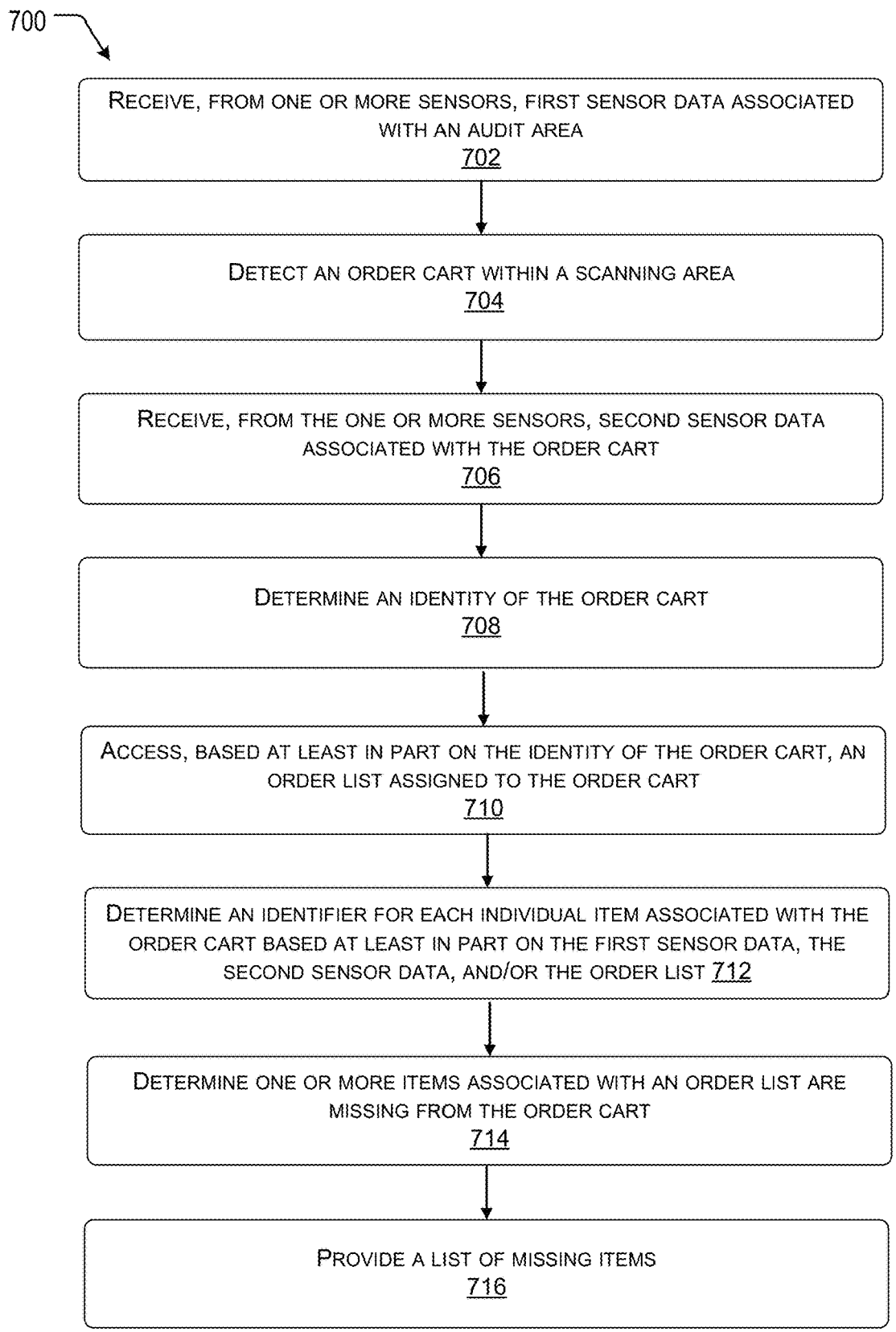
FIG. 7 is another flow diagram illustrating an example process associated with auditing an order cart, according to some implementations.

FIG. 7 is another flow diagram illustrating an example process 600 associated with auditing an order cart, according to some implementations. In the current example, an order cart may be placed within or passed through an audit area. The system may capture sensor data via one or more sensors of the order cart and any items located thereupon.

At 702, the system may receive, from one or more sensors, first sensor data associated with an audit area. For example, the sensor data may be image data of an order cart and/or the individual items current located on the order cart that is placed within the audit area. In some cases, the sensor data may include depth data, weight data (e.g., a floor sensor detecting the weight of the order cart), contact data (e.g., a wheel of a cart contacting a floor sensor).

At 704, the system may detect an order cart within a scanning area. For example, the system may utilize the first sensor data to determine that a cart is present in the audit area.

At 706, the system may receive, from the one or more sensors, second sensor data associated with the order cart. In one example, the second sensor data may be image data captured by one or more sensors associated with a partition of the order cart, as discussed above. As an illustrative example, the second sensor data may include data associated with each individual package or two or more defined regions associated with the order cart. In some cases, the system may determine the regions assisted with the second sensor data based at least in part on the first sensor data. For instance, the system may determine features of the cart, such as a size, type, class or the like of the order cart, as well as features of the items, such as size, number, position, class, type, of the items on the cart. The system may then determine the regions based on the features of the cart and/or the items. In some cases, the second sensor data may include a partition of the first sensor data into data associated with individual items or packages, such as a segmentation of an image into smaller sections.

At 708, the system may determine the identity of the order cart. For example, the order cart may include a cart identifier or other visual indication (such as color, strips, alpha-numerical characters, scannable code, or the like) and the system may determine the identity by detecting the identifier within the first sensor data and/or the second sensor data. In other cases, the system may determine the identity based on a wireless signal transmitted by the order cart, the presence of an assigned facility operator (e.g., biometric identity, employee badge, proximity of a device associated with an assigned operator, or the like), a user input of an identifier at a device associated with the scanning area, or the like.

At 710, the system may access data associated with an order list assigned to the order cart. For example, the system may access a datastore that includes details or item information for each item that is assigned to an order.

At 712, the system may determine an identifier for each individual item associated with the order cart based at least in part on the first sensor data, the second sensor data, and/or the order list. For example, the system may determine the identity of each item by detecting a label or other identifier on each item within the first sensor data and/or the second sensor data and compare the identifiers to identifier of the order list.

At 714, the system may determine one or more items associated with an order list are missing from the order cart. For example, the system may compare the items identified with respect to the order cart to one or more identifier within the order list. In some cases, the system may also determine a number of items on the order cart is less than an expected number.

At 716, the system may provide a list of missing items to an operator of the order cart. For example, the list may be provided via a user device associated with the operator and/or via a display associated with the audit area.

Figure 8:
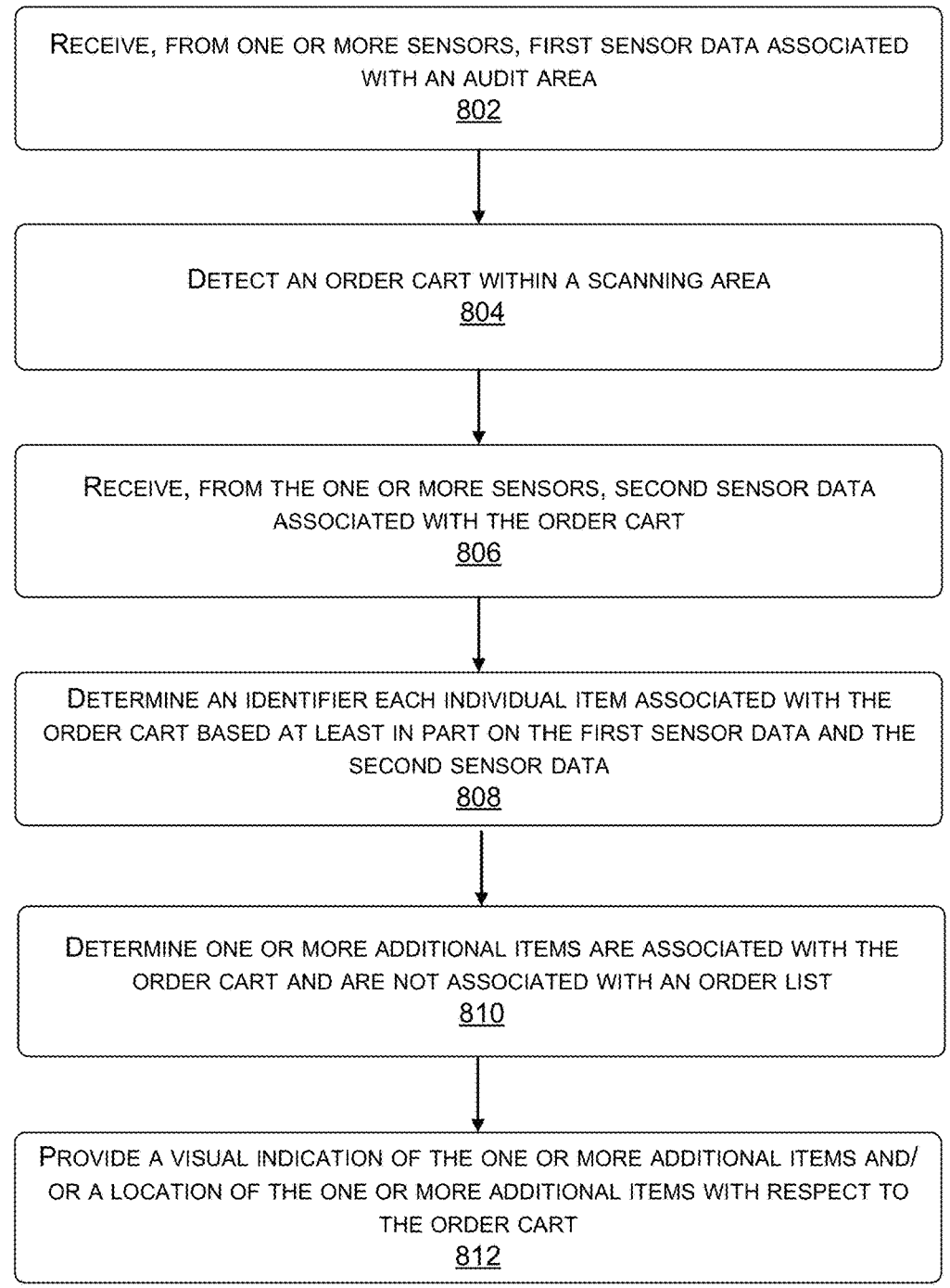
FIG. 8 is another flow diagram illustrating an example process associated with auditing an order cart, according to some implementations.

FIG. 8 is another flow diagram illustrating an example process 700 associated with auditing an order cart, according to some implementations. In the current example, an order cart may be placed within or passed through an audit area. The system may capture sensor data via one or more sensors of the order cart and any items located thereupon.

At 802, the system may receive, from one or more sensors, first sensor data associated with an audit area. For example, the sensor data may be image data of an order cart and/or the individual items current located on the order cart that is placed within the audit area. In some cases, the sensor data may include depth data, weight data (e.g., a floor sensor detecting the weight of the order cart), contact data (e.g., a wheel of a cart contacting a floor sensor).

At 804, the system may detect an order cart within a scanning area. For example, the system may utilize the first sensor data to determine that a cart is present in the audit area.

At 806, the system may receive, from the one or more sensors, second sensor data associated with the order cart. In one example, the second sensor data may be image data captured by one or more sensors associated with a partition of the order cart, as discussed above. As an illustrative example, the second sensor data may include data associated with each individual package or two or more defined regions associated with the order cart. In some cases, the system may determine the regions assisted with the second sensor data based at least in part on the first sensor data. For instance, the system may determine features of the cart, such as a size, type, class or the like of the order cart, as well as features of the items, such as size, number, position, class, type, of the items on the cart. The system may then determine the regions based on the features of the cart and/or the items. In some cases, the second sensor data may include a partition of the first sensor data into data associated with individual items or packages, such as a segmentation of an image into smaller sections.

At 808, the system may determine an identifier for each individual item associated with the order cart based at least in part on the first sensor data and/or the second sensor data. For example, the system may determine the identity of each item by detecting a label or other identifier on each item within the first sensor data and/or the second sensor data.

At 810, the system may determine one or more additional items are associated with the order cart and are not associated with the order list. For example, the system may compare the items identified with respect to the order cart to one or more identifier within the order list. In some cases, the system may also determine a number of items on the order cart is more than an expected number.

At 812, the system may provide a visual indication of the one or more additional items and/or a location of the one or more additional items with respect to the order cart. For example, the system may generate a model of the order cart and the items currently associated with the order cart based at least in part on the first and/or second image data. The system may highlight the additional item within the model and present the model and the highlighted item on a display (e.g., a display associated with the audit area, a triage area, and/or a user device).

Figure 9:
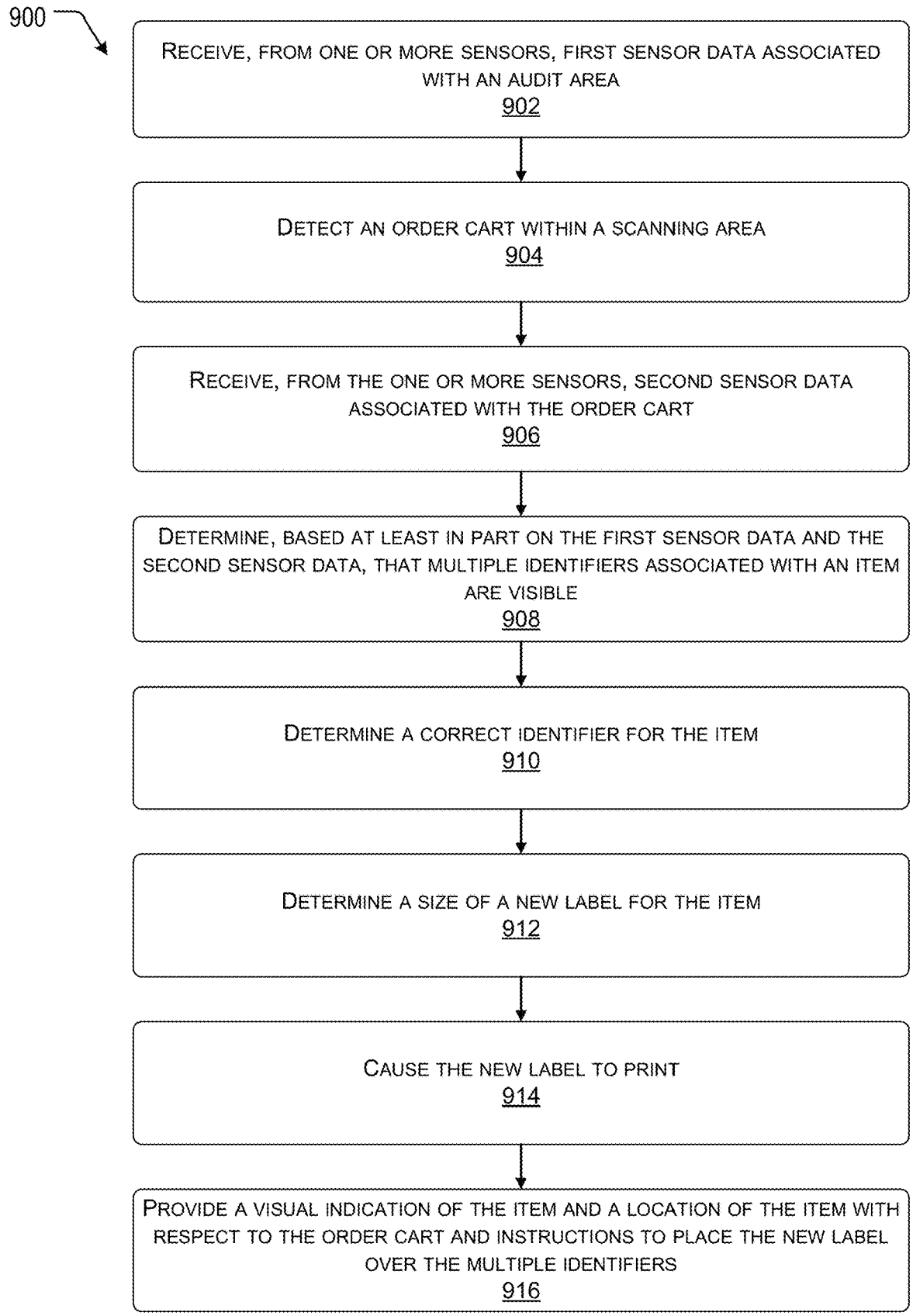
FIG. 9 is another flow diagram illustrating an example process associated with auditing an order cart, according to some implementations.

FIG. 9 is another flow diagram illustrating an example process 800 associated with auditing an order cart, according to some implementations. In the current example, an order cart may be placed within or passed through an audit area. The system may capture sensor data via one or more sensors of the order cart and any items located thereupon.

At 902, the system may receive, from one or more sensors, first sensor data associated with an audit area. For example, the sensor data may be image data of an order cart and/or the individual items current located on the order cart that is placed within the audit area. In some cases, the sensor data may include depth data, weight data (e.g., a floor sensor detecting the weight of the order cart), contact data (e.g., a wheel of a cart contacting a floor sensor).

At 904, the system may detect an order cart within a scanning area. For example, the system may utilize the first sensor data to determine that a cart is present in the audit area. In some cases, the system may also utilize the first sensor data to determine an orientation of each item (or package of items) on the cart. For example, the system may utilize one or more models, such as machine learned models, to determine the orientation of individual item. The system may then utilize the orientation in assisting with determining or understanding correlations of labels or label data to items.

At 906, the system may receive, from the one or more sensors, second sensor data associated with the order cart. In one example, the second sensor data may be image data captured by one or more sensors associated with a partition of the order cart, as discussed above. As an illustrative example, the second sensor data may include data associated with each individual package or two or more defined regions associated with the order cart. In some cases, the system may determine the regions assisted with the second sensor data based at least in part on the first sensor data. For instance, the system may determine features of the cart, such as a size, type, class or the like of the order cart, as well as features of the items, such as size, number, position, class, type, of the items on the cart. The system may then determine the regions based on the features of the cart and/or the items. In some cases, the second sensor data may include a partition of the first sensor data into data associated with individual items or packages, such as a segmentation of an image into smaller sections.

At 908, the system may determine, based at least in part on the first sensor data and/or the second sensor data, that multiple identifiers associated with an item are visible. For example, the sensor data may include image data that has multiple identifiers or bar codes that may be read by the system and compared to each other to determine that the two or more identifiers differ.

At 910, the system may determine a correct identifier for the item. For example, the system may classify the item using one or more machine learned models. The system may also compare the multiple detected identifiers to identifiers on an order list to see if one or more of the identifiers match an expected item. If multiple identifiers match the order list the system may utilize the machine learned models to classify the item. In some cases, the machine learned models may also receive one or more item models associated with the identifiers matching the order list.

At 912, the system may determine a size of a new label for the item and at, 914, the system may cause the new label to print. For example, the system may determine a size of the label based on a size of the one or more labels and/or a bounding box applied to the one or more existing labels. In some cases, the system may generate multiple new labels, such as when the existing labels are on different surfaces of the item and/or greater than or equal to a distance threshold. For instance, if a bounding box associated with one or more first existing labels is greater than or equal to a distance threshold from a bounding box associated with one or more second existing labels, the system may define a size and print two labels, one associated with the one or more first existing labels and one associated with the one or more second labels.

At 916, the system may provide a visual indication of the item and a location of the item with respect to the order cart and instructions to place the new label over the multiple identifiers. For example, the system may cause a visual indication or model of the cart and/or item to be displayed on a display device associated with the audit area and/or a user device associated with the cart operator. The system may, in some cases, capture third sensor data as the operator places the new labels on the item. In this manner, the system may cause new labels to be placed in a manner to prevent an inadvertent scanning of one of the incorrect existing identifiers.

In some cases, the system may also request the operator place the item at a specified location away from the cart and/or to hold and rotate the item so that the system may ensure no additional existing labels are present prior to indicating to the operator to proceed with shipping the items.

Figure 10:
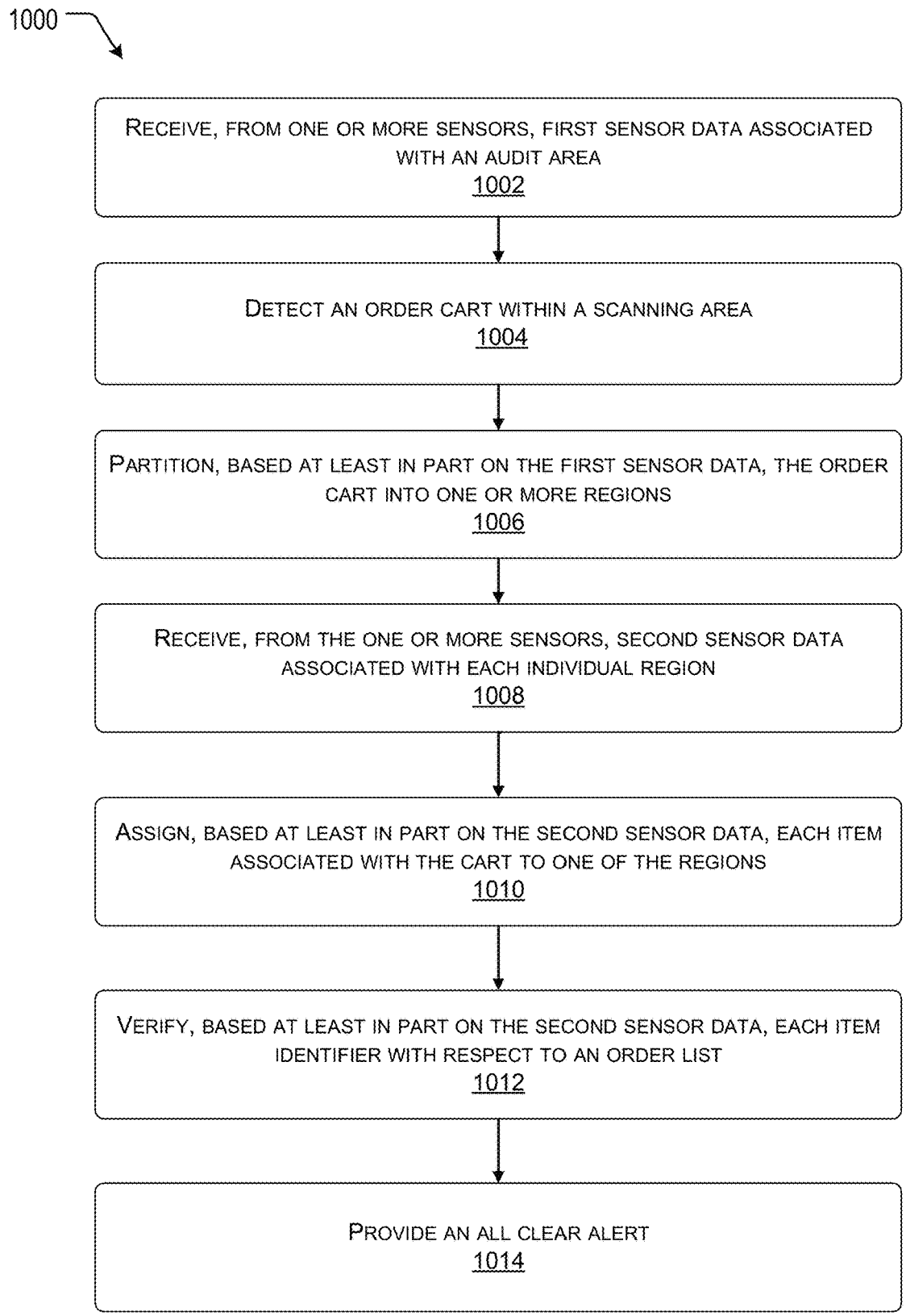
FIG. 10 is another flow diagram illustrating an example process associated with auditing an order cart, according to some implementations.

FIG. 10 is another flow diagram illustrating an example process 900 associated with auditing an order cart, according to some implementations. In some cases, the system may be configured to capture sensor data associated with the order cart in parts. For instance, the system may partition the cart into discretized regions and cause the sensors to capture sensor data (such as zoomed sensor data) associated with each region.

At 1002, the system may receive, from one or more sensors, first sensor data associated with an audit area. For example, the sensor data may be image data of an order cart and/or the individual items currently located on the order cart that is placed within the audit area. In some cases, the sensor data may include depth data, weight data (e.g., a floor sensor detecting the weight of the order cart), contact data (e.g., a wheel of a cart contacting a floor sensor).

At 1004, the system may detect an order cart within a scanning area. For example, the system may utilize the first sensor data to determine that a cart is present in the audit area.

At 1006, the system may partition, based at least in part on the first sensor data, the order cart into one or more regions. For example, the regions may be predefined based on a stored model of the order cart and/or determined dynamically based on determined characteristics of the cart, determined characteristics of the items, expected characteristics of the items (e.g., expected characteristics from the order list), and/or arrangements of the items with respect to each other and/or the order cart.

At 1008, the system may receive, from the one or more sensors, second sensor data associated with each individual region. In one example, the second sensor data may be image data captured by one or more sensors for each region, such as by panning, tilting, and zooming the one or more sensors, as discussed above.

At 1010, the system may assign, based at least in part on the second sensor data, each item associated with the cart to one of the regions. For example, if an item is present in two or more regions, the system may assign the item to one of the two regions based on, for example, an amount of the item associated with each region, the location of the label or identifier, an amount of a label or identifier within each region, and the like.

At 1012, the system may verify each item identifier with respect to an order list. For example, the system may compare each detected identifier with an expected identifier on the order list associated with the order cart. In some cases, the system may utilize a detected identifier on the order cart to select the order list from a plurality of orders being filled by facility operators and/or systems.

At 1014, the system may provide an all clear alert to the operator. For example, the system may verify each of the items with the order list and if the order is complete and correct (e.g., no missing items, no additional items, and all items have a correct label or identifier), the system may provide to a user device associated with the operator of the order cart and/or display associated with the audit area a notification or alert that the operator may proceed to load the items onto a transport vehicle for delivery.

Figure 11:
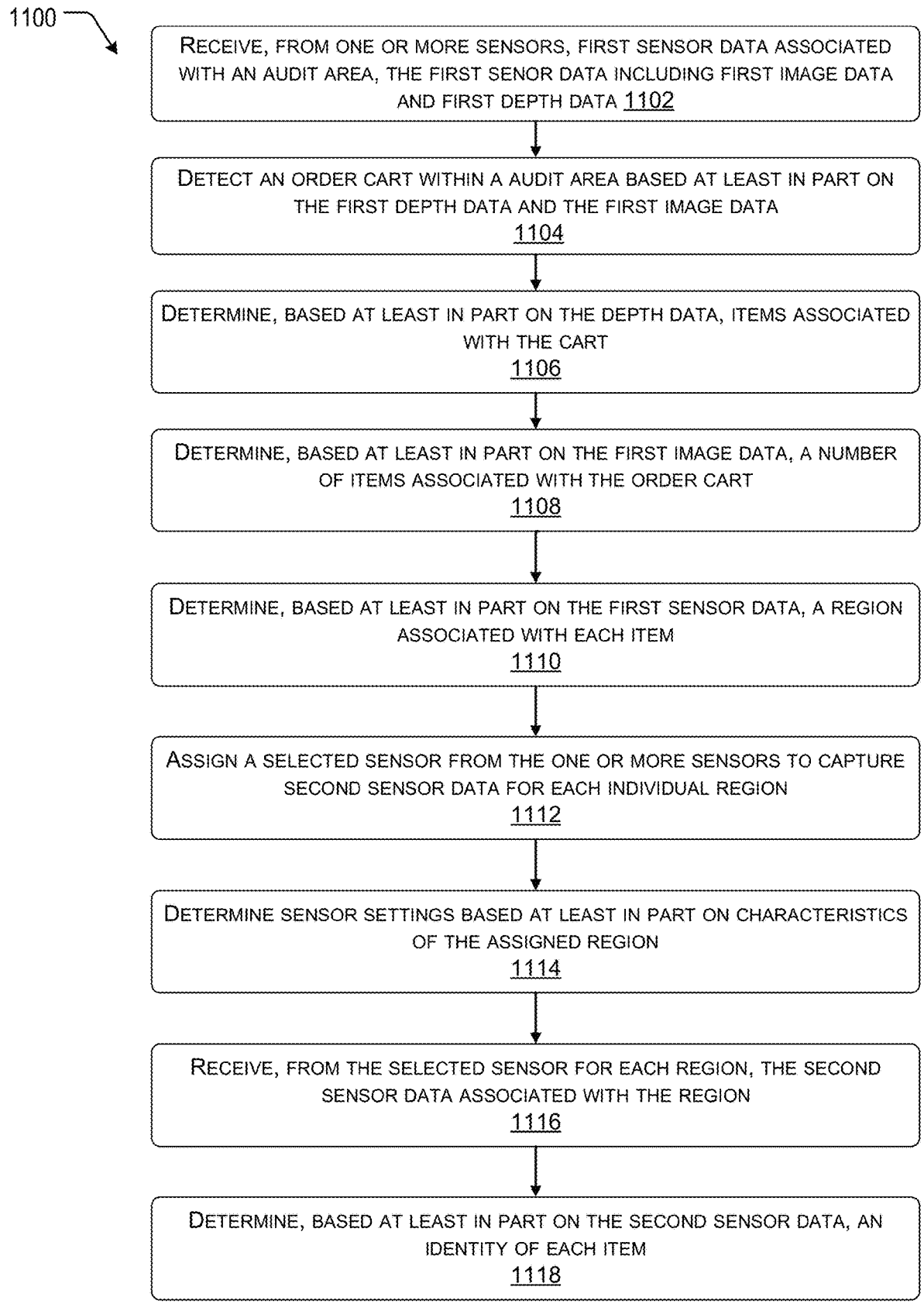
FIG. 11 is another flow diagram illustrating an example process associated with auditing an order cart, according to some implementations.

FIG. 11 is another flow diagram illustrating an example process 1100 associated with auditing an order cart, according to some implementations. In this example, the system may utilize multiple sensors, such as pan tilt zoom (PTZ) cameras to determine the identity of each item associated with an order cart.

At 1102, the system may receive, from one or more sensors, first sensor data associated with an audit area, the first sensor data including first image data and first depth data.

At 1104, the system may detect an order cart within the audit area based at least in part on the first depth data and the first image data. for example, the system may detect a change between the first depth data and an expected depth or the like. in other cases, the system may segment and/or classify the image data and detect the order cart within the segmented/classified data.

At 1106, the system may determine, based at least in part on the depth data, items associated with the cart. For example, the depth data may represented a number of items associated with the order cart and at least one additional item that is associated with the background, such as on a shelf, being carried by a facility operator, associated with a second order cart awaiting entry into or exiting the audit area, a second order cart in proximity to the audit area or the like. Thus, the system may utilize the depth data associated with the order cart and the depth data associated with each identified, segmented, and/or classified item to determine if the item is associated with or belongs to the set of items belonging to the cart.

At 1108, the system may determine, based at least in part on the first image data, a number of items belonging to the cart. For example, the system may segment the image data that corresponds to items having depth data associated with the cart into a number of distinct items or regions. The system may then number or assign codes to each of the distinct items. In some case, the number assigned to each item may be ordered, such as numerically or alphabetically. In some cases, the system may also utilize the first sensor data to determine an orientation of each item (or package of items) on the cart. For example, the system may utilize one or more models, such as machine learned models, to determine the orientation of individual item. The system may then utilize the orientation in assisting with determining or understanding correlations of labels or label data to items.

At 1110, the system may determine a region associated with each item. For example, the numbered items may be assigned bounding boxes that may defined an associated region. The regions may be adjacent to one or more other regions in a pattern that is discernable to the system based on the numbering assigned to the items. In some cases, a size, depth, and other characteristics of each region may be determined. In some examples, the system may determine a region within a first local coordinate associated with the first sensor and/or the first sensor data. The system may then covert the first local coordinates to a world or global coordinate system. Then the system may covert the global coordinates into a second local coordinates associated with the second sensor or second senor data assigned to capture the second sensor data of the specific region. For example, the system may utilize known distances, parameters between sensor positions in the physical environment as well as sensor settings or characteristics to covert between coordinate systems. In some cases, the system my utilize pixel counting and overlapping sensor data (such as image data). the system may also use projections, projection errors, scaling factors, and the like to covert between the coordinate systems.

At 1112, the system may assign a selected sensor of the one or more sensors to capture second senor data for each individual region. For example, the one or more sensors may include four PTZ cameras in addition to at least one depth camera. The system may assign each of the regions to one of the PTZ cameras. The system may assign the regions based on the proximity to each other, the intrinsic properties of the PTZ cameras (e.g., shutter speed, zoom speed, tilt speed, and the like), a current field of view (e.g., zoom, position, and the like) of the PTZ cameras, and/or the determined characteristics of each region. For example, the system may attempt to optimize the total capture time associated with the second sensor data. in this manner, each PTZ camera may be assigned to a number of regions with an order of capture. The assigned regions and order may be selected or determined by the system to reduce changes in focus (e.g., similar depth regions are assigned to the same PTZ camera), positions (proximate regions are assigned to the same PTZ camera), reduce change in zoom (e.g., similarly size regions may be assigned to the same PTZ camera), and the like. It should be understood that in some cases, the number of regions assigned to each PTZ camera may differ based on the for instance arrangement of the items, size of the items, current settings/characteristics of the PTZ cameras and the like. For instance, one of the PTZ may be used to capture the first senor data and may be further out of focus than the remaining PTZ camera and, thereby, the system may assign fewer regions as the initial focusing and zooming may be more costly in terms of time than the other regions. In some cases, the region or setting of each camera when capturing the zoomed in or item specific sensor data may be determined based at least in part on the orientation data of the individual items.

At 1114, the system may determine sensor settings based at least in part on characteristics of the assigned regions. For example, the determined characteristics of each region may be used to manually focus, zoom, and tilt the camera opposed to using built in auto-focus and auto-zoom features. For example, using the depth data and the bounding box of the region the system may supply values for setting the focus, zoom, or position of the camera without using any internal calibration features of the camera itself. By manually supplying the values, the total capture time associated with the second sensor data may be further reduced.

At 1116, the system may receive, from the selected sensor for each region, the second senor data associated with the region and, at 1118, the system may determine, based at least in part on the second sensor data, an identify of each item. For example, the second sensor data may be configured to be at a zoom in which the identifiers on the item may more easily be determined than using the original first image data.

Figure 12:
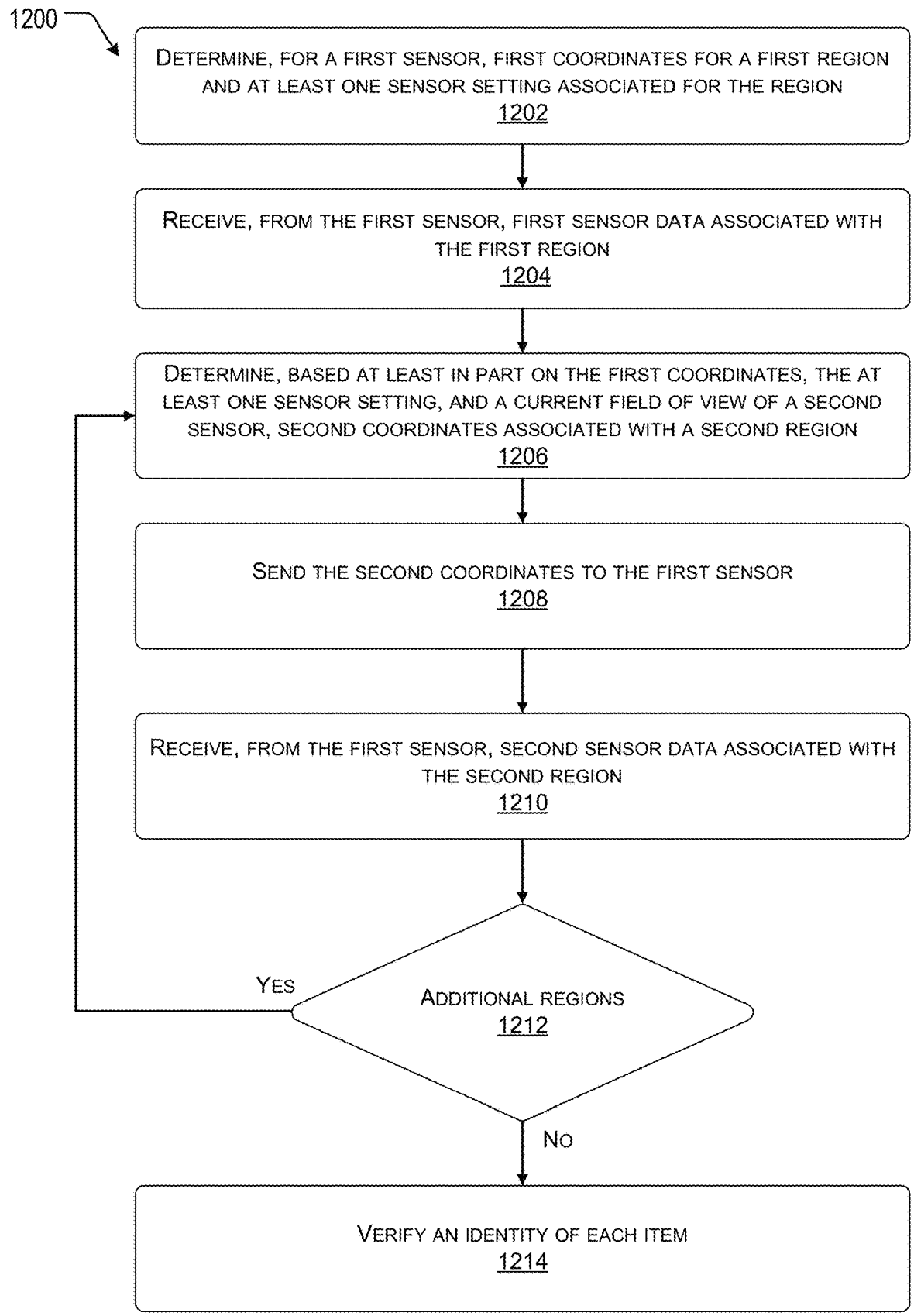
FIG. 12 is another flow diagram illustrating an example process associated with auditing an order cart, according to some implementations.

FIG. 12 is another flow diagram illustrating an example process 1200 associated with auditing an order cart, according to some implementations. In this example, the system may utilize multiple sensors, such as PTZ cameras to determine the identity of each item associated with an order cart.

At 1202, the system may determine for a first sensor, first coordinates for a first region and at least one sensor setting associated with the region. For example, system may utilize characteristics of each region to manually control the settings of the camera opposed to using built in auto-focus and auto-zoom features. For example, using the depth data and the bounding box of the region the system may supply values for setting the focus, zoom, or position of the camera without using any internal calibration features of the camera itself. By manually supplying the values, the total capture time associated with the second sensor data may be further reduced.

At 1204, the system may receive, from the first sensor, first senor data associated with the first region. For example, the first sensor data may be image data associated with the first region based on the settings or setting values supplied to the first sensor. In some cases, the system may utilize the first sensor data to determine the identity of the first item within the first region.

At 1206, the system may determine, based at least in part on the first coordinates, the at least one sensor setting, and a current field of view of a second sensor, second coordinates associated with a second region for the first sensor. For example, the system may assign the regions based on the proximity to each other, the intrinsic properties or the field of view of the first sensor and/or the second senor cameras, and/or the characteristics of a current region and a second region (e.g. a similar depth or the like). For example, the system may attempt to optimize the total capture time associated with the sensor data over the set of regions, as discussed above.

At 1208, the system may send the second coordinate sot the first sensor and, at 1210, the system may receive, from the first sensor, second sensor data associated with the second region. The system may then, at 1212, determine if additional regions are yet to be scanned. If there are additional regions, the process 1200 returns to 1206. Otherwise, the process proceeds to 1214.

At 1214, the system may verify an identity of each item using the captured sensor data. For example, the system may determine the identity of the item based on captured label data associated with the region as discussed herein.

Figure 13:
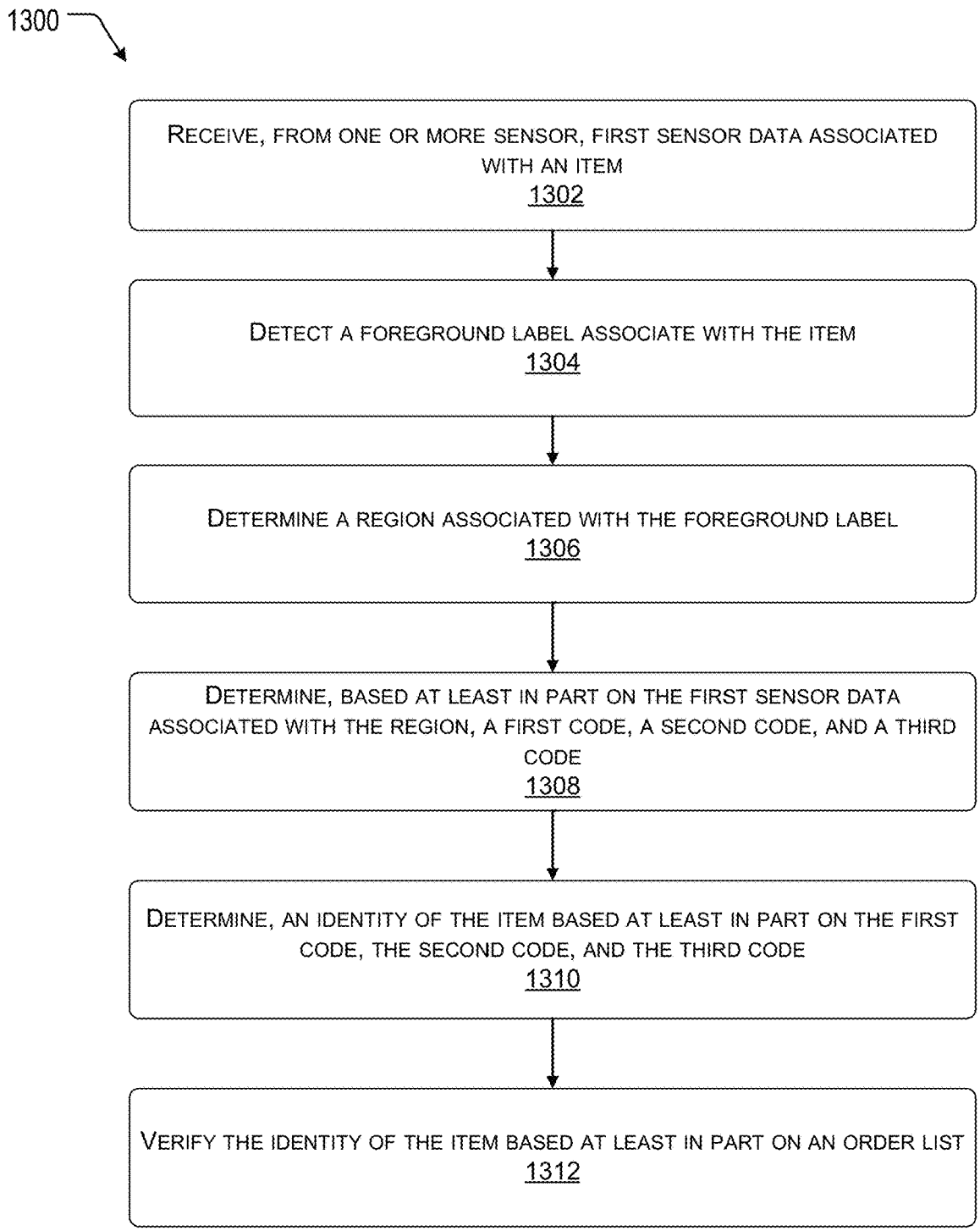
FIG. 13 is another flow diagram illustrating an example process associated with auditing an order cart, according to some implementations.

FIG. 13 is another flow diagram illustrating an example process 1300 associated with auditing an order cart, according to some implementations. As discussed herein, the system may receive sensor data, such as image data, associated with each region or each item detected on the order cart. The system may then determine or verify the identity of the item using the sensor data.

At 1302, the system may receive, from one or more sensor, first sensor data associated with an item. For example, the system may receive the first sensor data associated with a region or bounding box associated with the item. The first sensor data may be at a desired zoom or such that one or more codes, content, text, or the like are machine readable in a reliable fashion. For instance, the first senor data may be at a zoom equal to or greater than a zoom threshold based on prior captured depth data associated with the item.

At 1304, the system may detect a foreground label associated with the item. For example, the system may determine based on the first sensor data a foreground label from a set of one or more labels applied to the items.

At 1306, the system may a region associated with the foreground label. For example, the system may determine region or bounding box associated with the foreground label. It should be understood that the region may be less than a region assigned to the item, such as a region substantially comprised by the label.

At 1308, the system may determine, based at least in part on the first senor data associated with the region, a first code, a second code and a third code. For instance, in the illustrated example, the labels may include a set of three identifiers comprising a UPC and two ITF codes.

At 1310, the system may determine, an identity of the item based at least in part on the first code, the second code, and the third code. For example, the system may be able to verify the identity if one or more of the codes are damage or otherwise unreadable by confirming or cross validating readable portions of one or more of the three codes with each other.

At 1312, the system may verify the identity of the item based at least in part on an order list. For example, the system may compare each detected identifier with an expected identifier on the order list associated with the order cart. In some cases, the system may utilize a detected identifier on the order cart to select the order list from a plurality of orders being filled by facility operators and/or systems.

Figure 14:
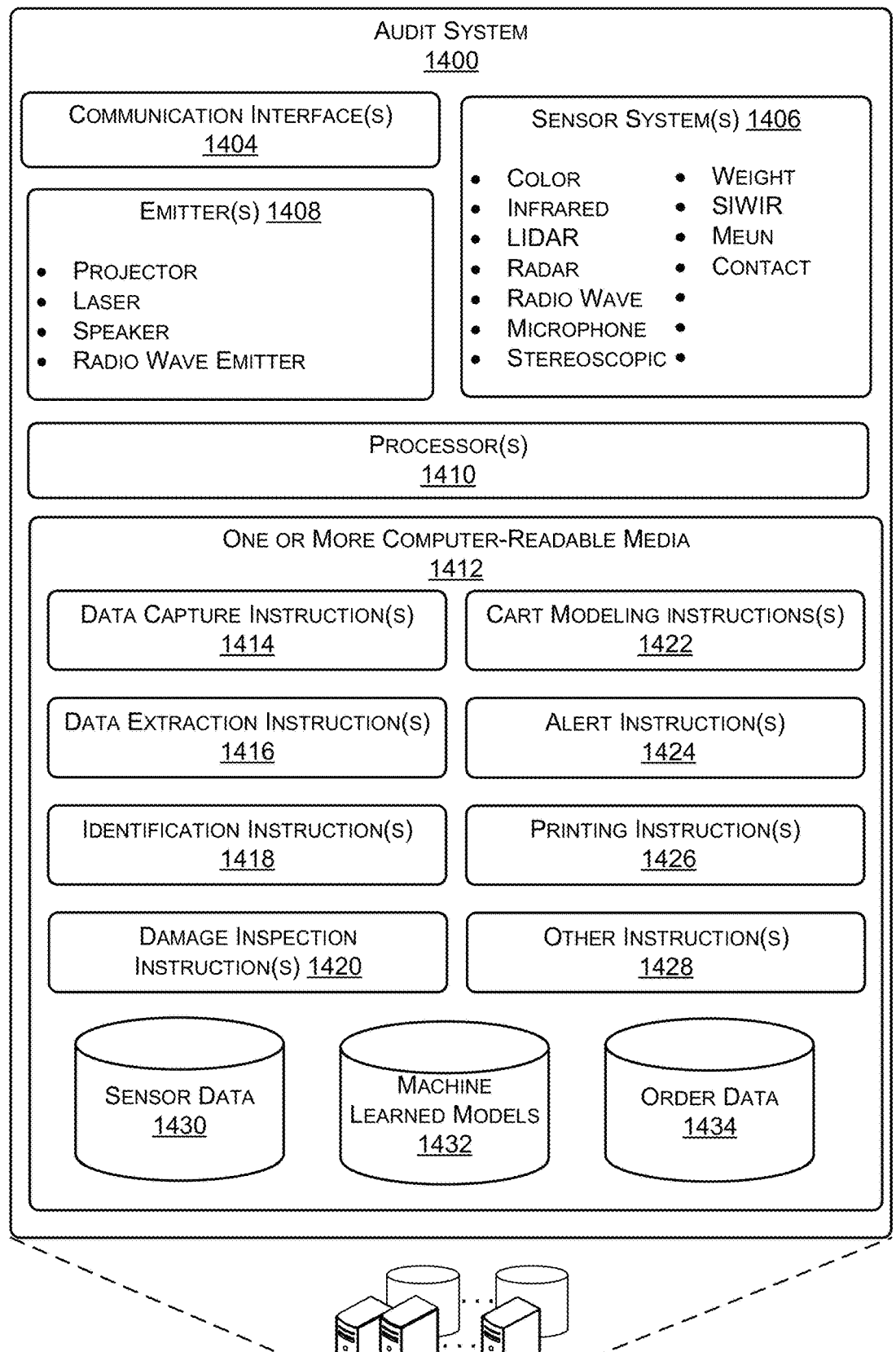
FIG. 14 is an example audit system that may implement the techniques described herein according to some implementations.

FIG. 14 is an example audit system that may implement the techniques described herein according to some implementations. The system 1400 may include one or more communication interface(s) 1404 (also referred to as communication devices and/or modems), one or more sensor system(s) 1406, and one or more emitter(s) 1408.

The system 1400 can include one or more communication interfaces(s) 1404 that enable communication between the system 1400 and one or more other local or remote computing device(s) or remote services, such as a cloud-based service of FIG. 2. For instance, the communication interface (s) 1404 can facilitate communication with other proximate sensor systems and/or other facility systems. The communications interfaces(s) 1404 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The one or more sensor system(s) 1406 may be configured to capture the sensor data 1430 associated with an order cart. In at least some examples, the sensor system(s) 1406 may include thermal sensors, time-of-flight sensors, location sensors, LIDAR sensors, SIWIR sensors, radar sensors, sonar sensors, infrared sensors, cameras (e.g., RGB, IR, intensity, depth, etc.), Muon sensors, microphone sensors, environmental sensors (e.g., temperature sensors, humidity sensors, light sensors, pressure sensors, etc.), and the like. In some examples, the sensor system(s) 1006 may include multiple instances of each type of sensors. For instance, camera sensors may include multiple cameras disposed at various locations.

The system 1400 may also include one or more emitter(s) 1008 for emitting light and/or sound. By way of example and not limitation, the emitters in this example include light, illuminators, lasers, patterns, such as an array of light, audio emitters, and the like.

The system 1400 may include one or more processors 1410 and one or more computer-readable media 1412. Each of the processors 1410 may itself comprise one or more processors or processing cores. The computer-readable media 1412 is illustrated as including memory/storage. The computer-readable media 1412 may include volatile media (such as random access memory (RAM)) and/or nonvolatile media (such as read only memory (ROM), Flash memory, optical disks, magnetic disks, and so forth). The computer-readable media 1412 may include fixed media (e.g., RAM, ROM, a fixed hard drive, and so on) as well as removable media (e.g., Flash memory, a removable hard drive, an optical disc, and so forth). The computer-readable media 1412 may be configured in a variety of other ways as further described below.

Several modules such as instructions, data stores, and so forth may be stored within the computer-readable media 1412 and configured to execute on the processors 1410. For example, as illustrated, the computer-readable media 1412 stores data capture instructions 1414, data extraction instructions 1416, identification instructions 1418, damage inspection instructions 1420, cart modeling instructions 1422, alert instruction 1424, printing instructions 1426, as well as other instructions 1428, such as an operating system. The computer-readable media 1412 may also be configured to store data, such as sensor data 1430, machine learned models 1432, and order data 1434, as well as other data.

The data capture instructions 1414 may be configured to extract image data or other sensor data representing an order cart. For instance, when an order cart is detect entering, traversing, or position within an order cart audit area, the data capture instructions 1414 may be cause the senor system 1406 to control (e.g., adjust parameters, zoom, tilt, pan, or otherwise adjust the sensors) to capture the sensor data 1420 associated with the detected order cart. In some cases, the parameters may be based on the dimensions, size, identity, number of items, current stacking arrangement, or the like.

The data extraction instructions 1416 may be configured to determine features associated each item on the order cart based at least in part on the sensor data 1430 captured according to the data capture instructions 1414. For example, the extraction instructions 1416 may determine the a size, dimensions, orientation, or the like associated with each item.

The identification instructions 1418 may be configured to determine an identity of each item on the order cart based at least in part on the sensor data 1430 and the features identified by the data extraction instructions 1416. For example, the identification instructions 1418 may determine an identity of an item based at least in part on the size, the dimensions, a detected bar code or other identifier, relative position (e.g., stack on top), implied pick order (e.g., top items are picked later than bottom items) or the like. The identification instructions 1418 may also utilize a list of known item or the order list to determine the identity of each item.

The damage inspection instructions 1420 may be configured to determine if one or more of the items are damaged, such as based at least in part on the sensor data 1430 and/or the features identified by the data extraction instructions 1416, such as a dimensions that does not match any item on the order list.

The cart modeling instructions 1422 may be configured to generate a 3D model of the cart that may be displayed to, for instance, an audit operator or facility operator to review. In this manner, the operator may be able to double check or confirm that all items are present on the cart.

The alert instruction 1424 may be configure to generate an alert if one or more items are not identified, missing, or additional. Similarly, the alert instruction 1424 may be configure to generate an alert if one or more items appear to be damaged. In some cases, the alerts may be a message to a device associated with one or more operators.

The printing instructions 1426 may cause a report or forms to be printed when the items on the order cart are confirmed, identified, and approved (e.g., free of damage). The report or from may then be provide to a transit personal such as the operator of the vehicle picking up the items for shipping.

In some implementations, a system for extracting data from documents and labels, such as to assist with identifying items, determining correct identifiers, and distinguishing between unlabeled items is discussed. In particular, the system may be utilized for automating and computerized checking of transit and/or shipping related documents, such as check in and check out processes at entry and exit locations of facilities associated with the logistics and transportation industries. For example, the documents may include various data, such delivery dates, prices, inventory identification (identifiers, quantities, owners, buyers, sellers, and the like), personnel identification (e.g., drivers or other handlers), container identification, customs documents, transport documents, and the like.

The documents may be structured documents, semi-structured documents, and/or unstructured documents. The structured documents may include legible content in specified or known formats and data arrangements and includes proper grammar and sentence structure. The semi-structured documents may include content such as, tables, charts, key value pairs, and other expected data entries. However, in the semi-structured documents the data entries (e.g., table entries, key value entries, and the like) may be handwritten, in multiple languages, and/or contain unexpected key values. The unstructured documents may contain desired content but be handwritten, free form, unformatted, in multiple languages, and the like.

In some examples, pages of the documents may be scanned, copied, or otherwise converted to images or other electronic forms, at various entry and exit locations of facilities associated with the transport industry. Data may then be extracted from the images using a plurality of techniques discussed herein.

For example, the system may be configured to receive the images of the pages (such as via email, scanned document, as part of an image capture, or the like). The system may first perform preprocessing on the images of the pages. For example, the system may remove imperfections (such as food or drink stains, smudges, fingerprints, dirt or water damage, watermarks, ink blocks, and the like) from the images. For example, the system may utilize a machine learned model to segment the images, classify the imperfections and/or the content of the pages, and/or generate bounding boxes associated with the segmented and classified imperfections. The system may then modify brightness, contrast, saturation, and the like with respect to the content (e.g., to darken the content) and the imperfections (e.g., to lighten the imperfections) to improve the output of future optical character recognition techniques.

The system may also determine an upright or vertical position of individual pages or images and, using the detected angle or orientation, rotate the images to align each of the pages/images to the upright or vertical position. For example, the system may detect the bottom and/or top of a page/image based on a content (such as a header, title, footer, page number, and the like). In addition to, or in lieu of the content, the system may also determine the upright or vertical position using an analysis of the content (e.g., words and characters), in some cases, with respect to an edge of the image. For instance, many characters have a vertical or upright component that typically aligns with an upright position of the page (particularly, with respect to machine generated text). Thus, the system may utilize various heuristic or rule based techniques and/or machine learned models/networks to detect the machine generated content or text and determine a upright vector associated with particular portions of the text. In other cases, the system may detect lines (either implicated, such as the edge of a paragraph, or physical, such as the edge of a table) and utilize a vector associated with the line as the upright position.

In some cases, the system may utilize multiple techniques discussed above to generate an upright position and/or angle of the page. The system may assign a confidence value or score to each of the techniques and then align the page/image with the upright position based on the output of the multiple techniques and the confidence values associated with each. For example, often when capturing image data and/or scanning multiple pages of a document or documents, it is difficult to align each page to the same upright or vertical position (e.g., one or more of the pages is imaged at an angle with respect to the others), particularly, if one page is 180 degrees opposite the others. Thus, by utilizing multiple techniques, the upright position may be disambiguated from other possible alignments generated by an individual technique.

The preprocessing performed by the system may also be configured to order or arrange the pages/images in a desired manner. For example, the documents may be out of order or become intermingled with other documents (e.g., a page of a first document is scanned or imaged between pages of a second document). In these examples, the preprocessing may identify or classify each image/page as belonging to a particular document and/or of a particular type. The system may then sort the images/pages based on the class and/or type. In some cases, the system may also identify page numbers or matching content and order the images/pages based on the identified page numbers and/or matching content, such that each page is associated with a corresponding document and the pages of each document are in order. In some cases, the system may utilize one or more machine models or network to order and sort the images/pages of the documents. The system may utilize confidence values associated multiple techniques to classify, sort, and/or order the pages. Then the system may generate the output arrangement based at least in part on the confidence values of the multiple techniques.

In some cases, the preprocessing may also determine overrides or governing documents. For example, the images/pages may be received as an attachment to an email. In some cases, the body of the email may include content that overrides or modifies the attachment (such as an updated delivery date, updated inventory count, or the like). In some examples, the system may parse the email content to detect any overrides or changes included.

Once the preprocessing is complete, the system may perform optical character recognition on individual images of the pages of the document(s). During optical character recognition, the system may detect text. For instance, the system may utilize multiple techniques for text detection. In one example, the system may detect the text based content of the image/page and generate bounding boxes around the text in order to generate defined regions or text boxes. The system, may also at this time, detect and assign a language associated with the document. The system may also determine if the content is in multiple languages, as is often common in international trade and customs documents. The system may then select and apply one or more optical character recognition techniques based on the quality of the defined region or text boxes and the language(s) assigned. For instance, one or more of the optical character recognition techniques may include applying a machine learned model/network and/or a dictionary based technique in which the model, network, and/or dictionary are selected based on the one or more languages assigned.

As an example of an optical character recognition technique, the system may perform a first text recognition technique on character by character basis and a second text recognition technique on word by word basis. In this example, the system may generate a vector for individual characters in the first technique and individual words in the second technique. The results of the first technique and the second technique may then be merged to generate the machine readable text or content. By utilizing the word based or second technique, words may be more quickly and efficiently defined, and the corresponding machine readable text generated. Additionally, using the word based technique spelling errors may be detected and spelling corrections may be applied, and word dictionaries in the selected language may be applied to improve the output of the machine readable text.

However, simply using the word based technique may result in misclassification for single character words and/or similar words and numbers (such as the number "1" and the word "I" in English). In particular, many transit, shipping, and customs forms include alpha-numerical serial numbers that are unique, not present in a dictionary, and may include numbers as well as letters in the same string of characters. Accordingly, by using the character based technique, the system may more reliably identify individual characters of a string and thereby provide more accurate data extraction.

Once the machine readable content has been generated, the system may determine duplicative content and/or aliases for the content. For example, many international documents may have the same content in multiple languages, such as the origin language and the destination language. In these cases, the system may be able to both confirm the content as accurate across both languages and then remove the content in one or more of the languages to reduce processing and improve accuracy associated with the data extraction. For instance, the system may convert the machine readable content to a consistent language (such as a predominate language within the content) and compare the content of the various languages to determine one or more matches. If a match is detected, the content can be confirmed as accurate and the copies, filter or otherwise, removed from the document to, as discussed above, improve processing.

The system may also assign aliases using one or more aliases dictionaries. For example, in some documents the term "ship to" may be used as a standard designation for the term "destination". In this example, the system may identify the corresponding terms within the dictionary and assign each the same key value descriptors in preparation for data extraction.

The system may also perform classification on the content to determine document formats or types and the like prior to data extraction. The system may, during data extraction, be configured to extract specific key value entries based on the assigned class (e.g., the key value descriptors may be selected based on the assigned class). For example, the system may classify a document as a bill of lading. In this example, the system may extract specific key value entries to match key value descriptors such as inventory identifiers, inventory type, inventory quantity, and the like typically associated with the bill of lading.

In some cases, the system may utilize multiple techniques to segment and/or classify the documents or individual pages of the documents. In one example, the system may apply a text or content based technique using a text based classification model that applies a set of heuristic based rules. For example, the text or content based technique may utilize a named-entity recognition (NER) technique and/or part of speech (POS) tagging to classify the documents and/or pages. For instance, the text or content based technique may determine a class based on the content of the individual documents and/or pages and a set of predetermined rules or dictionaries. In this example, the system may also determine a confidence value associated with each individual classification generated by the text or content based technique or process.

The system may also apply a layout analysis technique to segment and classify the documents and/or pages. For example, the system may determine font height, document colors (e.g., font colors, background colors, table colors, and the like), font weight, spacing, positions of detected key value descriptors, and the like using one or more dictionaries, or machine learned and/or heuristic based models. As discussed above, the system may also generate a confidence value associated with each individual classification generated by the layout analysis technique or process.

The system may also apply a second machine learned model or deep learning technique to segment and classify the documents and/or pages. For example, the system may include a machine learned model, networks, and/or heads trained using customs, transport, shipping, and other related documents in order to segment and/or classify the documents and/or pages of the documents. For example, the first text based technique may utilize a bidirectional encoder representation form transforms (BERT) model and/or a long short-term memory (LSTM) network to classify the documents and/or pages. Once again, the system may also generate a confidence value associated with each individual classification generated by the machine learned model and/or deep learning technique or process.

The system may then select a classification based at least in part on the classification from each of the multiple techniques and the corresponding confidence values. For example, if greater than a first threshold (e.g., 51%, 75%, and the like) number of techniques generates the same classification, the classification may be applied. If no classification equals or has greater than the first threshold number of techniques, the system may remove techniques having a confidence value less than a second threshold (e.g., 10%, 25%, 50%, 75%, and the like) and select from the remaining techniques. Alternatively, the system may select the classification having the highest corresponding confidence value.

In one example implementation, the system may utilize two techniques to determine the class and then apply a third technique when the first two techniques generated either different classes and/or the same class with low corresponding confidence values. In this manner, the third technique may only be utilized in a low number of instances, thereby improving the overall processing speed and reducing the overall resource consumption of the system.

Once the documents and/or pages are classified and segmented and the machine readable content is generated, the system may perform data extraction on the documents. In some cases, the system may extract data based on key value pairs (e.g., a key value descriptor and an associated or corresponding key value entry). For example, the system may include subsystems for processing the content of the documents to extract addresses, contact details, optical marks, barcodes/QR codes, tables, and the like.

In some implementations, to extract the addresses, the system may utilize the output of the layout analysis and/or other predetermined pattern associated with a document to determine a location of an address. The system may again utilize multiple techniques to identify the location of an address. For instance, the system may identify instances of key value descriptors, such as "ship to", "delivery location", "origin", and the like that may indicate an address in proximity. In some cases, the key value descriptors may be associated or stored in an address dictionary. In other instances, the system may utilize one or more image recognition techniques and/or machine learned models to identify a pattern of an address content of the document. The system may parse the machine readable content to identify words common to an address (e.g., city, state, road designations, such as road, street, court, and the like, etc.).

Once an address is located, the system may determine a bounding box and/or string associated with the address, for instance, by searching the content to the right and left of the location. The content of the bounding box may be extracted as individual components of an address, such as country, state, city, street name, street number, zip code, and the like. In some cases, the system may extract and/or differentiate between the components by utilizing NER techniques and predictive matching techniques with one or more location dictionary. In some cases, the language for the document may indicate the location dictionary that is being used. As one illustrative example, the system may identify an address and extract a city or zip code using a dictionary. The system may then utilize a dictionary associated with the city or zip code to identify the street name and/or address. For instance, the street name may be misspelled but by using a local dictionary a nearest match may be found and the street name may be identified and extracted.

After the address components are extracted, the system may remove the address data and any corresponding key pair descriptors from the content and then parse the content of the document for another address. In this example, the addresses are extracted and removed from the content, then another address is identified. But it should be understood that the system may operate the data extraction techniques and systems, discussed herein, in parallel and remove various portions of the content also in parallel such that the amount of content being parsed may be reduced as data that is less easily identified and extracted is targeted.

The system may also extract data related to contact details, such as companies, individuals, phone numbers, emails, fax numbers, and the like. In some cases, the system may utilize a NER techniques as well as one or more name, entity, phone number dictionary or the like. In some cases, the dictionary may be selected based on the address of origin and/or destination. The dictionaries may also include lists of all known companies operating within a given jurisdiction and the like.

The system may also include a list of key value descriptors that may be used to match or identify key value entries as discussed herein. For instance, the country code or phone number pattern may be used to assist with parsing, identifying, and extracting the phone numbers. The system may also utilize POS techniques, machine learned models and/or networks, one or more heuristic based technique, and the like. The system may again assign confidence values associated with the extracted contact details and utilize the confidence values to select between differing outputs of individual techniques, as discussed herein.

The system may also extract data associated with dates. As one illustrative example, the date may be extracted by searching for and matching patterns known to represent a date. In some cases, the patterns may be selected based on the location of origin and/or destination. In some implementations, the system may compare extracted dates with each other in order to match and determine the pattern being used within the document. For instance, a month may be both written in words as well as placed prior to a day or after a day in a numerical representation. The system may utilize the written month to determine if the document is using a day-month-year format or a month-day-year format.

The system may also extract optical mark recognition. For example, the documents may include selectable or checkable sections that provide specific fields of data to the reader. The system may extract the selected optical marks using pattern matching (e.g., identifying the checkboxes, radio buttons, yes/no buttons, and the like). The system may determine the content corresponding to the optical marks by using measurement variables or boxes about the optical mark. For instance, the determining of a uniform border or distance to text based content between multiple optical marks and/or distance between optical marks themselves and identifying substantially similar, corresponding, or the same distances between text based content adjacent to the optical marks. The system may also utilize geometric pattern matching, and text based analysis to determine the content associated with the selected optical marks. Once identified, the content associated with the selected and/or unselected optical marks may be extracted and then removed or otherwise filtered from the document.

The system may also perform data extraction techniques associated with barcodes, QR codes, stickers, other machine readable icons or representations, and the like. In some cases, the system may utilize pattern matching, machine learned models/networks, image processing techniques, and the like to identify the presence of a machine readable icon. The system may read the data from the machine readable icon and determine if it is duplicative or new. If the data is duplicative the system may use the data to validate the extracted data and if the data is new, the system may assign the extracted data as a key value entry of the corresponding key value pair.

The system may also extract table data in order to generate or provide virtual tables associated with the content. In these examples, the system may utilize different approaches for different types of tables. For instance, they system may use a first set of multiple techniques for bordered tables and a second set of multiple techniques for borderless tables.

In the case of bordered tables, the system may utilize techniques that perform pattern matching (such as via one or more machine learned models) to determine a location of a table. For example, the system may detect borders of a table then determine the content at the location is a table by analyzing header section, footer section, spacing between rows and columns, other geometric patterns, and the like. In some cases, as a second technique or if a confidence of the table/row/column/entry detecting has low confidence, the system may remove the borders from the content (e.g., using a computer vision technique) and process the bordered table using the borderless table techniques, discussed below.

The system identifies borderless tables by utilizing a pattern matching associated with geometric patterns and/or changes in geometric patterns from prior or other content of the document and/or page. As an illustrative example, the system may determine the average word spacing, line spacing, and the like on a per document or per page basis. The system may then compare the word spacing and line spacing for the content associated with the table. In this example, if the word spacing and/or line spacing differ from the average, then the system may identify the area with the differing spacing or other geometric patterns as a table.

As a non-exhaustive list of other types of techniques of identifying a boarded and/or borderless table may include, but is not limited to, textual patterns, semantic similarity of proximate content (e.g., content above and next to), industry based dictionaries, machine learned models and/or networks, keyword or key value pair detection, utilizing vectorization word features (e.g., font size, font weight, font type, word meaning, and the like), NER techniques, domain intelligence, coreference resolution techniques, computer vision techniques, text type analysis (e.g., numerical, alphabetic, serial number, currency, measurement, and the like), heuristic based models, and the like.

In some cases, the system may again assign confidence values to the location and/or content identified as pertaining to a table. The system may then determine the entries, borders or bounding box of the table content using the confidence values. Likewise, the system may utilize confidence values in using multiple techniques to identify the location, bounding box, and/or content of each individual entry of the table.

Once the table is located and the content identified, the system may determine the content of the table. For example, the system may utilize the content in the header sections, various column and row header entries, and geometric patterns of the body content of the table and the like to determine a subject matter or type of the table. The system may also determine if entry columns are in alphabetic characters and/or numerals. If the column is numerals the system may determine a standard (e.g., dollars, euros, pounds, ounces, meters, number of units, and the like) being used and utilize the standard to assist in classing the table type or subject. In some cases, by utilizing combinations of column standards and/or one or more machine learned models, the system may classify the type or subject matter of the table. Again, once the table is identified, the type or subject matter determined, the system may parse and extract the content to generate a virtual table.

In some cases, such as in borderless tables, the system may have to determine where a column/row entry ends and starts. In these cases, the system may again utilize the geometric patterns. But in some cases, the entries may be handwritten or otherwise extend into a second column or row. In these cases, the system may parse the content to determine semantically related content and organize the semantically related content as associated with a particular table location or entry. Again, as each entry/table is extracted, the system may remove the content from the document and re-process the table/page/document to reduce the content remaining at each pass and thereby reduce the complexity at each pass.

The system may also extract data associated with values (payment amounts, price per units, and the like), inventory identifiers, and the like. In some cases, the additional data extracted may be based on the classification of the document and/or page as well as based on the aliases detected and assigned. As one illustrative example, the date may be extracted by searching for and matching patterns known to represent a date. In some cases, the patterns may be selected based on the location of origin and/or destination. In some implementations, the system may compare extracted dates with each other in order to match and determine the pattern being used within the document. For instance, a month may be both written in words as well as placed prior to a day or after a day in a numerical representation. The system may utilize the written month to determine if the document is using a day-month-year format or a month-day-year format.

In some cases, the system may also perform key value conflict resolution, such as when multiple key value entries correspond to the same key value descriptor. In some cases, the system may, for instance, convert values in different currencies or denominations to the same standard and compare the values. The system may also sum columns and rows and/or apply checksums to various values to identify if one or more of the values are inaccurate or includes errors.

The system may also perform data enrichment on the extracted data. For example, if one or more fields are missing, the system may determine value of the missing key entry using the extracted data. For example, if a city and street name are extracted but a state is not extracted, the system may utilize one or more databases to determine the state associated with the city and street. As another example, the system may utilize extracted SWIFT codes to access and populate missing banking details. In this manner, the system may utilize public and private third-party databases to complete missing information and/or confirm key value entries are accurate and complete. In other cases, the system may confirm dates such as by using contract terms. For instance, validating the date extracted matches a 30 day delivery timeline from the date of an original contract or invoice.

The extracted data may then be used to verify entry (e.g., the driver and vehicle is authorized and/or expected), complete required forms (e.g., government forms, custody forms, liability forms, and the like), and notify various entities that delivery tasks are completed, delayed, and/or on schedule. For example, at a port, the captured information may be utilized to identify an incoming shipment of containers, complete initial customs forms, and transfer custody or delivery of container and any goods associated therewith.

In the manner discussed herein, the system may reduce the amount of time associated with checking in and/or out each transport, container, and the like as delivers are made and received. For example, conventional manual check out processes at a logistics facility typically take between 30 and 45 minutes per vehicle and, in some case, may take as long several hours per vehicle. In some instances, such as during peak shipping seasons, the long check in and out process may also result in long lines which add further delays, as the transport and drivers wait in line to have documents reviewed and otherwise validated. Additionally, the system, described herein, may reduce overhead associated with form completion, inventory tracking, and the like.

As described herein, the machine learned models may be generated using various machine learning techniques. For example, the models may be generated using one or more neural network(s). A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

Figure 15:
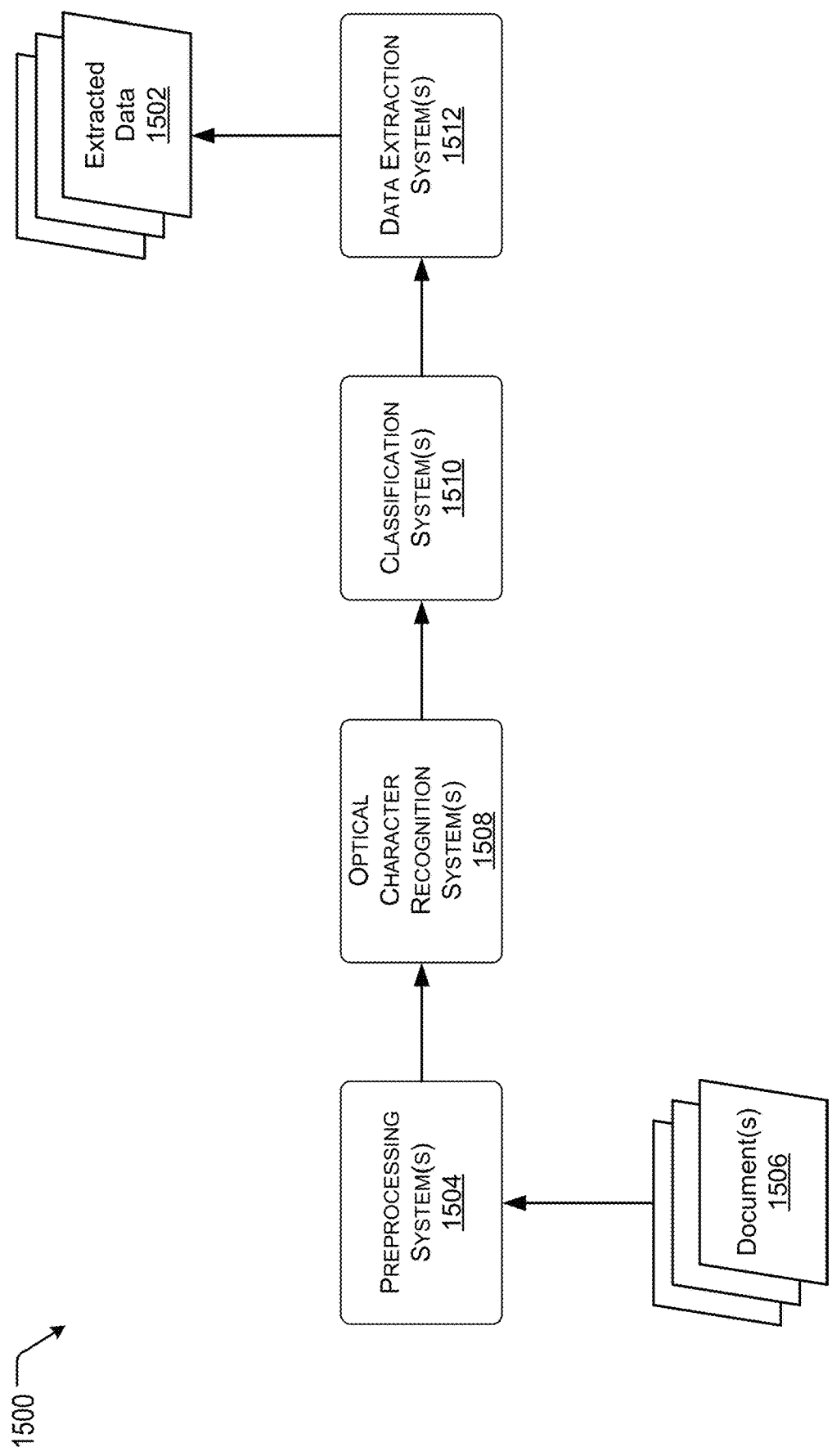
FIG. 15 is an example block diagram of an architecture for extracting data from transport related documents according to some implementations.

FIG. 15 is an example block diagram of an architecture 1500 for extracting data from transport related documents according to some implementations. In the illustrated example, the architecture 1500 may include multiple systems to process the documents and extract desired data, generally indicated by extracted data 1502 (e.g., one or more key value pairs). For instance, a preprocessing system 1504 may receive one or more documents 1506 in an electronic format. The electronic format may be an image, scan, PDF, email, attachment, as well as various other electronic formats.

As discussed above, the documents 1506 may be structured documents, semi-structured documents, and/or unstructured documents. The structured documents may include legible content in specified or known formats and data arrangements and include proper grammar and sentence structure. The semi-structured documents may include content such as, tables, charts, key value pairs, and other expected data entries. The semi-structured documents and the unstructured documents may include content that is handwritten, free form, unformatted, in multiple languages, and/or unexpected key values, table entries, optical mark selections, and the like. For example, important data may be handwritten in the margins, between lines, and the like.

In this example, the preprocessing system 1504 may be configured to prepare the documents 1506 for processing by an optical character recognition system 1508. The preprocessing system 1504 may first align all pages of the document 1506 to an upright or vertical position. For example, the preprocessing system 1504 may detect the bottom and/or top of a page/image based on a content (such as a header, title, footer, page number, and the like). In addition to or in lieu of the content, the preprocessing system 1504 may also determine the upright or vertical position using an analysis of the content (e.g., words and characters), in some cases, with respect to an edge of the image. For instance, many characters have a vertical or upright component that typically aligns with an upright position of the page (particularly, with respect to machine generated text). Thus, the preprocessing system 1504 may utilize various heuristic or rule based techniques and/or machine learned models/networks to detect the machine generated content or text and determine a upright vector associated with particular portions of the text. In other cases, the preprocessing system 1504 may detect lines (either implicated, such as the edge of a paragraph, or physical, such as the edge of a table) and utilize a vector associated with the line as the upright position.

In some cases, the preprocessing system 1504 may utilize multiple techniques discussed above to generate an upright position and/or angle of the page. The preprocessing system 1504 may assign a confidence value or score to each of the techniques and then align the page/image with the upright position based on the output of the multiple techniques and the confidence values associated with each. For example, often when capturing image data and/or scanning multiple pages of the documents 1506, it is difficult to align each page to the same upright or vertical position (e.g., one or more of the pages is imaged at an angle with respect to the others), particularly, if one page is 180 degrees opposite the others. Thus, by utilizing multiple techniques, the upright position may be disambiguated from other possible alignments generated by an individual technique.

The preprocessing system 1504 may also be configured to order or arrange the pages/images in a desired manner. For example, pages of the documents 1506 may be out of order or become intermingled with other each other. In these examples, the preprocessing system 1504 may identify or classify each image/page as belonging to a particular document and/or of a particular type. The preprocessing system 1504 may then sort the images/pages based on the class and/or type. In some cases, the system may also identify page numbers or matching content and order the images/pages based on the identified page numbers and/or matching content, such that each page is associated with a corresponding document and the pages of each document are in order. In some cases, the preprocessing system 1504 may utilize one or more machine models or network to order and sort the images/pages of the documents. The preprocessing system 1504 may utilize confidence values associated multiple techniques to classify, sort, and/or order the pages. Then the preprocessing system 1504 may generate the output arrangement based at least in part on the confidence values of the multiple techniques.

Once the documents are preprocessed and/or cleaned, the optical character recognition system 1508 may generate machine readable content or text associated with the documents 1506. During optical character recognition, the optical character recognition system 1508 may detect text, such as machine generated characters and/or handwritten content. For instance, the optical character recognition system 1508 may utilize multiple techniques for text detection. In one example, the optical character recognition system 1508 may detect the text based content of the image/page and generate bounding boxes around the text in order to generate defined regions or text boxes. The optical character recognition system 1508, may also at this time, detect and assign a language associated with the document. The optical character recognition system 1508 may also determine if the content is in multiple languages as is often common in international trade and customs documents. The optical character recognition system 1508 may then select and apply one or more optical character recognition techniques based on the quality of the defined regions or text boxes and the language(s) assigned. For instance, one or more of the optical character recognition techniques may include applying a machine learned model/network and/or a dictionary based technique in which the model, network, and/or dictionary are selected based on the one or more languages assigned.

As an example of an optical character recognition technique, the optical character recognition system 1508 may perform a first text recognition technique on character by character basis and a second text recognition technique on word by word basis. In this example, the optical character recognition system 1508 may generate a vector for individual characters in the first technique and individual word in the second technique. The results of the first technique and the second technique may then be merged to generate the machine readable text or content. By utilizing the word based or second technique, words may be more quickly and efficiently defined, and the corresponding machine readable text generated. Additionally, using the word based technique spelling errors may be detected and spelling corrections may be applied, and word dictionaries in the selected language may be applied to improve the output of the machine readable text.

However, simply using the word based technique may result in misclassification for single character words and/or similar words and numbers. In particular, many transit, shipping, and customs forms include alpha-numerical serial numbers that are unique, not present in a dictionary, and may include numbers as well as letters in the same string of characters. Accordingly, by using the character based technique, the optical character recognition system 1508 may more reliably identify individual characters of a string and thereby provide more accurate data extraction.

The machine readable content may then be provided to and received by a classification system 1510. The classification system 1510 may also perform classification on the content to determine document formats or types and the like prior to data extraction. The classification system 1510 may, during data extraction, be configured to extract specific key value entries based on the assigned class (e.g., the key value descriptors may be selected based on the assigned class). In some cases, the classification system 1510 may utilize multiple techniques to segmenting and/or classifying the documents or individual pages of the documents. In one example, the classification system 1510 may apply a text or content based technique using a text based classification model that applies a set of heuristic based rules. For example, the text or content based technique may utilize named NER techniques and/or POS tagging to classify the documents and/or pages. For instance, the text or content based technique may determine a class based on the content of the individual documents and/or pages and a set of predetermined rules or dictionaries. In this example, the classification system 1510 may also determine a confidence value associated with each individual classification generated by the text or content based technique or process.

The classification system 1510 may also apply a layout analysis technique to segment and classify the documents and/or pages. For example, the classification system 1510 may determine font height, document colors (e.g., font colors, background colors, table colors, and the like), font weight, spacing, positions of detected key value descriptors, and the like using one or more dictionaries, or machine learned and/or heuristic based models. As discussed above, the classification system 1510 may also generate a confidence value associated with each individual classification generated by the layout analysis technique or process.

The classification system 1510 may also apply a second machine learned model or deep learning technique to segment and classify the documents and/or pages. For example, the classification system 1510 may include a machine learned model, networks, and/or heads trained using customs, transport, shipping, and other related documents in order to segment and/or classify the documents and/or pages of the documents. For example, the first text based technique may utilize a BERT model and/or a LSTM network to classify the documents and/or pages. Once again, the classification system 1510 may also generate a confidence value associated with each individual classification generated by the machine learned model and/or deep learning technique or process.

The classification system 1510 may then select a classification based at least in part on the classification from each of the multiple techniques and the corresponding confidence values. For example, if greater than a first threshold number of techniques generates the same classification, the classification may be applied. If no classification equals or has greater than the first threshold number of techniques, the classification system 1510 may remove techniques having a confidence value less than a second threshold and select from the remaining techniques. Alternatively, the classification system 1510 may select the classification having the highest corresponding confidence value.

The classified machine readable content of the documents 1506 may then be ready for data extraction. In this example, a data extraction system 1512 may perform multiple types of data extraction in parallel and via multiple passes. In this example, the extracted data 1502 may be removed or filtered from the machine readable content prior to each pass. Each pass may then parse the remaining machine readable content for additional data to extract until the document is substantially empty and/or all desired key value descriptors/tables are complete (e.g., the desired data is extracted). The extracted data 1502 may also be digitized, virtualized, and/or otherwise stored in one or more computer-readable media.

In one example, the data extraction system 1512 may be based on key value pairs (e.g., a key value descriptor and an associated or corresponding key value entry). For example, the data extraction system 1512 may include subsystems for processing the content of the documents to extract addresses, contact details, optical marks, barcodes/QR codes, tables, and the like.

In some implementations, to extract the addresses the data extraction system 1512 may utilize the output of the layout analysis and/or other predetermined pattern associated with a document to determine a location of an address. The data extraction system 1512 may again utilize multiple techniques to identify the location of an address. For instance, the data extraction system 1512 may identify instances of key value descriptors, such as "ship to", "delivery location", "origin", and the like that may indicate an address in proximity. In some cases, the key value descriptors may be associated or stored in an address dictionary. In other instances, the data extraction system 1512 may utilize one or more image recognition techniques and/or machine learned models to identify a pattern of an address content of the document. The data extraction system 1512 may parse the machine readable content to identify words common to an address (e.g., city, state, road designations, such as road, street, court, and the like, etc.).

Once an address is located, the data extraction system 1512 may determine a bounding box and/or string associated with the address, for instance, by searching the content to the right and left of the location. The content of the bounding box may be extracted as individual components of an address, such as country, state, city, street name, street number, zip code, and the like. In some cases, the data extraction system 1512 may extract and/or differentiate between the components by utilizing NER techniques and predictive matching techniques with one or more location dictionaries.

In some cases, the language for the document may indicate the location dictionary that is being used. As one illustrative example, the data extraction system 1512 may identify an address and extract a city or zip code using a dictionary. The data extraction system 1512 may then utilize a dictionary associated with the city or zip code to identify the street name and/or address. For instance, the street name may be misspelled but by using a local dictionary a nearest match may be found and the street name may be identified and extracted.

After the address components are extracted, the data extraction system 1512 may remove the address data and any corresponding key pair descriptors from the content and then parse the content of the document for another address. In this example, the addresses are extracted and removed from the content, then another address is identified. But it should be understood that the data extraction system 1512 may operate the data extraction techniques and systems, discussed herein, in parallel and remove various portions of the content also in parallel such that the amount of content being parsed may be reduced as data that is less easily identified and extracted is targeted.

The data extraction system 1512 may also extract data related to contact details, such as companies, individuals, phone numbers, emails, fax numbers, and the like. In some cases, the data extraction system 1512 may utilize NER techniques as well as one or more name, entity, phone number dictionaries or the like. In some cases, the dictionary may be selected based on the address of origin and/or destination. The dictionaries may also include lists of all known companies operating within a given jurisdiction and the like.

The data extraction system 1512 may also include a list of key value descriptors that may be used to match or identify key value entries as discussed herein. For instance, the country code or phone number pattern may be used to assist with parsing, identifying, and extracting the phone numbers. The data extraction system 1512 may also utilize POS techniques, machine learned models and/or networks, one or more heuristic based technique, and the like. The data extraction system 1512 may again assign confidence values associated with the extracted contact details and utilize the confidence values to select between differing outputs of individual techniques, as discussed herein.

The data extraction system 1512 may also extract data associated with dates. As one illustrative example, the date may be extracted by searching for and matching patterns known to represent a date. In some cases, the patterns may be selected based on the location of origin and/or destination. In some implementations, the data extraction system 1512 may compare extracted dates with each other in order to match and determine the pattern being used within the document. For instance, a month may be both written in words as well as placed prior to a day or after a day in a numerical representation. The data extraction system 1512 may utilize the written month to determine if the document is using a day-month-year format or a month-day-year format.

The data extraction system 1512 may also extract optical mark recognition. For example, the documents may include selectable or checkable sections that provide specific fields of data to the reader. The data extraction system 1512 may extract the selected optical marks using pattern matching (e.g., identifying the checkboxes, radio buttons, yes/no buttons, and the like). The data extraction system 1512 may determine the content corresponding to the optical marks by using measurement variables or boxes about the optical mark. For instance, determining a uniform border or distance to text based content between multiple optical marks and/or distance between optical marks themselves and identifying substantially similar, corresponding, or the same distances between text based content adjacent to the optical marks. The data extraction system 1512 may also utilize geometric pattern matching, and text based analysis to determine the content associated with the selected optical marks. Once identified, the content associated with the selected and/or unselected optical marks may be extracted and then removed or otherwise filtered from the document.

The data extraction system 1512 may also perform data extraction techniques associated with barcodes, QR codes, stickers, other machine readable icons or representations, and the like. In some cases, the data extraction system 1512 may utilize pattern matching, machine learned models/networks, image processing techniques, and the like to identify the presence of a machine readable icon. The data extraction system 1512 may read the data from the machine readable icon and determine if it is duplicative or new. If the data is duplicative the system may use the data to validate the extracted data and if the data is new, the data extraction system 1512 may assign the extracted data as a key value entry of the corresponding key value pair.

The data extraction system 1512 may also extract table data in order to generate or provide virtual tables associated with the content. In these examples, the system may utilize different approaches for different types of tables. For instance, the data extraction system 1512 may use a first set of multiple techniques for bordered tables and a second set of multiple techniques for borderless tables.

In the case of bordered tables, the data extraction system 1512 may utilize techniques that perform pattern matching (such as via one or more machine learned models) to determine a location of a table. For example, the data extraction system 1512 may detect borders of a table then determine the content at the location is a table by analyzing header section, footer section, spacing between rows and columns, other geometric patterns, and the like. In some cases, as a second technique or if a confidence of the table/row/column/entry detecting has low confidence, the data extraction system 1512 may remove the borders from the content (e.g., using a computer vision technique) and process the bordered table using the borderless table techniques, discussed herein.

The data extraction system 1512 identifies borderless tables by utilizing a pattern matching associated with geometric patterns and/or changes in geometric patterns from prior or other content of the document and/or page. As an illustrative example, the data extraction system 1512 may determine the average word spacing, line spacing, and the like on a per document or per page basis. The data extraction system 1512 may then compare the word spacing and line spacing for the content associated with the table. In this example, if the word spacing and/or line spacing differs from the average, then the data extraction system 1512 may identify the area with the differing spacing or other geometric pattern as a table.

As a non-exhaustive list of other types of techniques of identifying a boarded and/or borderless table may include, but is not limited to, textual patterns, semantic similarity of proximate content (e.g., content above and next to), industry based dictionaries, machine learned models and/or networks, keyword or key value pair detection, utilizing vectorization word features (e.g., font size, font weight, font type, word meaning, and the like), NER techniques, domain intelligence, coreference resolution techniques, computer vision techniques, text type analysis (e.g., numerical, alphabetic, serial number, currency, measurement, and the like), heuristic based models, and the like.

In some cases, the data extraction system 1512 may again assign confidence values to the location and/or content identified as pertaining to a table. The data extraction system 1512 may then determine the entries, borders or bounding box of the table content using the confidence values. Likewise, the data extraction system 1512 may utilize confidence values in determining using multiple techniques to identify the location, bounding box, and/or content of each individual entry of the table.

Once the table is located and the content identified, the data extraction system 1512 may determine the content of the table. For example, the data extraction system 1512 may utilize the content in the header sections, various column and row header entries, and geometric patterns of the body content of the table and the like to determine a subject matter or type of the table. The data extraction system 1512 may also determine if entry columns are in alphabetic characters and/or numerals. If the column is numerals the system may determine a standard (e.g., dollars, euros, pounds, ounces, meters, number of units, and the like) being used and utilize the standard to assist in classing the table type or subject. In some cases, by utilizing combinations of column standards and/or one or more machine learned models, the system may classify the type or subject matter of the table. Again, once the table is identified, the type or subject matter determined, the system may parse and extract the content to generate a virtual table.

In some cases, such as in borderless tables, the data extraction system 1512 may have to determine where a column/row entry ends and starts. In these cases, the data extraction system 1512 may again utilize the geometric patterns. But in some cases, the entries may be handwritten or otherwise extend into a second column or row. In these cases, the data extraction system 1512 may parse the content to determine semantically related content and organize the semantically related content as associated with a particular table location or entry. Again, as each entry/table is extracted, the system may remove the content from the document and re-process the table/page/document to reduce the content remaining at each pass and thereby reduce the complexity at each pass.

The system may also extract data associated with values (payment amounts, price per units, and the like), inventory identifiers, and the like. In some cases, the additional data extracted may be based on the classification of the document and/or page as well as based on the aliases detected and assigned. As one illustrative example, the date may be extracted by searching for and matching patterns known to represent a date. In some cases, the patterns may be selected based on the location of origin and/or destination. In some implementations, the data extraction system 1512 may compare extracted dates with each other in order to match and determine the pattern being used within the document. For instance, a month may be both written in words as well as placed prior to a day or after a day in a numerical representation. The data extraction system 1512 may utilize the written month to determine if the document is using a day-month-year format or a month-day-year format.

The extracted data 1502 may then be stored and/or provided to various third party systems. For example, the extracted data 1502 may be provided to various governmental and/or customs systems, a seller system, a buyer system, a system associated with the destination, a system associated with the transport company, a system associated with the point or origin, a system associated with insurance, a system associated with chain of custody, and the like.

Figure 16:
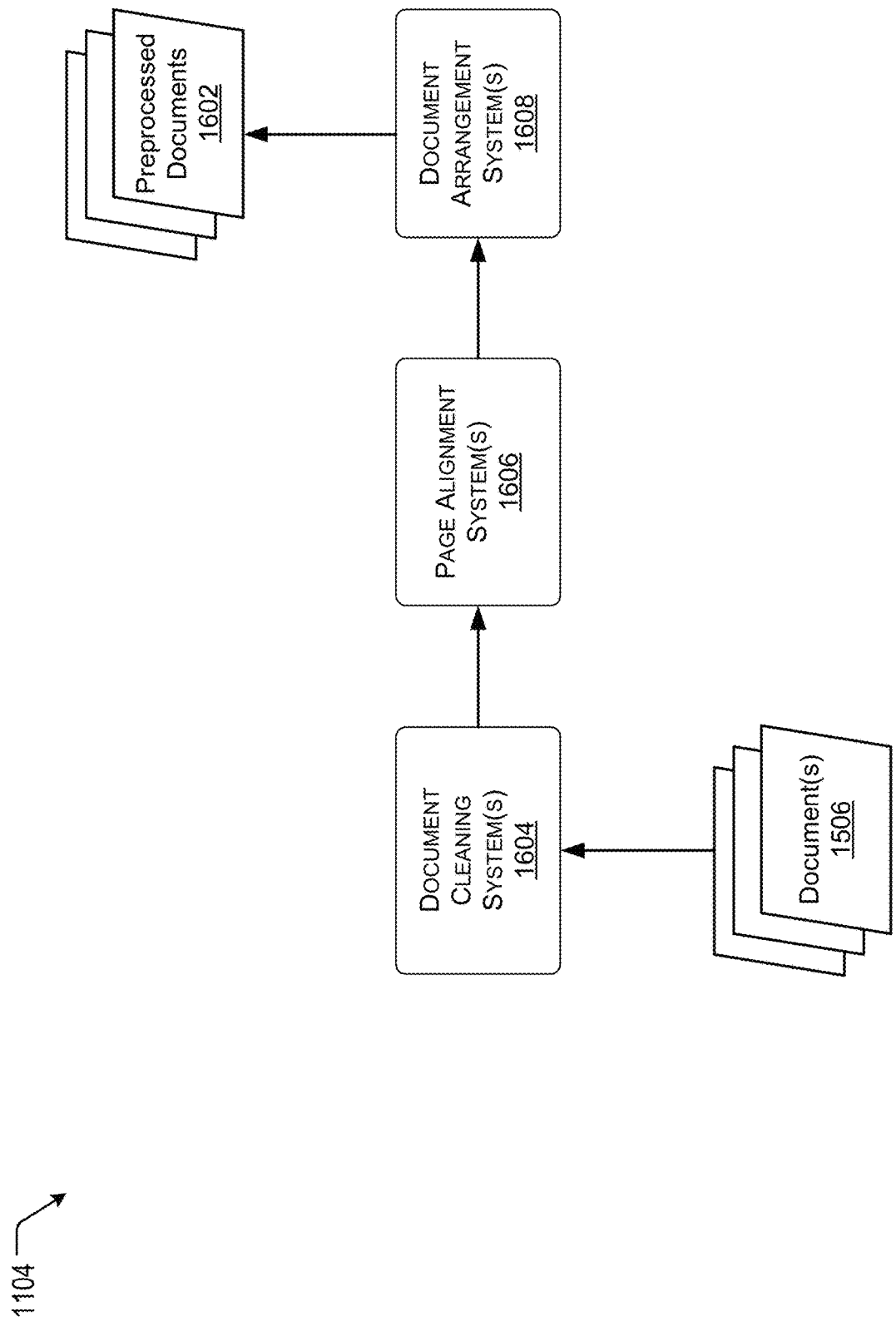
FIG. 16 is an example block diagram of an architecture of a preprocessing system of FIG. 15 according to some implementations.

FIG. 16 is an example block diagram of an architecture of a preprocessing system 1504 of FIG. 15 according to some implementations. In the current example, the preprocessing system 1504 may be configured to receive documents 1506 and to output as a response preprocessed documents 1602, which are ready for optical character recognition. The preprocessed documents 1602 may have defects or imperfections (e.g., watermarks, ink blots, food/water stains, and the like) removed or lightened with respect to the content, the pages aligned into a common upright vector, and/or the pages sorted and ordered in one or more predefined pattern (e.g., by page number, page type, content, or the like).

In the current example, the preprocessing system 104 may include a document cleaning system 1604, a page alignment system 1606, and a document arrangement system 1608. The page cleaning system 1604 may be configured to convert the documents 106 to images, if they are not already in an image based format. The page cleaning system 1604 may then be configured to remove imperfections from the images. For example, the page cleaning system 1604 may utilize a machine learned model to generate bounding boxes associated with the imperfections and/or content of the images. The page cleaning system 1604 may then modify brightness, contrast, saturation, and the like with respect to the content (e.g., to darken the content) and the imperfections (e.g., to lighten the imperfections) to improve the output of the future applied optical character recognition techniques.

The page alignment system 1606 may also determine an upright or vertical position of individual pages or images and using the detected angle or orientation to rotate the images to align each of the pages/images to the upright or vertical position. For example, the page alignment system 1606 may detect the bottom and/or top of a page/image based on a content (such as a header, title, footer, page number, and the like). In addition to or in lieu of the content, the page alignment system 1606 may also determine the upright or vertical position using an analysis of the content (e.g., words and characters), in some cases, with respect to an edge of the image. For instance, many characters have a vertical or upright component that typically aligns with an upright position of the page (particularly, with respect to machine generated text). Thus, the page alignment system 1606 may utilize various heuristic or rule based techniques and/or machine learned models/networks to detect the machine generated content or text and determine a upright vector associated with particular portions of the text. In other cases, the page alignment system 1606 may detect lines (either implicated, such as the edge of a paragraph, or physical, such as the edge of a table) and utilize a vector associated with the line as the upright position.

In some cases, the page alignment system 1606 may utilize multiple techniques discussed above to generate an upright position and/or angle of the page. The page alignment system 1606 may assign a confidence value or score to each of the techniques and then align the page/image with the upright position based on the output of the multiple techniques and the confidence values associated with each. For example, often when capturing image data and/or scanning multiple pages of a document or documents, it is difficult to align each page to the same upright or vertical position (e.g., one or more of the pages is imaged at an angle with respect to the others), particularly, if one page is 180 degrees opposite the others. Thus, by utilizing multiple techniques, page alignment system 1606 may disambiguate the upright position from other possible alignments generated by an individual technique.

The document arrangement system 1608 may be configured to order or arrange the pages/images in a desired manner. For example, the documents may be out of order or become intermingled with other documents (e.g., a page of a first document is scanned or imaged between pages of a second document). In these examples, the document arrangement system 1608 may identify each image/page as belonging to a particular document and/or of a particular type. The document arrangement system 1608 may then sort the images/pages based on the type. In some cases, the document arrangement system 1608 may also identify page numbers or matching content and order the images/pages based on the identified page numbers and/or matching content, such that each page is associated with a corresponding document and the pages of each document are in order. In some cases, the document arrangement system 1608 may utilize one or more machine models or network to order and sort the images/pages of the documents. The document arrangement system 1608 may utilize confidence values associated multiple techniques to classify, sort, and/or order the pages. Then the document arrangement system 1608 may generate the output arrangement based at least in part on the confidence values of the multiple techniques.

Figure 17:
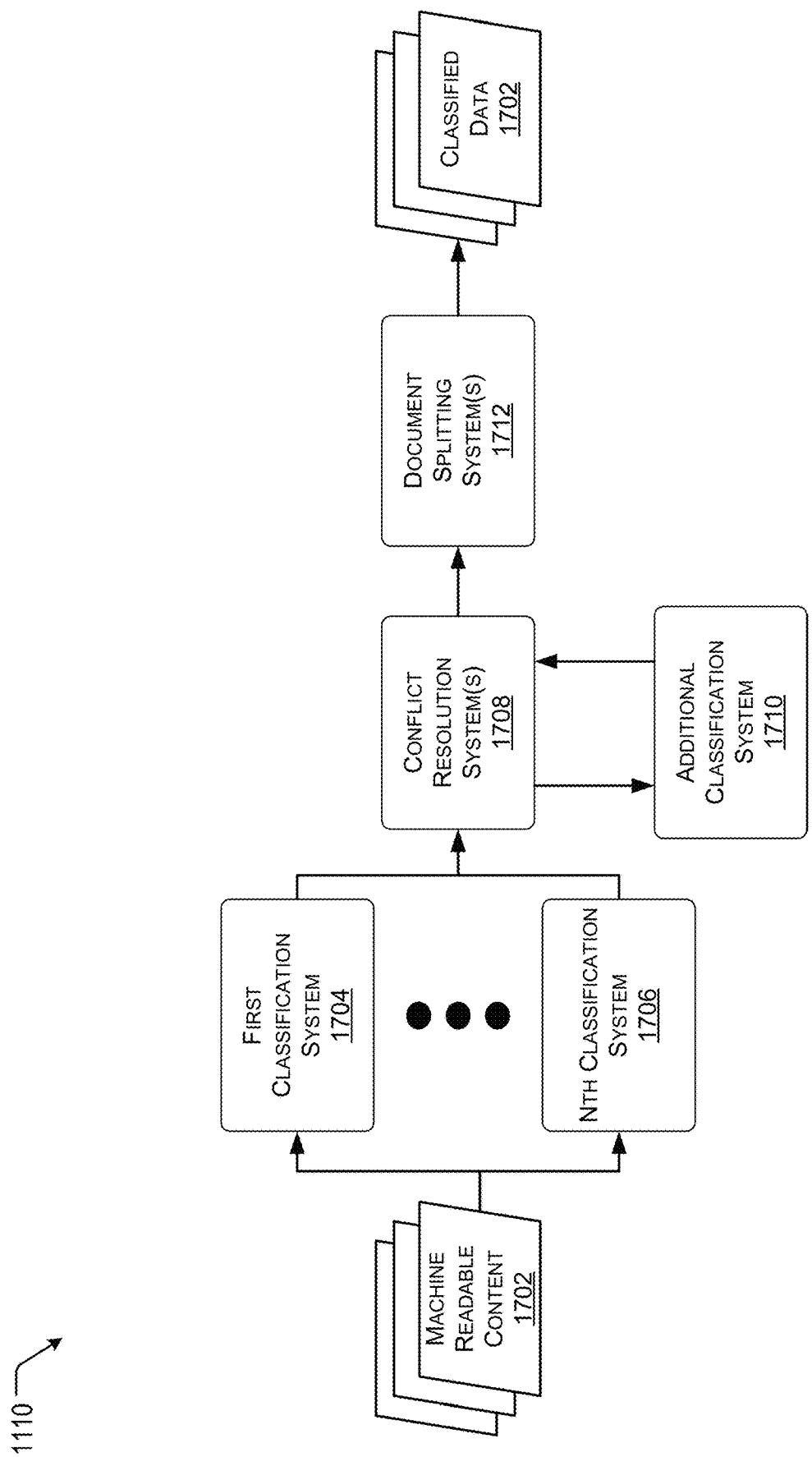
FIG. 17 is an example block diagram of an architecture of a classification system of FIG. 15 according to some implementations.

FIG. 17 is an example block diagram of an architecture of a classification system 110 of FIG. 1 according to some implementations. In the illustrated example, the classification system 1510 may receive machine readable content 1702 from an optical character recognition system, such as optical character recognition system 1508 of FIG. 15. The classification system 1510 may then input the machine readable content 1702 into multiple classification systems, such as the illustrated first classification system 1704 and nth classification system 1706.

In some cases, the first classification system 1704 and the nth classification system 1706 may include classification techniques such as text analysis, key value descriptors or key word searches, machine learned models and/or networks (such as NER and POS tagging), layout analysis (e.g., font height, color, and/or weight; word and character spacing; and the like), context building, computer vision analysis, domain intelligence, and the like.

As one illustrative example, the first classification system 1704 may apply a text or content based technique using a text based classification model that applies a set of heuristic based rules. In this manner, the first classification system 1704 may determine a first class for the machine readable content 1702 based on the content of the individual documents and/or pages and a set of predetermined rules or dictionaries. In this example, the first classification system 1704 may also determine a confidence value associated with each individual classification generated. Both the first class and the first confidence value may be provided to the conflict resolution system 1708.

Similarly, the Nth classification system 1706 may apply a layout analysis technique to segment and classify the machine readable content 1702. For example, the Nth classification system 1706 may determine font height, document colors (e.g., font colors, background colors, table colors, and the like), font weight, spacing, positions of detected key value descriptors, and the like using one or more dictionaries or machine learned and/or heuristic based models. The Nth classification system 1706 may generate an Nth class and an Nth confidence value associated with each individual classification generated by the layout analysis technique or process. Again, both the Nth class and the Nth confidence value may be provided to the conflict resolution system 1708.

As some illustrative examples, additional or alternative classification systems may apply machine learned model or deep learning techniques to segment and classify the machine readable content 1702. For example, the classification system(s) may include machine learned models, networks, and/or heads trained using customs, transport, shipping, and other related documents in order to segment and/or classify the documents and/or pages of the documents. As other examples, the classification system may utilize a BERT model and/or a LSTM network to classify the machine readable content 1702.

The conflict resolution system 1708 may then select a classification from the set of K classes (e.g., up to N classes) based at least in part on the first class and the first confidence value and the Nth class and the Nth confidence value. For example, if the first class and the second class match, the conflict resolution system may select the class and assign it to the machine readable content 1702. However, if the first class and the Nth class do not match, the conflict resolution system may select between the classes represented in the set of K classes. For example, if the first class has a corresponding first confidence value of greater than a first threshold and the Nth class has a corresponding Nth confidence value of less than a second threshold, the conflict resolution system 1708 may select the first class as the class for the machine readable content 1702. However, if both the first class and the Nth class have corresponding confidence values below a threshold or within a threshold difference of each other, the conflict resolution system 1708 may cause an additional classification system 1710 to generate a tie breaker classification and tie breaker confidence value. The tie breaker classification system 1710 may apply a different classification technique, models, and/or networks than the first classification system 1704 and the nth classification system 1706 and the conflict resolution system 1708 may select the class based on the set of K classes and the tie breaker classification as well as the corresponding confidence values output by each system 1704, 1706, and 1710. In this manner, the tie breaker additional classification system 1710 may only be utilized in a low number of instances, thereby improving the overall processing speed and reducing the overall resource consumption of the classification system 1510.

Figure 18:
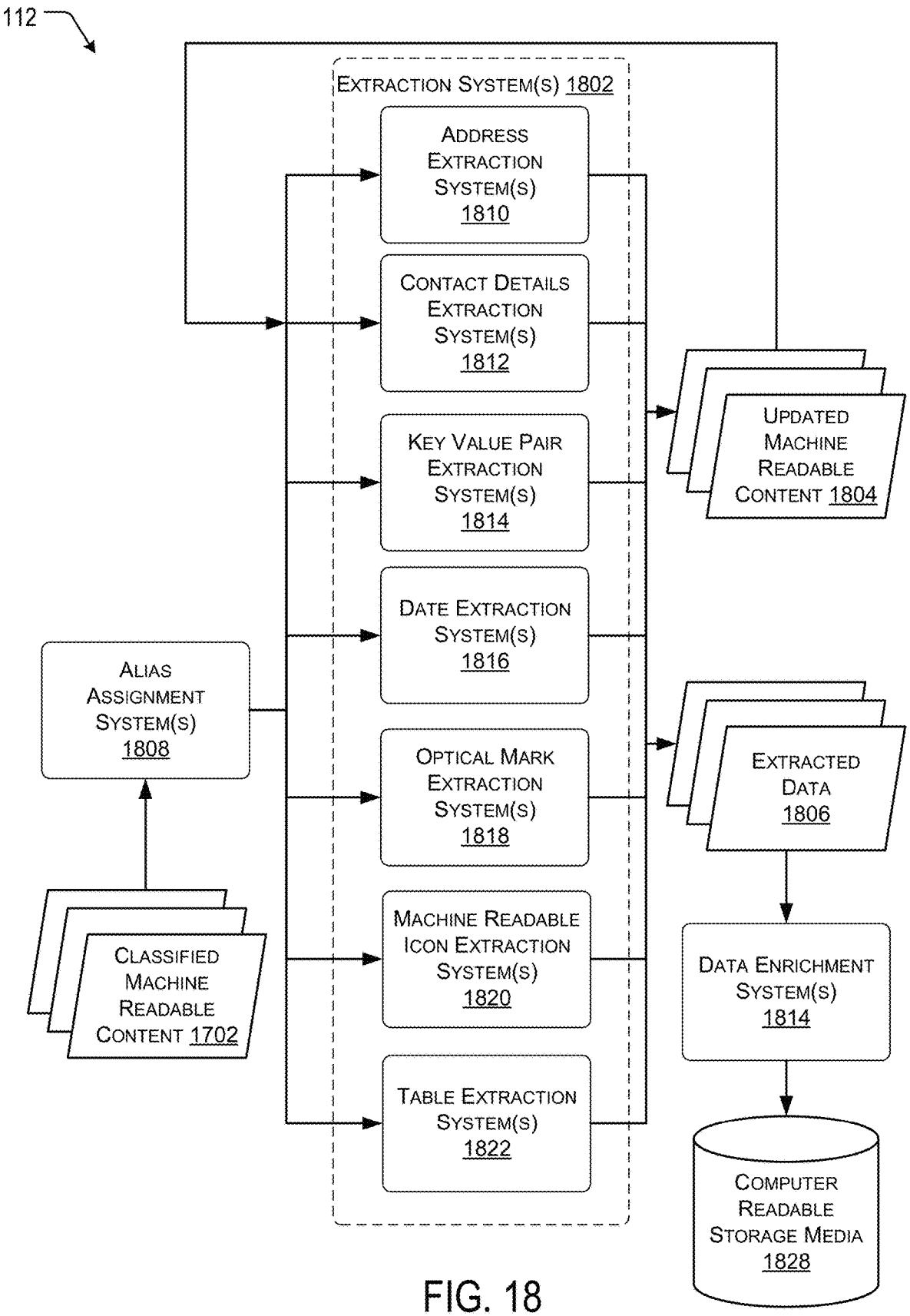
FIG. 18 is an example block diagram of an architecture of a data extraction system of FIG. 15 according to some implementations.

FIG. 18 is an example block diagram of an architecture of a data extraction system 1512 of FIG. 15 according to some implementations. In the current example, the data extraction system 1512 may include multiple data extraction systems, generally indicated by 1802. In this example, the individual extraction systems 1802 may extract data from the classified machine readable content 1702 output by, for instance, the classification system 1510 of FIGS. 15 and 17. The extraction systems 1802 may output both an updated machine readable content 1804 and/or extracted data 1806. In this example, the updated machine readable content 1804 may include the classified machine readable content 1702 filtered to remove the extracted data 1806. In this manner, the extraction systems 1802 may re-process the updated machine readable content 1804 via additional passes to on, for instance, each pass reducing the computational complexity with respect to extracting data.

In the illustrated example, the data extraction system 1512 may include an alias assignment system 1808. The alias assignment system 1808 may be configured to assign aliases to the classified machine readable content 1702 using one or more alias dictionaries. For example, in some documents the term "ship to" may be used as a standard designation for the term "destination". In this example, the alias assignment system 1808 may identify the corresponding terms within the alias dictionary and assign each the same key value descriptors in preparation for processing by the data extraction systems 1802.

In the current example, the data extraction systems may include an address extraction system 1810, a contact details extraction system 1812, a key value pair extraction system 1814, date extraction system 1816, an optical mark extraction system 1818, a machine readable icon extraction system 1820, and/or a table extraction system 1822. The address extraction system 1810 may be configured to utilize a layout analysis and/or other predetermined pattern matching technique to determine a location of an address. For instance, the system may identify instances of key value descriptors, such as "ship to", "delivery location", "origin", and the like that may indicate an address in proximity. In other examples, the address extraction system 1810 may determine a location of an address by identifying words such as jurisdictional names, street names, numerical strings repressing zip codes street numbers, and the like.

Once an address is located, the address extraction system 1810 may determine a bounding box and/or string associated with the address, for instance, by searching the content to the right and left of the location. The content of the bounding box may be extracted as individual components of an address, such as country, state, city, street name, street number, zip code, and the like. In some cases, the address extraction system 1810 may extract and/or differentiate between the components by utilizing NER techniques and predictive matching techniques with one or more location dictionaries (e.g., a street name dictionary associated with a particular city or township).

The address extraction system 1810 may assign confidence values associated with the extracted address components and utilize the confidence values to select between differing outputs of individual techniques, as discussed herein. After the address components are extracted, the address extraction system 1810 may remove the address data and any corresponding key pair descriptors from the machine readable content 1804 and then provide the updated machine readable content 1804 back to the extraction systems 1802 for an additional pass.

The contact details extraction system 1812 may also extract data 1806 related to contact details, such as companies, individuals, phone numbers, emails, fax numbers, and the like. In some cases, the contact details extraction system 1812 may utilize a NER techniques as well as one or more name, entity, phone number dictionary or the like. In some cases, the dictionary may be selected based on the address of origin and/or destination. The dictionaries may also include lists of all known companies operating within a given jurisdiction and the like.

The contact details extraction system 1812 may assign confidence values associated with the extracted contact details and utilize the confidence values to select between differing outputs of individual techniques, as discussed herein. After the contact details are extracted, the contact details extraction system 1812 may remove the contact details and any corresponding key pair descriptors from the machine readable content 1804 and then provide the updated machine readable content 1804 back to the extraction systems 1802 for an additional pass.

The key value pair extraction system 1814 may extract data using one or more lists of key value descriptors that may be used to match or identify key value entries as discussed herein. For instance, the country code or phone number pattern may be used to assist with parsing, identifying, and extracting the phone numbers. The key value pair extraction system 1814 may also utilize POS tagging techniques, machine learned models and/or networks, one or more heuristic based technique, and the like.

The key value pair extraction system 1814 may again assign confidence values associated with the extracted key value pairs and utilize the confidence values to select between differing outputs of individual techniques, as discussed herein. After the key value pairs are extracted, the key value pair extraction system 1814 may also remove the key value descriptors and/or key value entries from the machine readable content 1804 and then provide the updated machine readable content 1804 back to the extraction systems 1802 for an additional pass.

The date extraction system 1816 may also extract data associated with dates. As one illustrative example, the date may be extracted by searching for and matching patterns known to represent a date. In some cases, the patterns may be selected based on the location of origin and/or destination. In some implementations, the date extraction system 1816 may compare extracted dates with each other in order to match and determine the pattern being used within the document. For instance, a month may be both written in words as well as placed prior to a day or after a day in a numerical representation. The date extraction system 1816 may utilize the written month to determine if the document is using a day-month-year format or a month-day-year format.

The date extraction system 1816 may again assign confidence values associated with the extracted dates and utilize the confidence values to select between differing outputs of individual techniques, as discussed herein. After the dates are extracted, the date extraction system 1816 may also remove the dates any related key value descriptors from the machine readable content 1804 and then provide the updated machine readable content 1804 back to the extraction systems 1802 for an additional pass.

The optical mark extraction system 1818 may also extract optical mark recognition. For example, the documents may include selectable or checkable sections that provide specific fields of data to the reader. The optical mark extraction system 1818 may extract the selected optical marks using pattern matching (e.g., identifying the checkboxes, radio buttons, yes/no buttons, and the like). The optical mark extraction system 1818 may determine the content corresponding to the optical marks by using measurement variables or boxes about the optical mark. For instance, the determining a uniform border or distance to text based content between multiple optical marks and/or distance between optical marks themselves and identifying substantially similar, corresponding, or the same distances between text based content adjacent to the optical marks. The optical mark extraction system 1818 may also utilize geometric pattern matching, and text based analysis to determine the content associated with the selected optical marks. Once identified, the content associated with the selected and/or unselected optical marks may be extracted and then removed or otherwise filtered from the document.

The optical mark extraction system 1818 may also assign confidence values associated with the extracted optical marks and utilize the confidence values to select between differing outputs of individual techniques, as discussed herein. After the optical mark related content is extracted, the optical mark extraction system 1818 may also remove the optical mark related content any related key value descriptors from the machine readable content 1804 and then provide the updated machine readable content 1804 back to the extraction systems 1802 for an additional pass.

The machine readable icon extraction system 1820 may also perform data extraction techniques associated with barcodes, QR codes, stickers, other machine readable icons or representations, and the like. In some cases, the machine readable icon extraction system 1820 may utilize pattern matching, machine learned models/networks, image processing techniques, and the like to identify the presence of a machine readable icon. The machine readable icon extraction system 1820 may read the data from the machine readable icon and determine if it is duplicative or new. If the data is duplicative the machine readable icon extraction system 1820 may use the data to validate the extracted data and if the data is new, the system may assign the extracted data as a key value entry of the corresponding key value pair.

The machine readable icon extraction system 1820 may also assign confidence values associated with the extracted machine readable icons and utilize the confidence values to select between differing outputs of individual techniques, as discussed herein. After the icon related content is extracted, the machine readable icon extraction system 1820 may also remove the icon related content any related key value descriptors from the machine readable content 1804 and then provide the updated machine readable content 1804 back to the extraction systems 1802 for an additional pass.

The table extraction system 1822 may also extract table data in order to generate or provide virtual tables associated with the content. In these examples, the system may utilize different approaches for different types of tables, discussed in more detail below with respect to FIG. 19. For instance, the table extraction system 1822 may a first set of multiple techniques for bordered tables and a second set of multiple techniques for borderless tables. The table extraction system 1822 may also assign confidence values associated with the extracted tables and utilize the confidence values to select between differing outputs of individual techniques, as discussed herein. After the tables are extracted, the table extraction system 1822 may also remove the tables from the machine readable content 1804 and then provide the updated machine readable content 1804 back to the extraction systems 1802 for an additional pass.

Once the extracted data 1806 is removed from the machine readable content 1702, the extracted data 1806 may be processed by a data enrichment system 1824. The data enrichment system 1822 may be configured to perform key value conflict resolution, such as when multiple key value entries correspond to the same key value descriptor. In some cases, the data enrichment system 1822 may, for instance, convert values in different currencies or denominations to the same standard and compare the values. The data enrichment system 1822 may also sum columns and rows and/or apply checksums to various values to identify if one or more of the values are inaccurate or include errors.

The data enrichment system 1822 may also determine values of the missing key entries using the extracted data 1806. For example, if a city and street name are extracted but a state is not extracted, the data enrichment system 1822 may utilize one or more databases to determine the state associated with the city and street. As another example, the data enrichment system 1822 may utilize extracted SWIFT codes to access and populate missing banking details. In this manner, the data enrichment system 1822 may utilize public and private third-party databases to complete missing information and/or confirm key value entries are accurate and complete. In other cases, the data enrichment system 1822 may confirm dates such as by using contract terms. The data enrichment system 1822 may also perform spelling and grammar checking and the like on the extracted data 1806. After enrichment, the extracted data 1806 may be stored in one or more computer readable storage media 1828 and/or sent to various third-party systems (not shown).

Figure 19:
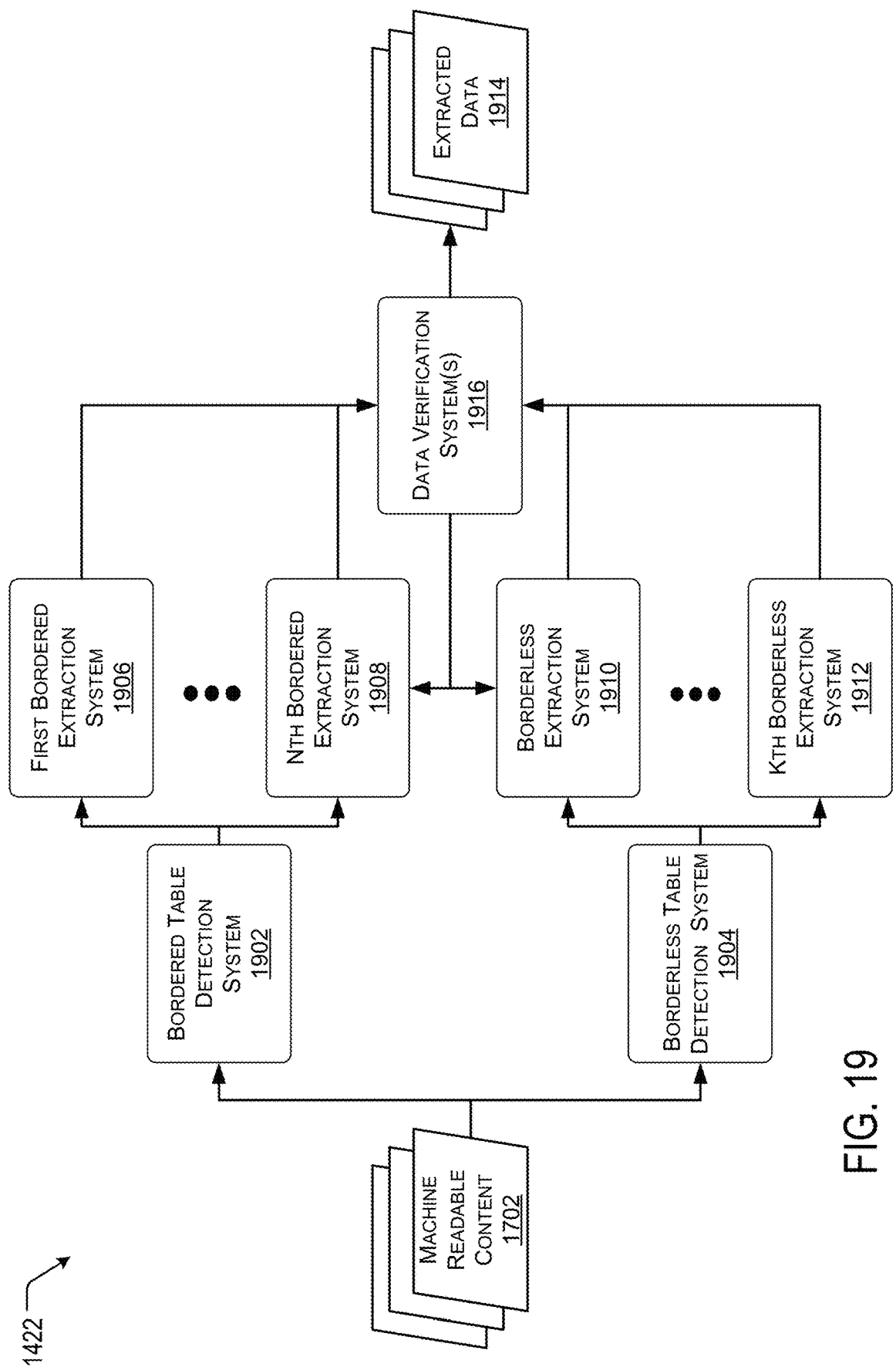
FIG. 19 is an example block diagram of an architecture of a data extraction system of FIG. 15 according to some implementations.

FIG. 19 is an example block diagram of an architecture of a data extraction system 1822 of FIG. 15 according to some implementations. In the current example, the data extraction 1822 may be configured to extract table data using multiple techniques. In this example, the data extraction system 1822 may utilize different systems or techniques to extract data from bordered tables and borderless tables as illustrated. Again, the system 1822 may receive the machine readable content 1702 either as an original or as part of a subsequent pass (e.g., a return of the machine readable content 1702 after a first data extraction pass and filtering, as discussed above).

The machine readable content 1702 may be received at a bordered table detection system 1902 as well as at a borderless table detection system 1904. The bordered table detection system 1902 may utilize pattern matching (such as via one or more machine learned models) to determine a location of a table. For example, the bordered table detection system 1902 may detect borders of a table then determine a bounding box associated with the content of the table by analyzing header section, footer section, spacing between rows and columns, other geometric patterns, and the like.

The borderless table detection system 1904 may also utilize a pattern matching technique to determine the location of a table. In this example, the borderless table detection system 1904 may utilize geometric patterns of the table content with respect to patterns of the remainder of the document. As an illustrative example, the borderless table detection system 1904 may determine the average word spacing, line spacing, and the like on a per document or per page basis. The borderless table detection system 1904 may then compare the word spacing and line spacing for the content associated with the table. In this example, if the word spacing and/or line spacing differ from the average, then the borderless table detection system 1904 may identify the area with the differing spacing or other geometric pattern as a table.

In some cases, the detection systems 1902 and/or 1904 may again assign confidence values to the location and/or content identified as pertaining to a table. The detection systems 1902 and/or 1904 may utilize confidence values in disambiguating the position or content of the table between outputs of multiple techniques to.

Once a table is detected and/or located, one or more bordered extraction systems 1906-1908 may be applied to extract the data 1914 from the bordered tables and one or more borderless extraction systems 1910-1912 may be applied to extract the data 1914 from the borderless tables. For example, the systems 1906-1908 may extract content or data 1914 from the tables by analyzing the header section, footer section, spacing between rows and columns, other geometric patterns, and the like. In some cases, the systems 1910-1912 may utilize the content in the header sections, various column and row header entries, and geometric patterns of the body content of the table and the like to determine a subject matter or type of the table. The systems 1910-1912 may also determine if entry columns are in alphabetic characters and/or numerals. If the column is numerals the systems 1910-1912 may determine a standard (e.g., dollars, euros, pounds, ounces, meters, number of units, and the like) being used and utilize the standard to assist in classing the table type or subject. In some cases, by utilizing combinations of column standards and/or one or more machine learned models, the system may classify the type or subject matter of the table. Again, once the table is identified, the type or subject matter determined, the systems 1910-1912 may parse and extract the content to generate a virtual table. As other examples, the systems 1906-1908 may extract content or dates using techniques such as textual patterns, semantic similarity of proximate content (e.g., content above and next to), industry based dictionaries, machine learned models and/or networks, keyword or key value pair detection, utilizing vectorization word features (e.g., font size, font weight, font type, word meaning, and the like), NER techniques, domain intelligence, coreference resolution techniques, computer vision techniques, text type analysis (e.g., numerical, alphabetic, serial number, currency, measurement, and the like), heuristic based models, and the like.

In some cases, such as in borderless tables, the systems 1910-1912 may have to determine where a column/row entry ends and starts. In these cases, the system may again utilize the geometric patterns. But in some cases, the entries may be handwritten or otherwise extend into a second column or row. In these cases, the systems 1910-1912 may parse the content to determine semantically related content and organize the semantically related content as associated with a particular table location or entry. Again, as each entry/table is extracted, the systems 1910-1912 may remove the content from the document and re-process the table/page/document to reduce the content remaining at each pass and thereby reduce the complexity at each pass.

The systems 1910-1912 may also extract data 1914 associated with values (payment amounts, price per units, and the like), inventory identifiers, and the like. In some cases, the additional data extracted may be based on the classification of the document and/or page as well as based on the aliases detected and assigned. As one illustrative example, the date may be extracted by searching for and matching patterns known to represent a date. In some cases, the patterns may be selected based on the location of origin and/or destination. In some implementations, the systems 1910-1912 may compare extracted dates with each other in order to match and determine the pattern being used within the document. For instance, a month may be both written in words as well as placed prior to a day or after a day in a numerical representation. The systems 1910-1912 may utilize the written month to determine if the document is using a day-month-year format or a month-day-year format.

In some cases, the systems 1822 may also include a data verification system 1916 that may also perform key value conflict resolution, such as when multiple key value entries correspond to the same key value descriptor. In some cases, the data verification system 1916 may, for instance, convert values in different currencies or denominations to the same standard and compare the values. The data verification system 1916 may also sum columns and rows and/or apply checksums to various values to identify if one or more of the values are inaccurate or includes errors.

In some specific cases, if a bordered table is not extracted or encounters issues at the data verification system 1916, the content of the bordered table may be processed by the borderless extraction systems 1910-1912. For instance, if a user ignored the table boundaries when completing the table, the bordered extraction systems 1906-1908 may have difficulty in extracting the content that overruns the borders. In these, cases, the data verification system 1916 may cause the borderless extraction systems 1910-1912 to also process the content of the table and then verify the output by comparing the extracted data 1914 of both the bordered extraction systems 1906-1908 and the borderless extraction systems 1910-1912.

FIGS. 20-30 are flow diagrams illustrating example processes associated with a data extraction system discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, when executed by one or more processor(s), performs the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 20:
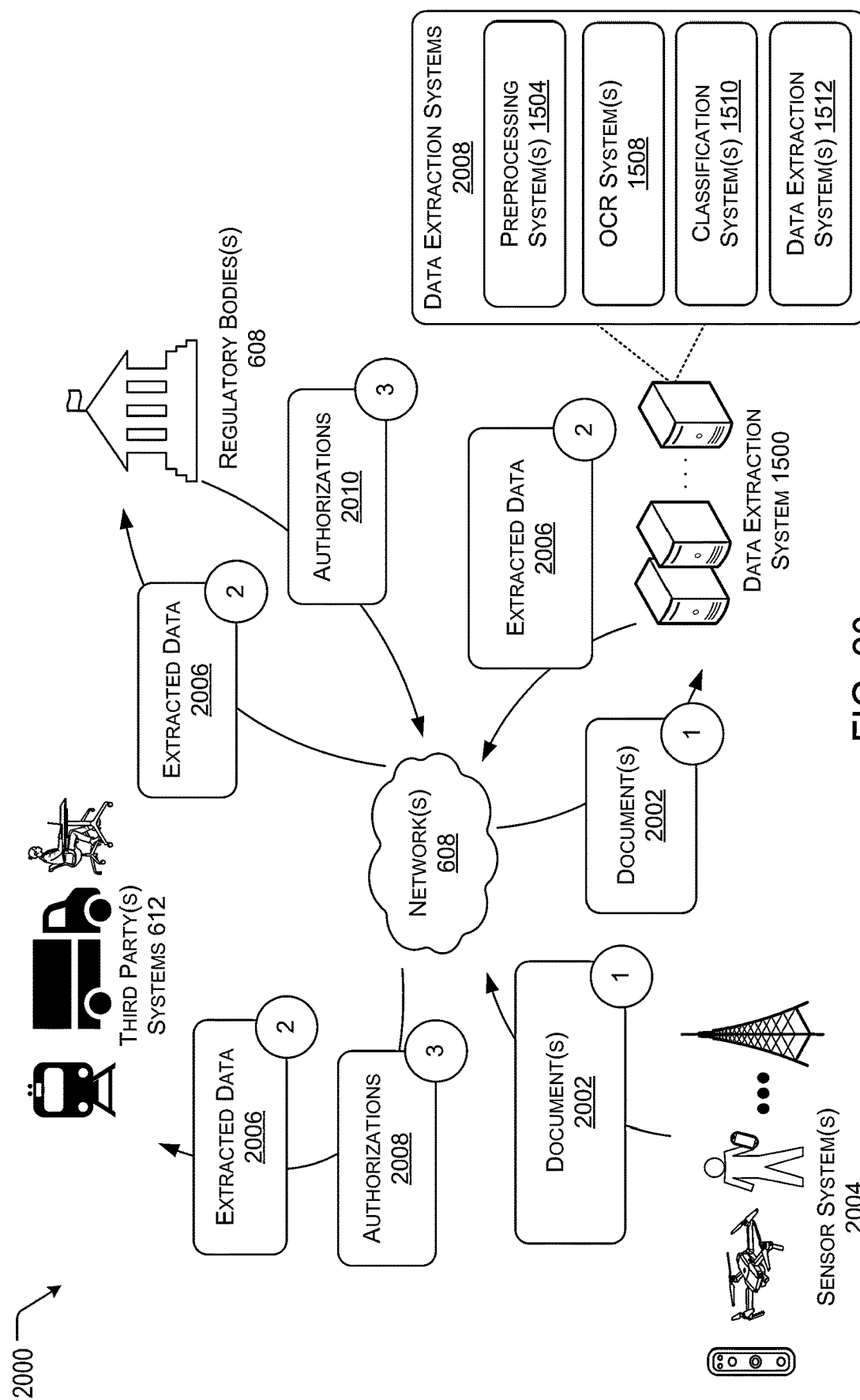
FIG. 20 is a flow diagram illustrating an example process associated with the data extraction system of FIG. 15 according to some implementations.

FIG. 20 is a flow diagram illustrating an example process 2000 associated with the data extraction system according to some implementations. As illustrated, documents 2002 may be generated by various sensor systems 2004 as well as via email or other electronic means. The documents 2002 may be received by a data extraction system 1500 of FIG. 15. As discussed above, the data extraction system 1500 may include preprocessing systems 1504, OCR system 1508, classification system 1510, and data extraction system 1512.

In this example, the data extraction system 1500 may output extracted data 2006. The extracted data 2006 may include various key value pairs, virtual tables, and other data associated with the transport and delivery of various assets. In some cases, the extracted data 2006 may be provided to various regulatory bodies 2008 to receive authorizations 2010 and/or approvals. For instance, the regulatory bodies 2008 may include customs systems and the like. The extracted data 2006 and/or the authorizations 2010 may then be provided to one or more third party systems 2012, such as a system associated with a buyer, a seller, a transport agency, a facility (origin and/or receiving), and the like.

Figure 21:
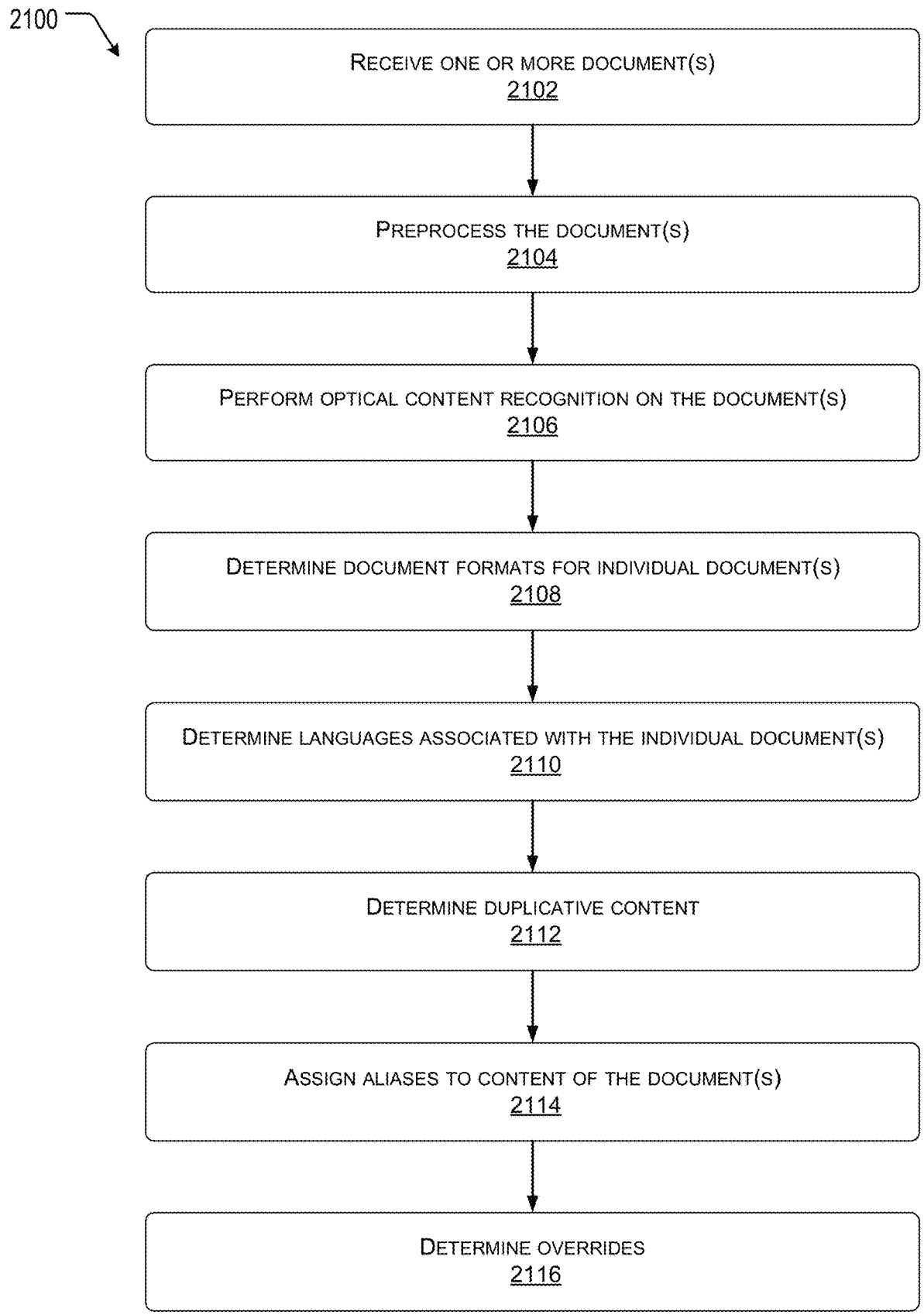
FIG. 21 is a flow diagram illustrating an example process associated with the data extraction system of FIG. 15 according to some implementations.

FIG. 21 is a flow diagram illustrating an example process 2100 associated with the data extraction system of FIG. 15 according to some implementations. As discussed above, a data extraction system may be configured to parse structured, unstructured, and semi-structured documents to extract key value pairs and other usable data related to the transport and delivery of assets between multiple locations and/or facilities.

At 2102, the data extraction system may receive one or more documents. As discussed herein, the documents may be scanned or imaged copies of physical documents as well as electronic documents (such as attachments to emails and the like). In some cases, the documents may include images or sensor data of vehicles, license plates and identifiers, cargo and/or shipping containers, and the like in addition to the actual documentation (e.g., forms, tables, bills of lading, and the like).

At 2104, the data extraction system may preprocess the documents, as discussed above. For example, the system may convert the documents to images or another similar format. The system may also arrange the documents (e.g., align with an upright vector, order the pages of the documents, and the like) and remove imperfections, such as stains, damage marks, watermarks, and the like.

At 2106, the data extraction system may perform optical content recognition on the documents, as discussed above. In this manner, the data extraction system may generate machine readable content that may be parsed and extracted as individual elements.

At 2108, the data extraction system may determine document formats for individual documents. For example, the system may determine a type or classification for each page, portion of a page, document, and the like. In some cases, the system may select key value descriptors (e.g., the types of data to extract) based at least in part on the formats detected and/or assigned.

At 2110, the data extraction system may determine languages associated with the individual documents. For example, documents may include duplicate content in multiple languages, may have different languages from each other, and the like. In some cases, the system may assign the language to each document, page or other portion of the document based on one or more language dictionary. In some cases, the data extraction system may convert or generate a machine translation of the content to provide the content of the documents in a uniform language.

At 2112, the data extraction system may determine the existence of duplicate content. For example, the content may be included in the documents in two or more languages, two or more currencies, and the like. The data extraction system may identify the duplicative content and filter and/or otherwise remove the duplicative content, such that only a single copy remains during data extraction.

At 2114, the data extraction system may assign aliases to the machine readable content of the documents. For instance, the data extraction system may maintain dictionaries of aliases that different regions, jurisdictions, companies, organizations, and the like to use with respect to particular types of data. As an illustrative example, some documents may use the term "ship to" while others use the term "destination".

At 2116, the data extraction system may determine overrides between portions of the content. For example, in some cases, there may be notes, emails, or other content that overrides or changes other content within the documents. In these cases, the data extraction system may identify the references to the other content and either replace the content, filter, and/or otherwise remove the replaced content from the documents prior to data extortion.

Figure 22:
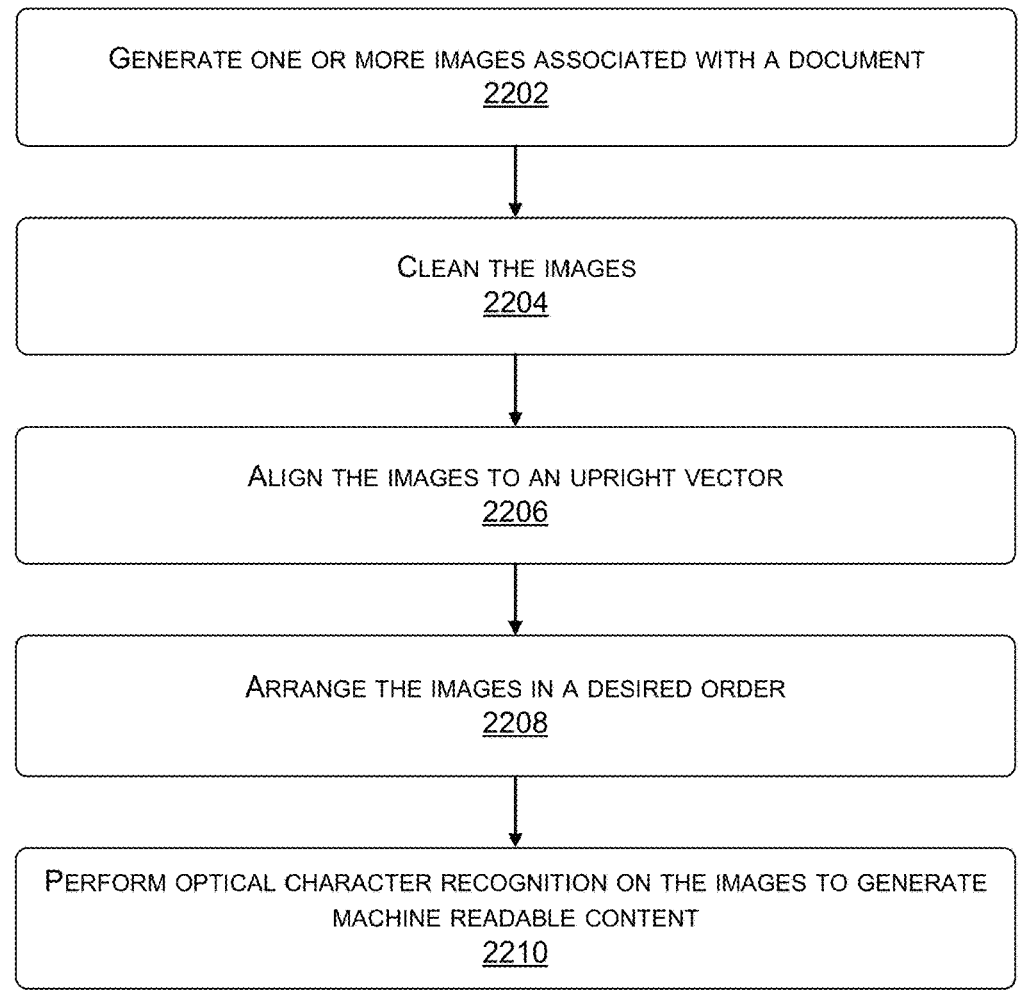
FIG. 22 is a flow diagram illustrating an example process associated with the preprocessing system of FIG. 15 according to some implementations.

FIG. 22 is a flow diagram illustrating an example process 2200 associated with the preprocessing system 104 of FIG. 1 according to some implementations. As discussed above, the data extraction system may be configured to process the documents prior to performing optical character recognition to generate the machine readable content. In this manner, a more accurate machine readable content may be generated.

At 2202, the preprocessing system may generate an image associated with a document, as discussed above. For example, the preprocessing system may convert each of the pages of the one or more documents received into a standard format, such as a JPEG, PDF, PNG, GIF, or the like.

At 2204, the preprocessing system may clean the image, as discussed above. For example, the preprocessing system may remove imperfections by utilizing image processing techniques, machine learning, and the like to identify text based content from the imperfections, such as blots, smudges, damage, watermarks, and the like. In some cases, the preprocessing system may assign bounding boxes or regions to the imperfections and/or the text based content and modify brightness, contrast, saturation, and the like with respect to the text based content (e.g., to darken the content) and the imperfections (e.g., to lighten the imperfections). In this manner, the output of the future optical character recognition may be less likely to be obstructed or incorporate content associated with the imperfections.

At 2206, the preprocessing system may align the image with a desired upright vector, as discussed above. For example, the preprocessing system may detect the bottom and/or top of the image based on a content (such as a header, title, footer, page number, and the like). In other examples, the preprocessing system may also determine the upright or vertical position using an analysis of the content (e.g., words and characters), such as portions of individual characters within the content. The preprocessing system may then rotate the image to align a vector associated with the image to the desired upright vector.

At 2208, the preprocessing system may arrange the images in a desired order, as discussed above. For instance, the pages of a document may be out of order. In this example, the preprocessing system may identify the desired order based on content matching, pattern matching, machine learned models/networks, and the like. The preprocessing system may then reorder the images to the desired or originally intended order.

At 2210, the data extraction system may perform optical character recognition on the images to generate a machine readable content, as discussed herein.

Figure 23:
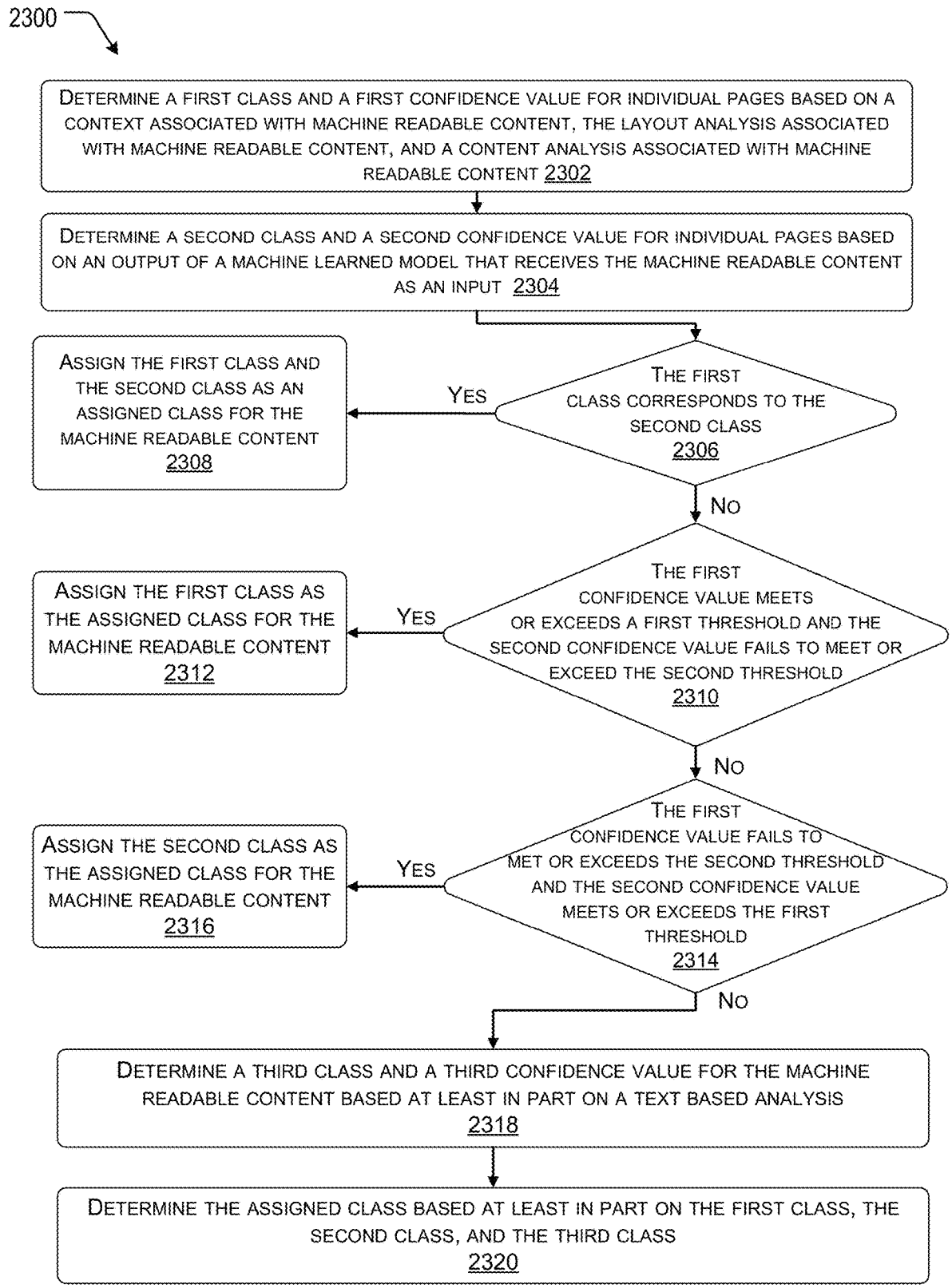
FIG. 23 is a flow diagram illustrating an example process associated with the classification system of FIG. 15 according to some implementations.

FIG. 23 is a flow diagram illustrating an example process 2300 associated with the classification system 1510 of FIG. 15 according to some implementations. As discussed above, the data extraction system may classify individual documents, individual pages of the documents, or individual portions of content associated with the documents based at least in part on the machine readable content and prior to performing data extraction. In general, the classification may include multiple techniques that utilize confidence values to disambiguate between techniques that generated different classifications for the same and/or overlapping content.

At 2302, the classification system may determine a first class and a first confidence value for individual pages based on a context associated with machine readable content, the layout analysis associated with machine readable content, and a content analysis associated with machine readable content. For example, the classification system may utilize a set of predefined rules, heuristics, and/or historical data to generate the first class and the first confidence value, as discussed above.

At 2304, the classification system may determine a second class and a second confidence value for individual pages based on an output of a machine learned model that receives the machine readable content as an input. For example, the classification system may utilize one or more machine learned models and/or networks trained using transportation documents and forms to generate the second class and the second confidence value, as discussed above, as discussed above.

At 2306, the classification system may determine if the first class corresponds to the second class. If so, the process 2300 may proceed to 2308. At 2308, the classification system may assign the first class and the second class as an assigned class for the machine readable content (e.g., the document, page, and/or portion). However, if the first class does not correspond to the second class, the process 2300 may advance to 2310.

At 2310, the classification system may determine if the first confidence value meets or exceeds a first threshold and the second confidence value fails to meet or exceed the second threshold. For example, the first threshold may represent a threshold at which the confidence value is high enough to assign the corresponding class and the second threshold may present a value at which the confidence value is low enough to discard the class. If the first confidence value does meet or exceed the first threshold and the second confidence value does not meet or exceed the second threshold, the process 2300 may move to 2312, and, at 2312, the classification system may assign the first class as the assigned class for the machine readable content. However, if either the first confidence value fails to meet or exceed the first threshold or the second confidence value meets or exceeds the second threshold, the process 2300 advances to 2314.

At 2314, the classification system may determine if the first confidence value fails to meet or exceeds the second threshold and the second confidence value meets or exceeds the first threshold. If the first confidence value does not meet or exceed the second threshold and the second confidence value does meet or exceed the first threshold, the process 2300 may move to 2316, and, at 2316, the classification system may assign the second class as the assigned class for the machine readable content. However, if either the first confidence value meets or exceed the second threshold or the second confidence value fails to meet or exceed the first threshold, the process 2300 advances to 2318.

At 2318, the classification system may determine a third class and a third confidence value for the machine readable content based at least in part on a text based analysis, as discussed above.

At 2320, the classification system may determine the assigned class based at least in part on the first class, the second class, and the third class. For example, if the third class corresponds to either the first class or the second class, the classification system may assign the class corresponding the third class as the assigned class. In other cases, the classification system may select the class having the highest confidence value as the assigned class. It should be understood that in some cases, the classification system may also generate additional classes and corresponding confidence values when determining the class in the manner discussed herein.

As an alternate example, the classification system may rely upon a difference between the confidence values when determining the class. For instance, the classification system may determine the third class and the third confidence value when the first class differs from the second class and the difference between the first confidence value and the second confidence value is less than a threshold difference.

Figure 24:
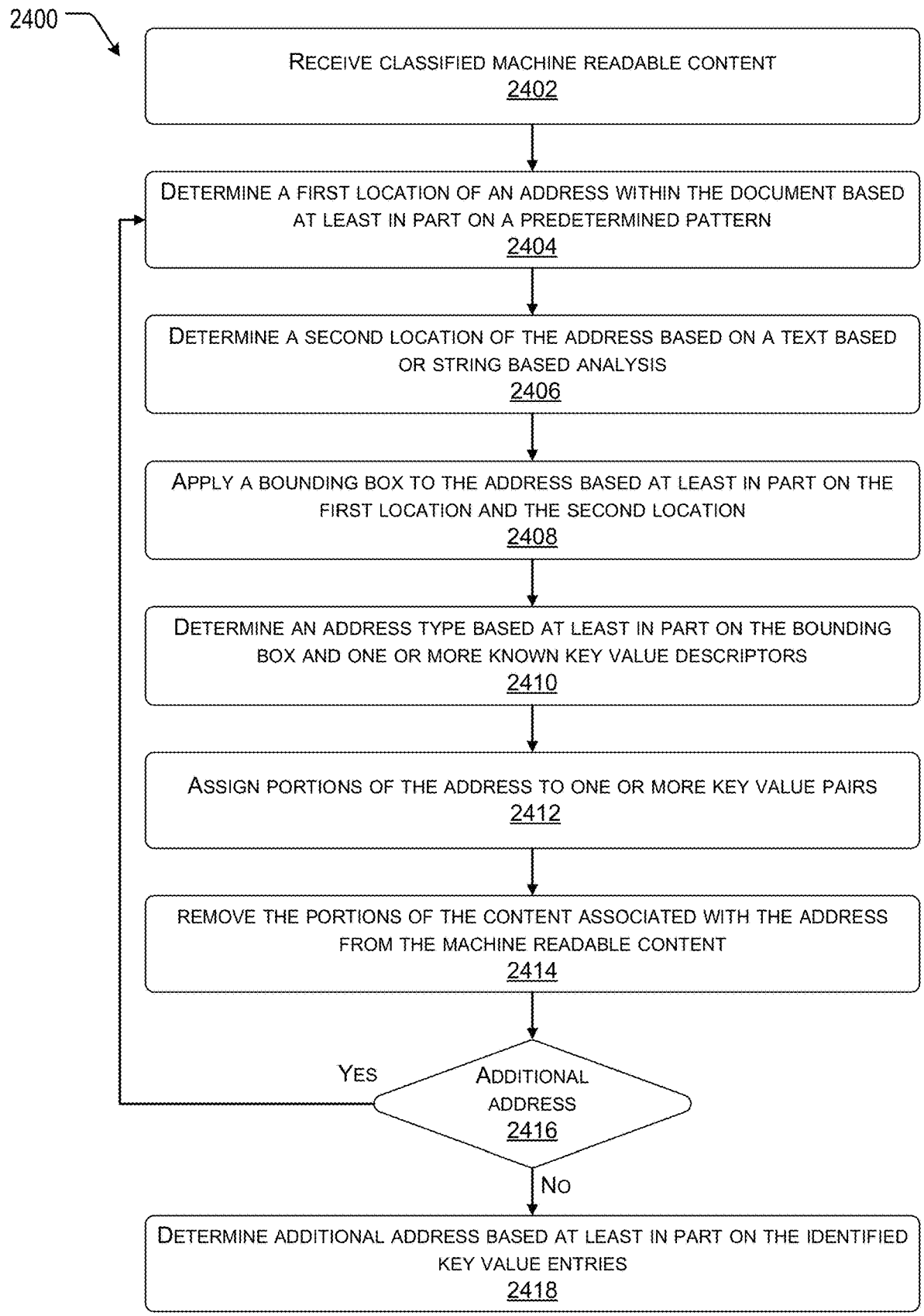
FIG. 24 is a flow diagram illustrating an example process associated with the data extraction system of FIG. 15 according to some implementations.

FIG. 24 is a flow diagram illustrating an example process 2400 associated with the data extraction system 1512 of FIG. 15 according to some implementations. In this example, the process 2400 may be configured to extract data associated with one or more address, as discussed herein.

At 2402, the data extraction system may receive classified machine readable content. For example, the machine readable content may be generated from an optical character recognition system, as discussed above.

At 2404, the data extraction system may determine a first location of an address within the document based at least in part on a predetermined pattern. For example, the data extraction system may attempt to match one or more pattern associated with addresses with a portion of the machine readable content.

At 2406, the data extraction system may determine a second location of the address based on a text based or string based analysis. For example, the data extraction system may parse the content to identify words or strings that typically are associated with addresses. In some cases, the first location and the second location may be the same and/or overlapping.

At 2408, the data extraction system may apply a bounding box to the address based at least in part on the first location and the second location. For example, the data extraction system may parse adjacent content to determine whether or not the content is associated with the address.

At 2410, the data extraction system may determine an address type based at least in part on the bounding box and one or more known key value descriptors. For example, the data extraction system may utilize a dictionary including shipping descriptors (such as destination, ship to, port of origin, and the like) to identify a type of address that has been located.

At 2412, the data extraction system may assign portions of the address to one or more key value pairs and remove the portions from the machine readable content. In some cases, the data extraction system may assign portions of the address to specific fields associated with the address type (such as city, street name, street number, location codes, country codes, and the like).

At 2414, the data extraction system may remove the portions of the content associated with the address from the machine readable content. For example, once the portions are assigned to key value descriptors as key value entries, the data extraction system may remove the address content from the machine readable content.

At 2416, the data extraction system may determine if additional addresses may exist. For instance, the data extraction system may determine if each expected address has been located or if on the prior pass no additional address locations were identified. If there are additional addresses, the process 2400 may return to 2404 and attempt to locate an additional address location. Otherwise, the process 2400 may move to 2418.

At 2418, the data extraction system may determine additional addresses based at least in part on the identified key value entries. For example, the data extraction system may perform a final parsing or pass of the machine readable content to identify any missing addresses based on key value descriptors. For example, if a location of origin has not been located, the data extraction system may parse the machine readable content for an alias associated with location of origin.

Figure 25:
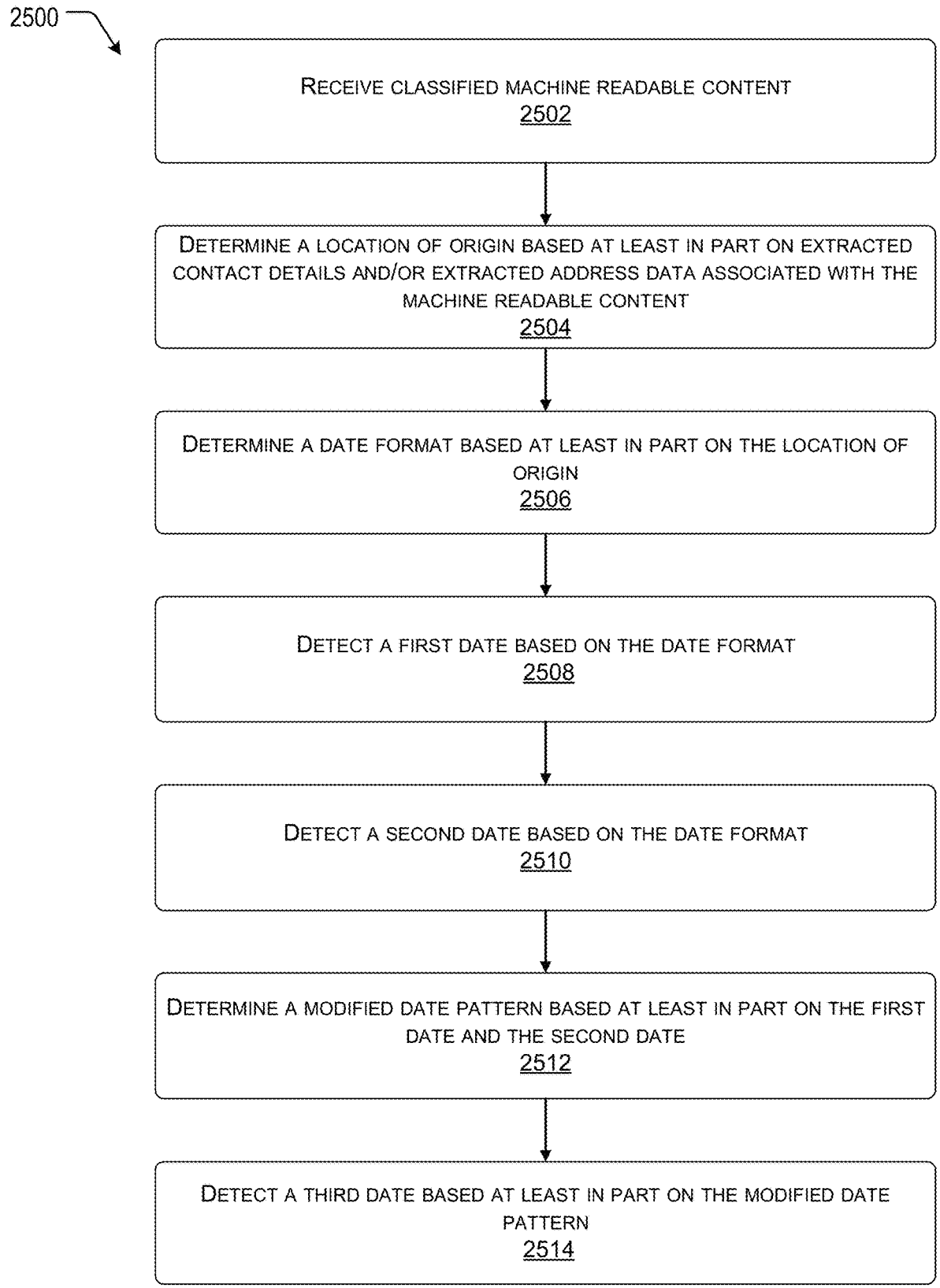
FIG. 25 is a flow diagram illustrating an example process associated with the data extraction system of FIG. 15 according to some implementations.

FIG. 25 is a flow diagram illustrating an example process 2500 associated with the data extraction system 1512 of FIG. 15 according to some implementations. In some cases, the data extraction system may also be configured to extract data representing dates associated with the transporting of goods. As discussed above, dates may be particularly difficult data for extraction using conventional or traditional systems, as the dates may appear in many different formats and, in some cases, multiple formats within the same document.

At 2502, the data extraction system may receive classified machine readable content. For example, the machine readable content may be generated from an optical character recognition system, as discussed above.

At 2504, the data extraction system may determine a location of origin based at least in part on extracted contact details and/or extracted address data associated with the machine readable content. For example, as discussed above, the data extraction system may identify contact details associated with a seller or location of origin and/or an address associated with the location of origin.

At 2506, the data extraction system may determine a date format based at least in part on the location of origin. For example, the data extraction system may be configured with one or more date to jurisdiction or location dictionaries and/or datastore. The data extraction system may, in these cases, determine the date format using the dictionary. It should be understood, that in some situations multiple date formats may be identified.

At 2508, the data extraction system may detect a first date based on the date format. For example, the data extraction system may parse the machine readable content for a pattern that matches the pattern of the date format.

At 2510, the data extraction system may detect a second date based on the date format. For example, the data extraction system may continue to parse the machine readable content for the pattern that matches the pattern of the date format.

At 2512, the data extraction system may determine a modified date pattern based at least in part on the first date and the second date. For example, the pattern of the first date and/or the second date may vary from the date pattern stored with respect to the dictionary/data store and the location of origin.

At 2514, the data extraction system may detect a third date based at least in part on the modified date pattern. For example, the data extraction system may continue to parse the machine readable content for the modified date pattern that was generated based on the prior identified dates. In some cases, it should be understood, that upon detection of a date, the corresponding content may be removed or otherwise filtered from the machine readable content prior to a second pass or parsing by the data extraction system.

Figure 26:
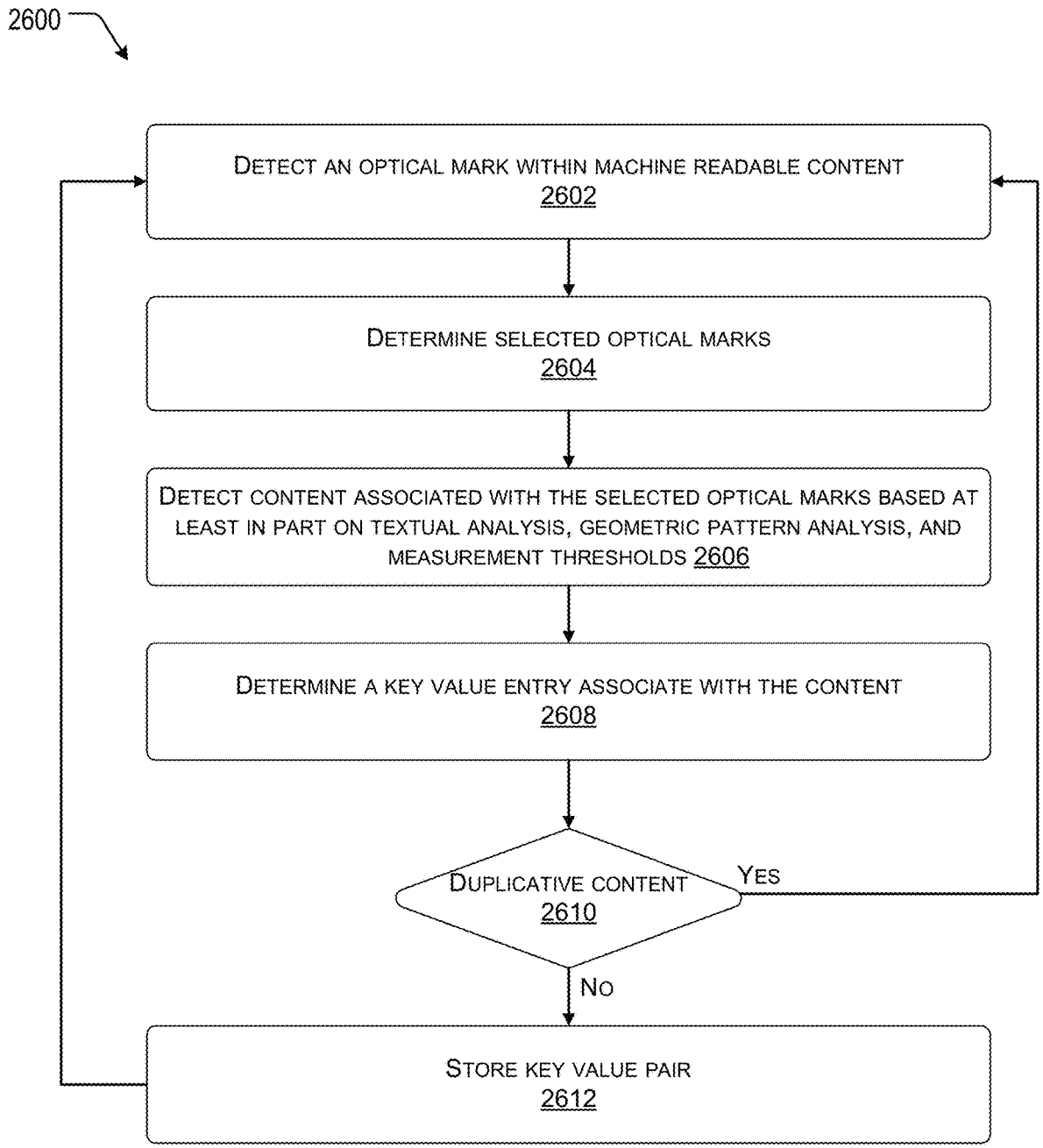
FIG. 26 is a flow diagram illustrating an example process associated with the data extraction system of FIG. 15 according to some implementations.

FIG. 26 is a flow diagram illustrating an example process 2600 associated with the data extraction system 1512 of FIG. 15 according to some implementations. As discussed above, the data extraction system may be configured to extract data associated with selected optical marks, such as a series of selectable option on a form.

At 2602, the data extraction system may detect an optical mark within machine readable content. For example, the document may have multiple selectable options as part of a form or the like. In this case, the data extraction system may utilize pattern matching, machine learned models and/or networks, and the like to detect the presence of the selectable options and the content associated therewith. For instance, the content associated with the selectable options may be adjacent to but spaced away from the optical marks.

At 2604, the data extraction system may determine selected optical marks. For example, the data extraction system may utilize pattern matching, machine learned models and/or networks, and the like to detect which of the optical marks are selected and which are unselected.

At 2606, the data extraction system may detect content associated with the selected optical marks based at least in part on textual analysis, geometric pattern analysis, and measurement thresholds.

At 2608, the data extraction system may determine a key value entry associated with the content. For example, the data extraction system may determine portions of the content that may be utilized as a key value entry. For example, the data extraction system may include key value descriptors based on, for instance, the classification of the machine readable content and the data extraction system may determine if the content matches any of the key value descriptors.

At 2610, the data extraction system may determine if the content is duplicative. If the content is duplicative, the process 2600 may return to 2602. Otherwise, the process 2600 may proceed to 2612 and the data extraction system may store the key value pair.

Figure 27:
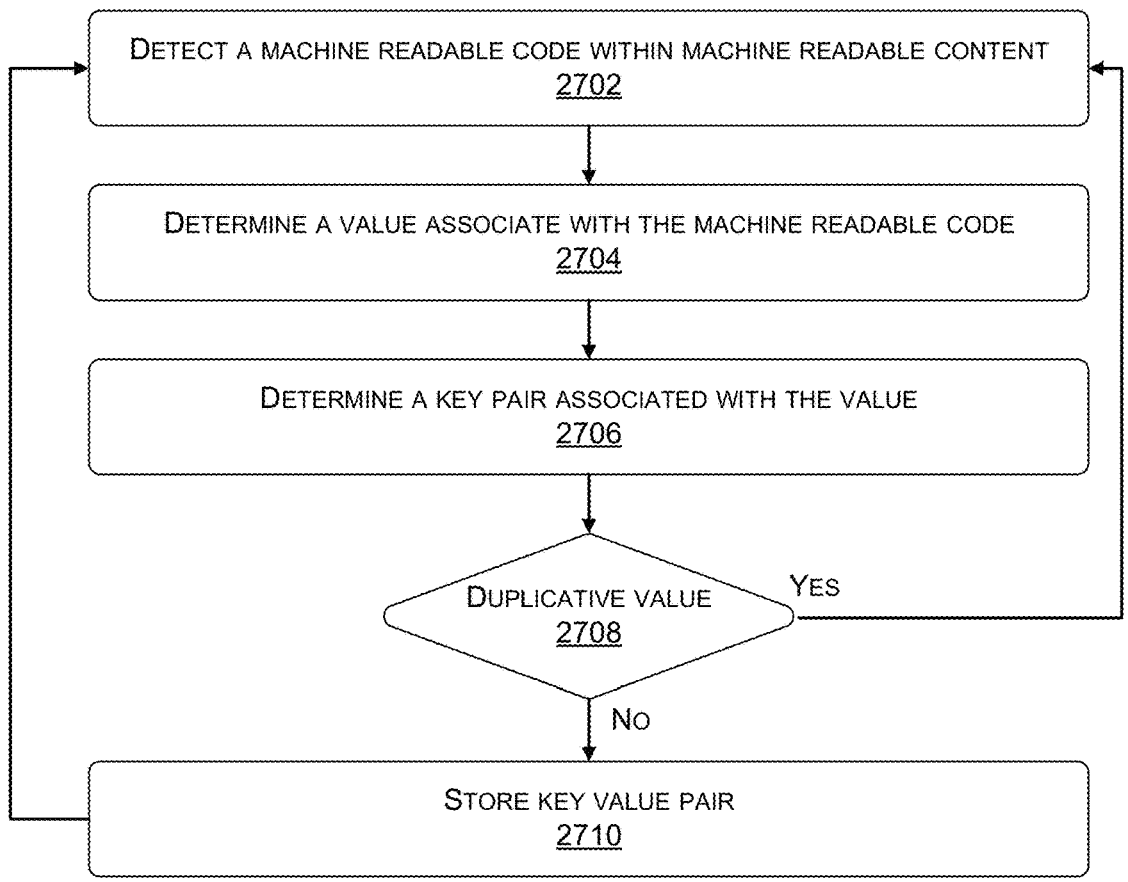
FIG. 27 is a flow diagram illustrating an example process associated with the data extraction system of FIG. 15 according to some implementations.

FIG. 27 is a flow diagram illustrating an example process 2700 associated with the data extraction system 1512 of FIG. 15 according to some implementations. As discussed above, the data extraction system may be configured to extract data associated with selected machine readable codes or icons, such as a barcode and/or QR codes.

At 2702, the data extraction system may detect a machine readable code within machine readable content. For example, the document may have bar codes, QR codes, or other machine readable encodings. In this case, the data extraction system may utilize, pattern matching, machine learned models and/or networks, and the like to detect the presence of the machine readable code.

At 2704, the data extraction system may determine a value associated with the machine readable code. For example, the data extraction system may scan or otherwise read or access the data associated with the machine readable code. It should be understood that, in some cases, the data extraction system may access third-party systems in order to extract the data associated with the machine readable code.

At 2706, the data extraction system may determine a key value entry associate with the value. For example, the data extraction system may include key value descriptors based on, for instance, the classification of the machine readable content and the data extraction system may determine if the value matches any of the key value descriptors.

At 2708, the data extraction system may determine if the value is duplicative. If the value is duplicative, the process 2700 may return to 2702. Otherwise, the process 2700 may proceed to 2710 and the data extraction system may store the key value pair.

Figure 28:
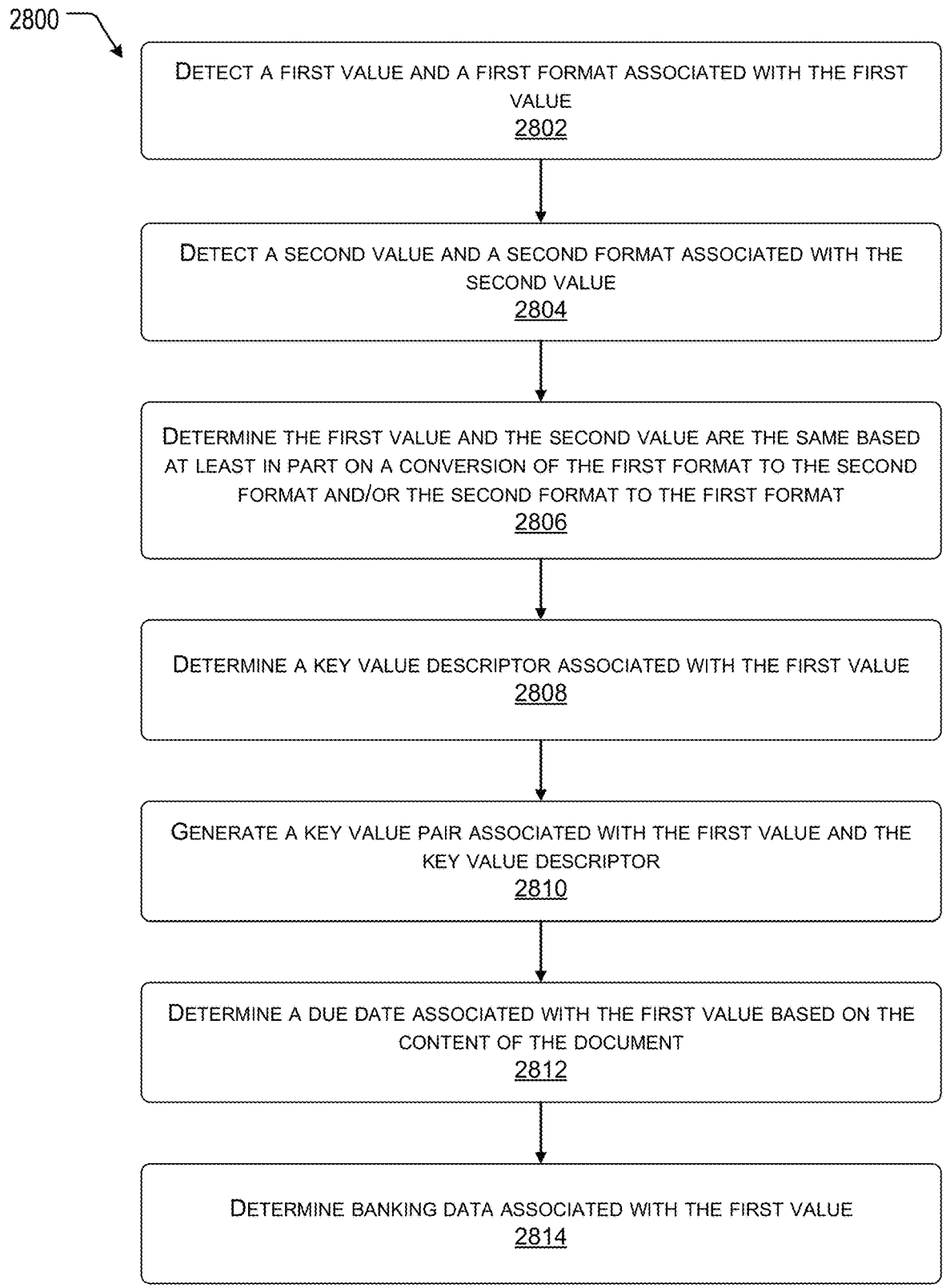
FIG. 28 is a flow diagram illustrating an example process associated with the data extraction system of FIG. 15 according to some implementations.

FIG. 28 is a flow diagram illustrating an example process 2800 associated with the data extraction system 1512 of FIG. 15 according to some implementations. As discussed above, the system may also store extra data associated with designated key value descriptors. For instance, the key value descriptors may be selected based on a class or type of the document generated during segmentation and classification. In some cases, the key value entry may be duplicative, such as in two monetary denominations.

At 2802, the data extraction system may detect a first value and a first format associated with the first value. For example, the data may be a monetary value and the first format may be a first domination, such as a denomination of the jurisdiction of origin.

At 2804, the data extraction system may detect a second value and a second format associated with the second value. For example, the second value may also be a monetary value and the second format may be a second domination, such as a denomination of a receiving jurisdiction.

At 2806, the data extraction system may determine that the first value and the second value are the same based at least in part on a conversion of the first format to the second format and/or the second format to the first format. For example, the values may be converted to the same format and compared to see if the values match. In some case, conversion data may be accessed using a third-party datastore based on a date of contract, date of pick up, date of delivery, and the like.

At 2808, the data extraction system may determine a key value descriptor associated with the first value and/or the second value and, at 2810, the data extraction system may generate a key value pair assorted with the first value and the key value descriptor.

At 2812, the data extraction system may also determine a due date associated with the first value based on the content of the document. For example, the system may determine that the invoice was due thirty days from delivery and utilize the first value, a delivery date, and the thirty days to determine a due date. It should be understood, that in some cases, the document may include multiple due dates with various percentages and/or monetary values due at each of the multiple due dates. The due dates may also have varying triggers such as date of shipping, date of loading, date of contract, and the like.

At 2814, the data extraction system may determine banking data associated with the first value. For example, the data extraction system may identify a SWIFT code or other banking data associated with the seller and/or buyer of the goods. In these cases, the system may access third party systems, such as banking systems, to complete a banking transfer of the amount specified in the first value at the due date determined. In other cases, the system may send an alert to a third party system, such as a buyer system and/or seller system indicating that the amount is due or due within a threshold number of days.

Figure 29:
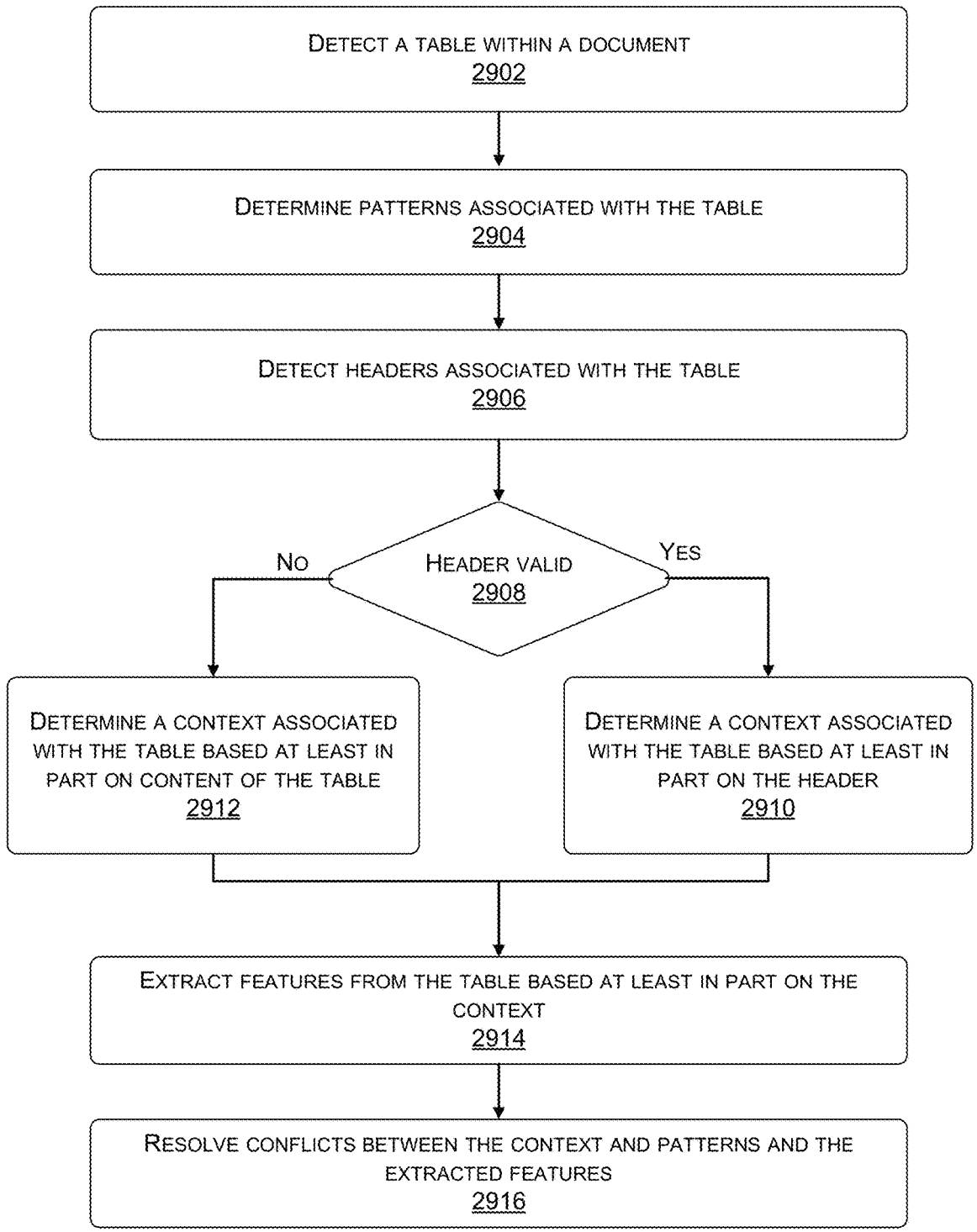
FIG. 29 is a flow diagram illustrating an example process associated with the data extraction system of FIG. 15 according to some implementations.

FIG. 29 is a flow diagram illustrating an example process 2900 associated with the data extraction system 1512 of FIG. 15 according to some implementations. As discussed above, the data extraction system may be configured to extract data associated with bordered and borderless tables using multiple techniques. In some cases, the system may determine a context of each table when parsing and extraction features and/or data.

At 2902, the data extraction system may detect a table within a document or image of a document page, as discussed herein. In some cases, the table may be bordered and/or the table may be borderless. In some instances, the table may be detected using pattern matching and/or semantic content matching between a majority of the content of the document and the content being attributed to the table. It should be understood that other techniques of table detection may also be used such as using a machine learned model and/or network.

At 2904, the data extraction system may determine patterns associated with the table. For example, the data extraction system may determine a number of rows and/or columns, line spacing, column and row spacing, font size, and the like.

At 2906, the data extraction system may detect headers associated with the table. The data extraction system may also detect a termination and/or footer associated with the table.

At 2908, the data extraction system may determine if a valid header exists. For instance, in some cases, the table may not include a header, table title, or the like. If there is a header, the process 2900 may advance to 2910, and the system may determine a context associated with the table based at least in part on the header. Otherwise, the process 2900 may move to 2912, and the system may determine the content based at least in part on the content of the table.

At 2914, the data extraction system may extract features from the table based at least in part on the context. For example, the system may select key value descriptors based at least in part on the context and then parse the content of the table for the key value entries matching the selected descriptors. In some cases, the data extraction system may also utilize ISO procedures to determine the key value descriptors.

At 2916, the data extraction system may resolve conflicts between the context and patterns and the extracted features. For example, the data extraction system may determine conflicts generated based on multiple languages, multiple currencies, overwriting borders (e.g. content of an entry exceeds the borders of the table row/column pairs), and the like.

FIG. 30 is a flow diagram illustrating an example process 3000 associated with the optical character recognition system 1508 of FIG. 15 according to some implementations. As discussed above, the system may be configured to convert each of the pages of the documents into an image, preprocess the image, and then covert the images to machine readable content via an OCR process.

At 3002, the optical character recognition system may perform first character recognition on content of a document based at least in part on a recognition model. In some cases, the recognition model may be configured to recognize characters, words, and/or phrases using one or more dictionaries. For example, the character recognition system may be more accurate when detecting letters and numbers in combination than a word or phrase based recognition system. As discussed above the optical character recognition system may utilize multiple optical character recognition techniques and utilize different techniques for different portions of the content. In this manner, the system may generate at least first machine readable content associated with the document.

At 3004, the optical character recognition system may perform second character recognition on content of the document based at least in part on a co-reference resolution model. For example, the system may generate second machine readable content associated with the document.

At 3006, the optical character recognition system may perform third character recognition on content of the document based at least in part on a part of speech model. For example, the system may utilize a part of speech model or dictionary to generate third machine readable content associated with the document.

At 3008, the optical character recognition system may perform fourth character recognition on content of the document based at least in part on a language model. For example, the system may generate fourth machine readable content associated with the document.

At 3010, the optical character recognition system may perform fifth character recognition on content of the document based at least in part on heuristic models and generate fifth machine readable content.

At 3012, the optical character recognition system may generate machine readable content based at least in part on the first character recognition, second character recognition, third character recognition, fourth character recognition, and fifth character recognition. For example, the optical character recognition system may generate machine readable content using portions of the first through fifth machine generated content based on the context of the content and correlations, correspondences, and/or matches between the multiple machine readable contents.

Figure 31:
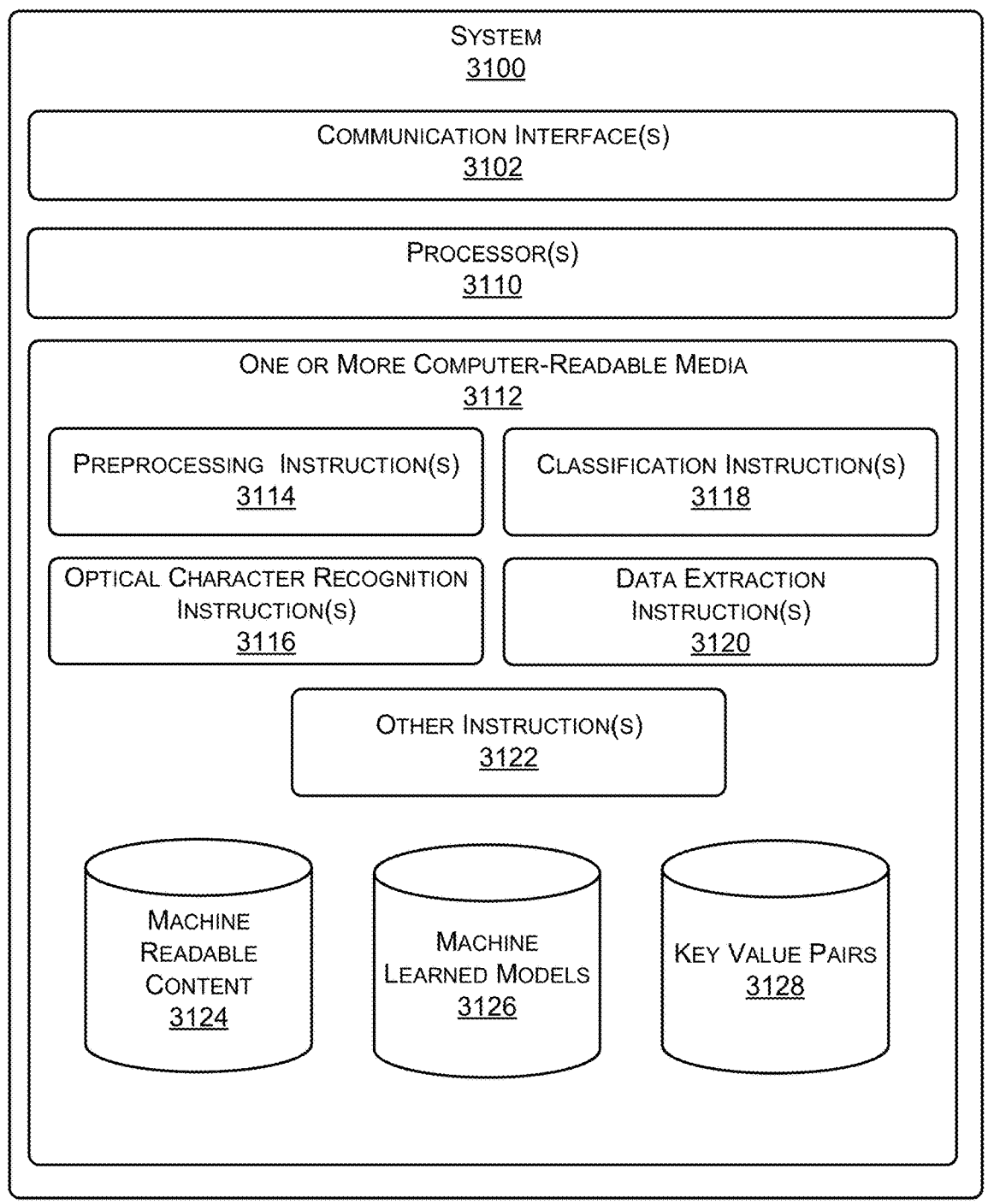
FIG. 31 is an example system that may implement the techniques described herein according to some implementations.

FIG. 31 is an example system 3100 that may implement the techniques described herein according to some implementations. The system 3100 may include one or more communication interface(s) 3102 (also referred to as communication devices and/or modems). The one or more communication interfaces(s) 3102 may enable communication between the system 3100 and one or more other local or remote computing device(s) or remote services, such as sensors system of FIG. 20. For instance, the communication interface(s) 3102 can facilitate communication with other proximity sensor systems, a central control system, or other facility systems. The communications interfaces(s) 3102 may enable Wi-Fi-based communication such as via frequencies defined by the IEEE 802.11 standards, short range wireless frequencies such as Bluetooth, cellular communication (e.g., 2G, 3G, 4G, 4G LTE, 6G, etc.), satellite communication, dedicated short-range communications (DSRC), or any suitable wired or wireless communications protocol that enables the respective computing device to interface with the other computing device(s).

The system 3100 may include one or more processor(s) 3110 and one or more computer-readable media 3112. Each of the processors 3110 may itself comprise one or more processors or processing cores. The computer-readable media 3112 is illustrated as including memory/storage. The computer-readable media 3112 may include volatile media (such as random access memory (RAM)) and/or nonvolatile media (such as read only memory (ROM), Flash memory, optical disks, magnetic disks, and so forth). The computer-readable media 3112 may include fixed media (e.g., GPU, NPU, RAM, ROM, a fixed hard drive, and so on) as well as removable media (e.g., Flash memory, a removable hard drive, an optical disc, and so forth). The computer-readable media 3112 may be configured in a variety of other ways as further described below.

Several modules such as instructions, data stores, and so forth may be stored within the computer-readable media 3112 and configured to execute on the processors 3110. For example, as illustrated, the computer-readable media 3112 stores preprocessing instructions 3114, optical character recognition instructions 3116, classification instructions 3118, data extraction instructions 3120 as well as other instructions 3122, such as an operating system. The preprocessing instructions 3114, optical character recognition instructions 3116, classification instructions 3118, data extraction instructions 3120 may operate as described above with respect to the preprocessing systems, optical character recognition systems, classification systems, and/or data extraction systems. The computer-readable media 3110 may also be configured to store data, such as machine readable content 3124 and machine learned models 3126, and key value pairs 3128 as well as other data.

While the example clauses described above are described with respect to one particular implementation, it should be understood that, in the context of this document, the content of the example clauses can also be implemented via a method, device, system, a computer-readable medium, and/or another implementation. Additionally, any of examples may be implemented alone or in combination with any other one or more of the other examples. Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. A method comprising: receiving first sensor data associated with an order cart; determining, based at least in part on the first sensor data, an identity of an item physically located on the order cart; determining, based at least in part on the identity, that the item is associated with an order corresponding to the order cart; responsive to determining that the item is associated with the order, determining that the order is complete; and alerting a facility operator that the order may be loaded on a transport.

B. The method of claim A, wherein determining that the item is associated with the order corresponding to the order cart is based at least in part on an order list associated with the order cart.

C. The method of claim A, wherein determining the identity of the item is based at least in part on pixel of the sensor data associated with the item.

D. The method of claim A, wherein the item is a first item and determining the identity of the first item is based at least in part second sensor data representative of a second item adjacent to the first item on the order cart.

E. The method of claim A, further comprising: determining, based at least in part on the sensor data, that the item is damaged; and responsive to determining the first item is damaged, causing an alert to be sent to a device associated with a facility operator.

F. The method of claim A, wherein the first sensor data including data associated with two or more image devices.

G. The method of claim A, wherein: receiving the first sensor data associated with an order cart further comprises: partitioning the order cart into two or more discretized regions; causing the sensor to capture regionalized sensor data associated with individual regions of the two or more discretized regions; determining that the item is represented in the regionalized sensor data associated with a first discretized region of the two or more discretized regions and the regionalized sensor data associated with a second discretized region of the two or more discretized regions; assigning the item to the first discretized region; and determining the identity of the item physically located on the order cart is based at least in part on the regionalized sensor data associated with the first discretized region.

H. The method of claim A, further comprising responsive to determining, based at least in part on the first sensor data, that a second item is not present on the order cart, alerting a facility operator that the order is incomplete.

I. The method of claim A, wherein determining the identity of the item physically located on the order cart further comprises: determining, based at least in part on the first sensor data, that the item includes a first identifier and a second identifier; determining that the first identifier differs from the second identifier; and determining, based at least in part on the sensor data, a correct identifier for the item; causing a label including the correct identifier to print; and sending a visual indication of the item, a location relative to the order cart associated with the item, and instructions to place the label on the item to a display.

J. The method of claim A, further comprising: responsive to detecting an order cart within a scanning area, causing one or more sensors to capture the sensor data.

K. The method of claim J, further comprising determining, based at least in part on the sensor data, an identity of the order cart and accessing an order list associated with the order cart.

L. A system comprising: one or more processors; and one or more non-transitory computer-readable media storing instructions that, when executed by the one or more processors, cause the one or more processors to perform operations comprising: determining an identity of an item physically located on the order cart; determining, based at least in part on the identity, that the item is associated with an order corresponding to the order cart; determining that the order is complete; and alerting a facility operator that the item may be loaded on a transport.

M. The system of claim L, wherein the operations further comprise: accessing image data associated with the order cart, the image data captured by two or more image device; and wherein determining the identity of the item is based at least in part on the sensor data.

N. The system of claim M, wherein the operations further comprise: determining, based at least in part on the image data, that the item includes a first identifier and a second identifier; determining that the first identifier differs from the second identifier; and determining, based at least in part on the image data, a correct identifier for the item; causing a label including the correct identifier to print; and sending a visual indication of the item, a location relative to the order cart associated with the item, and instructions to place the label on the item to a display.

O. The system of claim N, wherein the first identifier is the correct identifier.

P. The system of claim L, wherein the operations further comprise: partitioning the order cart into two or more discretized regions; causing an image device to capture regionalized image data associated with individual regions of the two or more discretized regions; and wherein determining the identity of the item is based at least in part on the regionalized image data.

Q. One or more non-transitory computer-readable media storing instructions that, when executed by one or more processors, cause the one or more processors to perform operations comprising: causing a sensor to capture first sensor data associated with an order cart; determining, based at least in part on the first sensor data, an identity of an item physically located on the order cart; determining, based at least in part on the identity, that the item is associated with an order corresponding to the order cart; and responsive to determining that the item is associated with the order, determining that the order is complete.

R. The one or more non-transitory computer-readable media of claim Q, wherein the operations further comprise alerting a facility operator that the order may be loaded on a transport.

S. The one or more non-transitory computer-readable media of claim Q, wherein the operations further comprise: determining, based at least in part on the sensor data, that the item is damaged; and responsive to determining the first item is damaged, causing an alert to be sent to a device associated with a facility operator.

T. The one or more non-transitory computer-readable media of claim Q, wherein determining the identity of the item physically located on the order cart further comprises: determining, based at least in part on the first sensor data, that the item includes a first identifier and a second identifier; determining that the first identifier differs from the second identifier; and determining, based at least in part on the sensor data, a correct identifier for the item; causing a label including the correct identifier to print; and sending a visual indication of the item, a location relative to the order cart associated with the item, and instructions to place the label on the item to a display.

While the example clauses described above are described with respect to one particular implementation, it should be understood that, in the context of this document, the content of the example clauses can also be implemented via a method, device, system, a computer-readable medium, and/or another implementation. Additionally, any of examples may be implemented alone or in combination with any other one or more of the other examples.

What is claimed is:

1. A method comprising:
receiving first sensor data associated with an item;
generating first machine readable content from the first sensor data based at least in part on a first optical character recognition system, the first machine readable content representing a label associated with the item;
generating second machine readable content from the first sensor data based at least in part on a second optical character recognition system, the second machine readable content representing the label associated with the item;
generating third machine readable content from the first sensor data based at least in part on the first machine readable content and the second machine readable content;
generating a first classification for the item based at least in part on the third machine readable content and a first classification system;
generating a second classification for the item based at least in part on the third machine readable content and a second classification system;
generating an assigned classification for the item based at least in part on the first classification and the second classification;
generating extracted data from the third machine readable content, the extracted data associated with one or more key value descriptors assigned based at least in part on the assigned classification, the extracted data includes a first code, a second code, and a third code associated with the item, the first code different from the second code and the third code, the second code different than the third code, and each of the first code, the second code, and the third code representing an identity of the item;
determining, based at least in part on the assigned classification for the item and the extracted data, an identifier for the item; and
verifying the identifier of the item based at least in part on the first code, the second code, and the third code, an identity of the item.

2. The method of claim 1, further comprising segmenting the first sensor data of the item into multiple images, individual images associate with a portion of the item; and
wherein the first classification system differs from the second classification system and the first classification is based at least in part on at least one of:
a machine learned model;
a dictionary; or
a heuristics model.

3. The method of claim 1, wherein verifying the identifier of the item is based at least in part on a stored list.

4. The method of claim 1, further comprising:
identifying an imperfection within the first sensor data;
determining a first bounding box associated with the imperfection;
determining a second bounding box associated with content of the label;
preforming at least one first operation on the first bounding box to reduce a visibility of the imperfection; and
preforming at least one second operation on the second bounding box to increase a visibility of the label.

5. The method of claim 1, wherein:
the first classification system generates a first confidence value associated with the first classification; and
the second classification system generates a second confidence value associated with the second classification.

6. The method of claim 5, wherein:
the first classification differs from the second classification;
a difference in the first confidence value and the second confidence value is less than or equal to a threshold;
the method further comprises:
generating, responsive to the difference being less than or equal to the threshold, a third classification and third confidence value for the label based at least in part on the third machine readable content and a third classification system; and generating the assigned classification is based at least in part on the third classification and the third confidence value.

7. The method of claim 1, wherein the extracted data includes an optical mark and the generating the extracted data comprises:
   detecting the optical mark within the machine readable content;
   determining the optical mark is selected;
   detecting content within the third machine readable content that is associated with the optical mark based at least in part on one or more of a textual analysis, a geometric pattern analysis, or a measurement thresholds; and
   extracting the content as the extracted data.

8. The method of claim 1, wherein
   generating fourth machine readable content by removing content associated with the extracted data from the third machine readable content; and
   generating additional extracted data from the fourth machine readable content, the additional extracted data associated with the one or more of the key value descriptors assigned.

9. A system comprising:
   one or more processors; and
   one or more non-transitory computer-readable media storing instructions that, when executed by the one or more processors, cause the one or more processors to perform operations comprising:
      receiving second sensor data associated with the item;
      determining a region associated with the item within the second sensor data; and
      determining first sensor data representing the region at a desired zoom;
      detecting, based at least in part on the first sensor data, a foreground label associated with the item;
      determining, based at least on the first sensor data representing the foreground label, a first region associate with the foreground label;
      determine, based at least in part on the first region associated with the foreground label, a first code, a second code, and a third code associated with the item, the first code different from the second code and the third code, the second code different than the third code, and each of the first code, the second code, and the third code representing an identity of the item;
      generating first machine readable content based at least in part on a first optical character recognition applied to the first sensor data, the first machine readable content representing the foreground label associated with the item;
      generating second machine readable content based at least in part on a second optical character recognition applied to the first sensor data, the second machine readable content representing the foreground label associated with the item;
      generating third machine readable content based at least in part on the first machine readable content and the second machine readable content;
      generating a first classification for the item based at least in part on the third machine readable content and a first classification system;
      generating a second classification for the item based at least in part on the third machine readable content and a second classification system;
      generating an assigned classification for the item based at least in part on the first classification and the second classification; and
      determining, based at least in part on the first code, the second code, and the third code, and the assigned classification, an identity of the item; and
      outputting the identity of the item to a remote system.

10. The system as recited in claim 9, wherein the operations further comprise:
    verifying the identity of the item based at least in part on a stored list.

11. The system as recited in claim 9, wherein the operations further comprise:
    verifying the identity of the item based at least in part on a classification of the item determined based at least in part on the first sensor data.

12. One or more non-transitory computer-readable media storing instructions that, when executed by one or more processors, cause the one or more processors to perform operations comprising:
    receiving image data of a label associated with an item;
    generating first machine readable content based at least in part on a first optical character recognition technique and the image data, the first machine readable content representing the label;
    generating second machine readable content based at least in part on a second optical character recognition technique and the image data, the second machine readable content representing the label;
    generating third machine readable content based at least in part on the first machine readable content and the second machine readable content;
    generating a first classification for the label based at least in part on the third machine readable content and a first classification system;
    generating a second classification for the label based at least in part on the third machine readable content and a second classification system;
    generating an assigned classification for the label based at least in part on the first classification and the second classification;
    generating extracted data from the third machine readable content, the extracted data associated with one or more key value descriptors assigned based at least in part on the assigned classification, the extracted data includes a first code, a second code, and a third code associated with the item, the first code different from the second code and the third code, the second code different than the third code, and each of the first code, the second code, and the third code representing an identity of the item;
    determining, based at least in part on the assigned classification for the item and the extracted data, an identifier for the item; and
    verifying the identifier of the item based at least in part on the first code, the second code, and the third code, an identity of the item.

13. The one or more non-transitory computer-readable media of claim 12, further comprising segmenting the image data into multiple images, individual images associate with a portion of the label; and
    wherein the first classification system differs from the second classification system and the first classification is based at least in part on at least one of:
    a machine learned model;
    a dictionary; or
    a heuristics model.

14. The one or more non-transitory computer-readable media of claim 12, wherein the operations further comprises:
- identifying an imperfection within the image data;
- determining a first bounding box associated with the imperfection;
- determining a second bounding box associated with content of the label;
- preforming at least one first operation on the first bounding box to reduce a visibility of the imperfection; and
- preforming at least one second operation on the second bounding box to increase a visibility of the content of the label.

15. The one or more non-transitory computer-readable media of claim 12, wherein the one or more key value descriptors includes an identity of the item.

16. The one or more non-transitory computer-readable media of claim 12, wherein the extracted data includes an optical mark and the generating the extracted data comprises:
- detecting the optical mark within the machine readable content;
- determining the optical mark is selected;
- detecting content within the third machine readable content that is associated with the optical mark based at least in part on one or more of a textual analysis, a geometric pattern analysis, or a measurement thresholds; and
- extracting the content as the extracted data.

17. The method of claim 1, wherein the one or more key value descriptors includes an identity of the item.

18. The system as recited in claim 9, wherein:
- the first classification system generates a first confidence value associated with the first classification; and
- the second classification system generates a second confidence value associated with the second classification.

19. The system as recited in claim 9, wherein the extracted data includes an optical mark and the generating the extracted data comprises:
- detecting the optical mark within the machine readable content;
- determining the optical mark is selected;
- detecting content within the third machine readable content that is associated with the optical mark based at least in part on one or more of a textual analysis, a geometric pattern analysis, or a measurement thresholds; and
- extracting the content as the extracted data.

20. The one or more non-transitory computer-readable media of claim 12, wherein verifying the identifier of the item is based at least in part on a stored list.

* * * * *